(12) United States Patent
Lee et al.

(10) Patent No.: US 11,734,744 B2
(45) Date of Patent: Aug. 22, 2023

(54) XR SYSTEM AND METHOD FOR CONTROLLING THE SAME

(71) Applicant: LG ELECTRONICS INC., Seoul (KR)

(72) Inventors: Haklim Lee, Seoul (KR); Samyoup Kim, Seoul (KR); Jiyong Shin, Seoul (KR); Sanghyuk Im, Seoul (KR); Jongbeom Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 486 days.

(21) Appl. No.: 16/554,424

(22) Filed: Aug. 28, 2019

(65) Prior Publication Data

US 2020/0099858 A1    Mar. 26, 2020

(30) Foreign Application Priority Data

Aug. 23, 2019   (KR) .................... 10-2019-0103526

(51) Int. Cl.
| | | |
|---|---|---|
| *G06Q 30/0601* | (2023.01) | |
| *G06F 3/01* | (2006.01) | |
| *G06F 18/214* | (2023.01) | |
| *G06F 40/58* | (2020.01) | |
| *G06V 20/20* | (2022.01) | |
| *G06V 40/20* | (2022.01) | |
| *G09B 5/06* | (2006.01) | |
| *G09B 19/00* | (2006.01) | |

(Continued)

(52) U.S. Cl.
CPC ......... *G06Q 30/0631* (2013.01); *G06F 3/012* (2013.01); *G06F 18/214* (2023.01); *G06F 40/58* (2020.01); *G06V 20/20* (2022.01); *G06V 40/23* (2022.01); *G09B 5/065* (2013.01); *G09B 19/003* (2013.01); *H04N 5/772* (2013.01); *H04N 23/65* (2023.01); *G09B 19/0038* (2013.01)

(58) Field of Classification Search
USPC ........................................................ 434/127
See application file for complete search history.

(56) References Cited

U.S. PATENT DOCUMENTS

| | | | |
|---|---|---|---|
| 10,521,669 B2 * | 12/2019 | Dayal | .................... G06V 10/70 |
| 2014/0172313 A1 * | 6/2014 | Rayner | .................. G16H 20/60 |
| | | | 702/19 |

(Continued)

FOREIGN PATENT DOCUMENTS

| | | |
|---|---|---|
| KR | 10-2015-0137307 | 12/2015 |
| KR | 10-2017-0141823 | 12/2017 |

OTHER PUBLICATIONS

Korean Intellectual Property Office Application No. 10-2019-0103526, Office Action dated Apr. 14, 2023, 4 pages.

*Primary Examiner* — Hung Q Dang
(74) *Attorney, Agent, or Firm* — Lee Hong Degerman Kang Waimey

(57) ABSTRACT

The present invention relates to an XR system and its control method, and more specifically, may be applied to 5G communication technology field, robot technology field, autonomous driving technology field and AI technology field. The XR system includes an XR device and a storage case that stores the XR device. The control method of the XR system includes recording and learning user experiences and providing a mate service to the user based on an image captured by a camera unit of the storage case and user information including the learned user experience.

10 Claims, 39 Drawing Sheets

(51) Int. Cl.
    *H04N 5/77*     (2006.01)
    *H04N 23/65*     (2023.01)
    *H04N 23/60*     (2023.01)
    *G06T 19/00*     (2011.01)
    *G02B 27/01*     (2006.01)
    *G06Q 50/10*     (2012.01)

(56) References Cited

U.S. PATENT DOCUMENTS

| | | | |
|---|---|---|---|
| 2019/0223660 A1* | 7/2019 | Shete | A47J 36/321 |
| 2020/0097087 A1* | 3/2020 | Oh | G06F 3/002 |
| 2020/0315259 A1* | 10/2020 | Hubbard | A24F 40/53 |

\* cited by examiner

FIG. 5
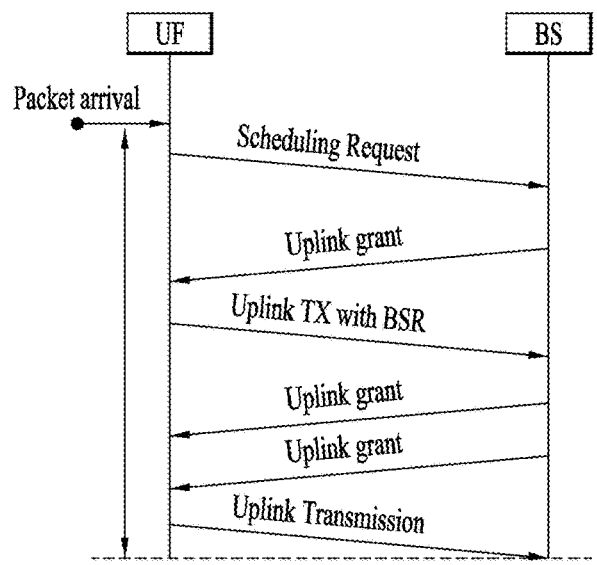
Fig. Uplink TX prcedure with grant
(a)
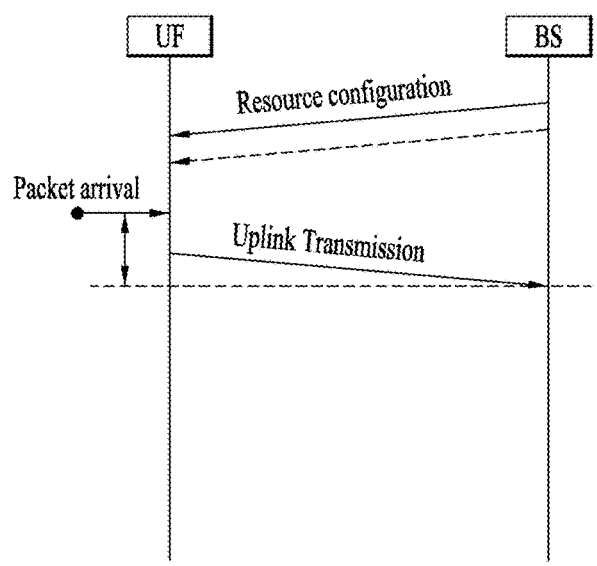
Fig. Uplink TX prcedure without grant
(b)

FIG. 24
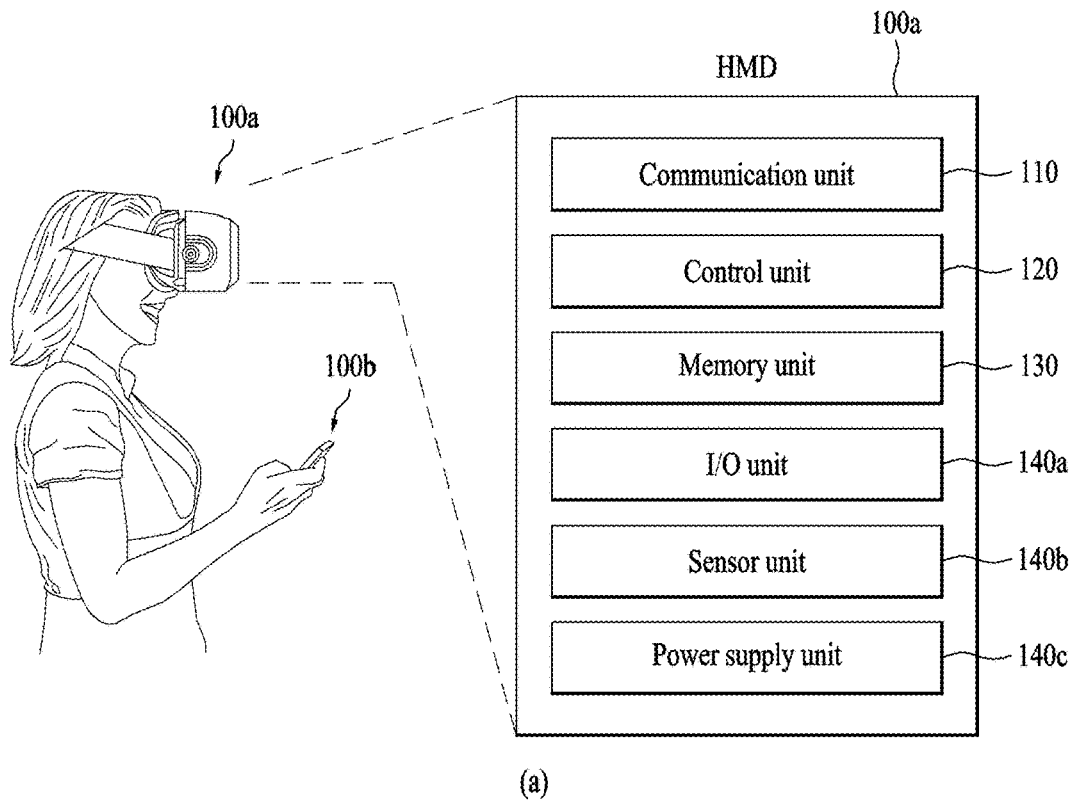
(a)
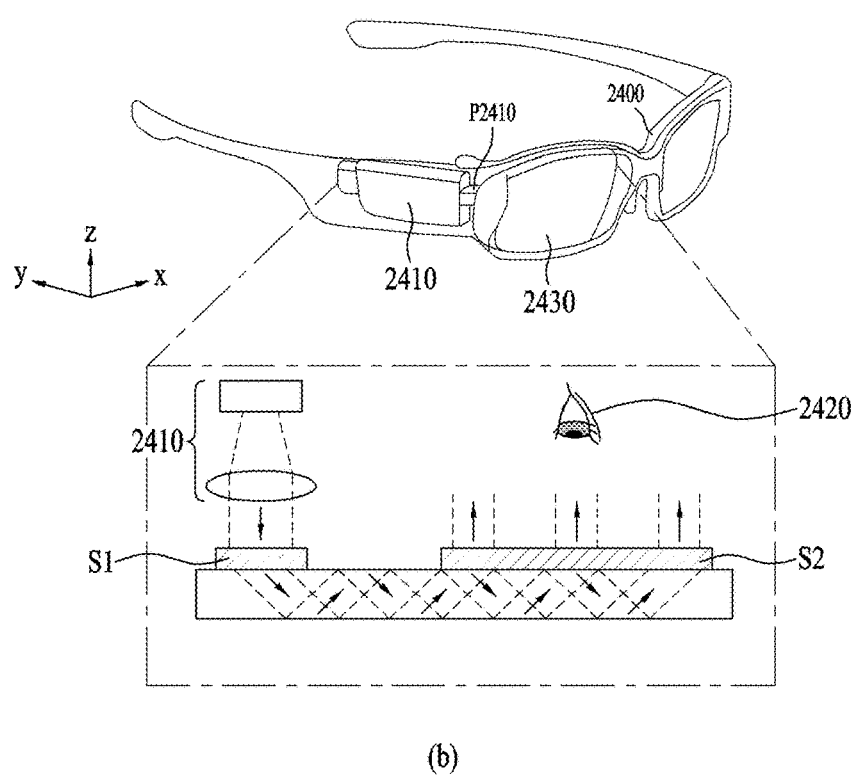
(b)

FIG. 32

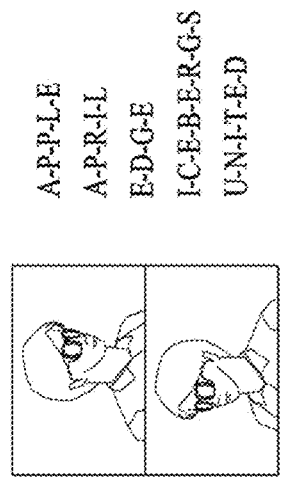

<Read English words to user>
Read words to user when the user is on the go or alone (a)

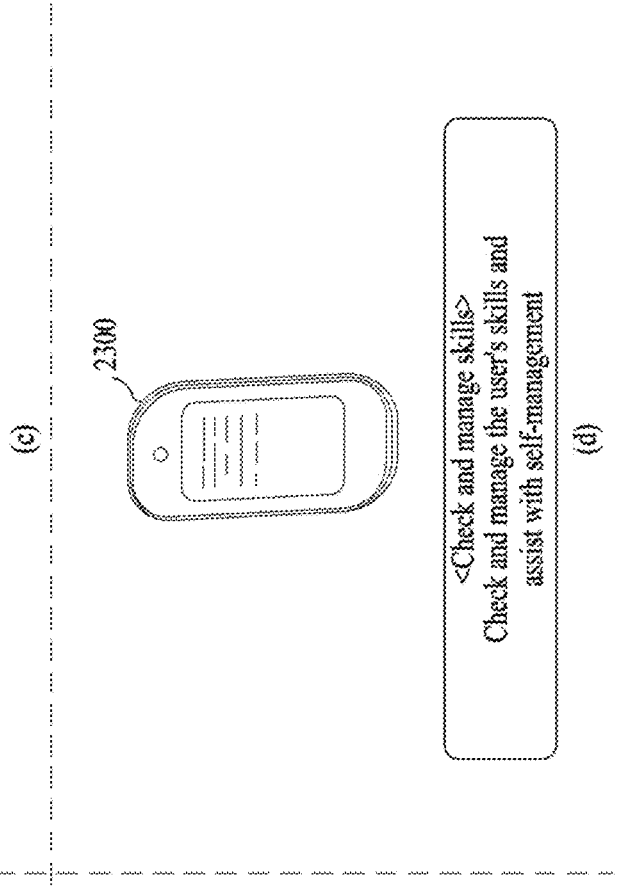

<Conversation>
Communicate with the user in English and act as
a tutor adapted to the user level (c)

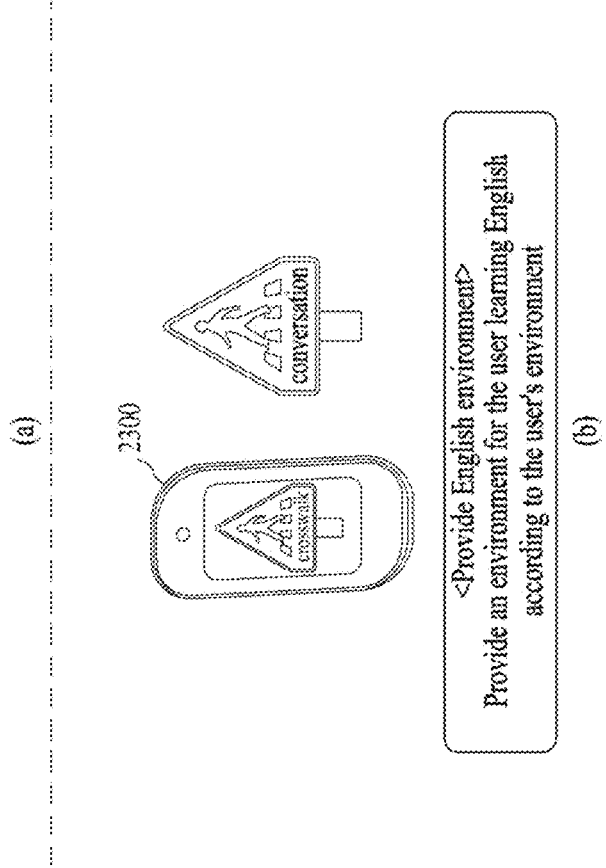

<Provide English environment>
Provide an environment for the user learning English
according to the user's environment (b)

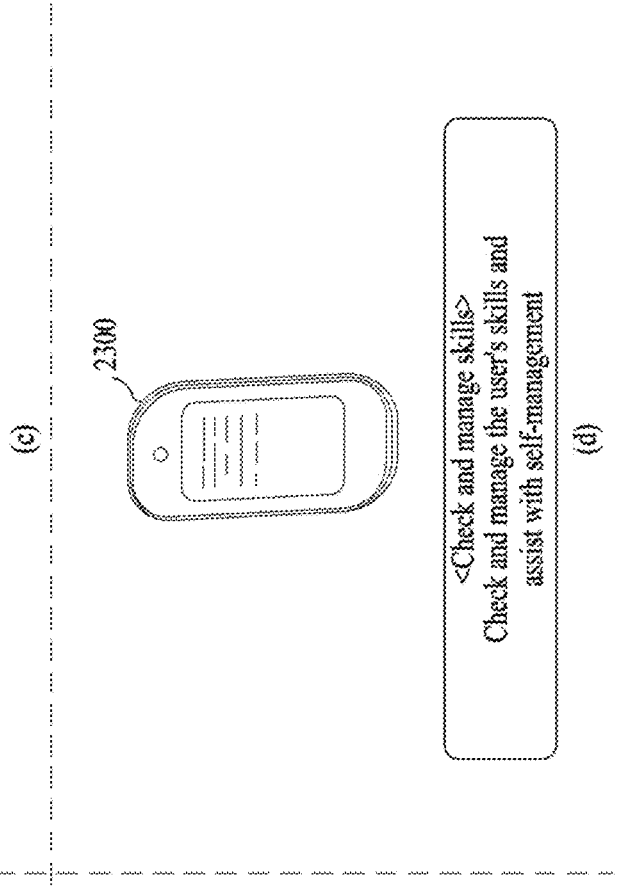

<Check and manage skills>
Check and manage the user's skills and
assist with self-management (d)

XR SYSTEM AND METHOD FOR CONTROLLING THE SAME

CROSS-REFERENCE TO RELATED APPLICATIONS

Pursuant to 35 U.S.C. § 119(a), this application claims the benefit of earlier filing date and right of priority to Korean Patent Application No. 10-2019-0103526, filed on Aug. 23, 2019, the contents of which are hereby incorporated by reference herein in its entirety.

BACKGROUND

1. Field

The present disclosure relates to an extended reality (XR) device for providing augmented reality (AR) mode and virtual reality (VR) mode and a method of controlling the same. More particularly, the present disclosure is applicable to all of the technical fields of 5th generation (5G) communication, robots, self-driving, and artificial intelligence (AI).

2. Description of Related Art

Virtual reality (VR) simulates objects or a background in the real world only in computer graphic (CG) images. Augmented reality (AR) is an overlay of virtual CG images on images of objects in the real world. Mixed reality (MR) is a CG technology of merging the real world with virtual objects. All of VR, AR and MR are collectively referred to shortly as extended reality (XR).

In general, the XR device is not always used. Thus, when the XR device is left unused or put in a bag or pocket when not in use, the XR device is easily scratched, contaminated, and more prone to failure. Thus, when not using the XR device, the user may keep the XR device in a separate storage case.

Further, the XR device needs to be charged continuously due to battery capacity limitations.

SUMMARY

A purpose of one embodiment of the present disclosure is to provide an XR system and a control method thereof in which a storage case for the XR device has a charging function such that the storage case can safely store the XR device when the XR device is not in use, as well as charge the XR device whenever the XR device needs to be charged.

Another purpose of one embodiment of the present disclosure is to provide an XR system and a control method thereof in which a display and camera may be mounted on the storage case of the XR device to extend the functionality of the XR device.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

In one aspect, there is proposed an extended reality (XR) system comprising: an XR device; and a storage case for storing the XR device therein, wherein the storage case includes: a first power supply unit having a battery to supply power; a camera unit for capturing an image; a first display unit; a first communication module for communicating with at least the XR device or an external server; and a first control unit for controlling components of the storage case, wherein the XR device includes: a second power supply unit chargeable with power provided from the first power supply unit of the storage case; a second display unit; a second communication module for communicating with at least the storage case or an external server; a learning processor for recording and learning user experiences; and a second control unit for controlling components of the XR device, wherein at least one of the first control unit and the second control unit controls corresponding components to provide a mate service to an user based on an image captured by the camera unit of the storage case and user information including the learned user experiences.

In one implementation of the XR system, when the user cooks, cooking materials prepared by the user and a cooking process of the user are captured by the camera unit of the storage case, wherein at least one of the first control unit and the second control unit controls corresponding components to compare and analyze the captured material and process images, a cooking recipe, and learned user experiences to provide a mate service to guide the cooking process to the user, wherein when the user's cooking is completed, the captured cooking materials, the captured cooking process, and guide contents are recorded and are learned as the user experiences by the learning processor.

In one implementation of the XR system, when the user plays sports, the user pose for the sports is captured by the camera unit of the storage case, wherein at least one of the first control unit and the second control unit controls corresponding components to compare and analyze the captured pose image, a reference pose for the sports, and learned user experiences to provide a mate service to coach the user's pose, wherein the captured user poses and coaching contents are recorded and are learned as the user experiences by the learning processor.

In one implementation of the XR system, when the user is moving, at least one of the first control unit and the second control unit controls corresponding components to provide a mate service in which information about surrounding locations around the user along with moving directions and user product order guidance are provided to the user based on learned user experiences and user schedule information, and the product selected by the user is ordered via communication with an external server, wherein when the user order is completed and receives the ordered product and then arrives at a final destination, the user schedule information, the surrounding locations information, the order information and the moving directions information are recorded and learned as the user experiences by the learning processor.

In one implementation of the XR system, at least one of the first control unit and the second control unit controls corresponding components to provide a mate service for guiding the user's fashion based on a user image captured by the camera unit of the storage case, user schedule information, and the learned user experiences, wherein the captured user image, user schedule information, and, the fashion information selected by the user are recorded and learned as the user experiences by the learning processor.

In one implementation of the XR system, at least one of the first control unit and the second control unit controls corresponding components to provide a mate service in which characters of a first language captured by the camera unit of the storage case are converted to characters of a second language different from the first language and selected by the user and then the converted characters are displayed on the first display unit of the storage case.

In one implementation of the XR system, the storage case further includes a recording unit having a recording function, wherein when multiple people attend a meeting, the camera unit and the recording unit of the storage case capture the meeting participants and record meeting contents respectively, wherein when the meeting ends, at least one of the first control unit and the second control unit controls corresponding components to provide a mate service in which the recorded contents are classified and the meeting contents are organized for each of attendees based on the captured image and the recorded contents to create an attendee-specific meeting record.

In one implementation of the XR system, the storage case further includes a recording unit having a recording function, wherein when a plurality of people attend a seminar and present presentations, the camera unit and the recording unit of the storage case image and record presenters and presentation contents respectively, wherein when the presentation ends, at least one of the first control unit and the second control unit controls corresponding components to provide a mate service in which the presentation contents are organized for each of the presenters based on the captured image and the recorded contents to create a presenter-specific presentation record.

In one implementation of the XR system, the storage case further includes a recording unit having a recording function, wherein when the user is practicing presentation, appearance and contents about the user's presentation practice are captured and recorded by the camera unit and recording unit of the storage case respectively, wherein at least one of the first control unit and the second control unit controls corresponding components to compare and analyze the captured image and recorded contents, reference presentation information, and learned user experiences and to provide a mate service to guide the user's presentation preparation based on the comparing and analyzing results, wherein the captured user image and presentation preparation guide contents are recorded and learned as the user experience by the learning processor.

In one implementation of the XR system, the storage case further includes a recording unit having a recording function, wherein when the user is listening to a lecture, a lecturing appearance of a teacher and lecture contents are captured and recorded by the camera unit and recording unit of the storage case respectively, wherein at an end of the lecture, at least one of the first control unit and the second control unit controls corresponding components to provide a mate service in which the lecture contents of the teacher are organized based on the captured image and recorded contents to create a teacher-specific lecture record.

In another aspect, there is proposed a method for controlling an extended reality (XR) system including an XR device and a storage case for storing the XR device therein, the method comprising: recording and learning a user experience; and providing a mate service to the user based on an image captured by the camera unit of the storage case and user information including the learned user experience.

In one implementation of the method, providing the mate service includes: when the user cooks, capturing a cooking material prepared by the user and a cooking process of the user using the camera unit of the storage case; and comparing and analyzing the captured images, a cooking recipe, and the learned user experiences to provide the user with a mate service to guide the cooking process based on the comparing and analyzing results, when the user's cooking process is completed, the captured cooking material, the captured cooking process, and the guide contents are recorded and are learned as the user experience.

In one implementation of the method, providing the mate service includes: when the user plays sports, capturing the user pose for the sports by the camera unit of the storage case; and comparing and analyzing the captured image, a reference pose of the sports, and the learned user experience to provide a mate service to coach the user's pose based on the comparing and analyzing results, wherein the captured user poses and coaching contents are recorded and learned as the user experience.

In one implementation of the method, providing the mate service includes: when the user is moving, providing information about surrounding locations around the user together with moving directions and guiding the user order based on the learned user experience and user schedule information; and providing a mate service allowing the user to order a selected product, wherein when the user order is completed and the user receives the ordered product and then the user arrives at a final destination, the user schedule information, the surrounding information, the order information, and the directions information are recorded and learned as the user experience.

In one implementation of the method, providing the mate service includes: providing a mate service for guiding the user's fashion based on a user image captured by the camera unit of the storage case, user schedule information, and the learned user experiences, wherein the captured user image, user schedule information, and, the fashion information selected by the user are recorded and learned as the user experiences.

In one implementation of the method, providing the mate service includes: providing a mate service in which characters of a first language captured by the camera unit of the storage case are converted to characters of a second language different from the first language and selected by the user and then the converted characters are displayed on a display unit of the storage case.

In one implementation of the method, providing the mate service includes: when multiple people attend a meeting, capturing the meeting participants and recording meeting contents respectively using the camera unit and a recording unit of the storage case; and when the meeting ends, providing a mate service in which the recorded contents are classified and the meeting contents are organized for each of attendees based on the captured image and the recorded contents to create an attendee-specific meeting record.

In one implementation of the method, providing the mate service includes: when a plurality of people attend a seminar and present presentations, capturing and recording presenters and presentation contents respectively using the camera unit and a recording unit of the storage case; and when the presentation ends, providing a mate service in which the presentation contents are organized for each of the presenters based on the captured image and the recorded contents to create a presenter-specific presentation record.

In one implementation of the method, providing the mate service includes: when the user is practicing presentation, capturing and recording appearance and contents about the user's presentation practice using the camera unit and a recording unit of the storage case respectively; and comparing and analyzing the captured image and recorded contents, reference presentation information, and learned user experiences and to provide a mate service to guide the user's presentation preparation based on the comparing and analyzing results, wherein the captured user image and presentation preparation guide contents are recorded and learned as the user experience.

In one implementation of the method, providing the mate service includes: when the user is listening to a lecture, capturing and recording a lecturing appearance of a teacher and lecture contents by the camera unit and a recording unit of the storage case respectively; and when the lecture is terminated, providing a mate service in which the lecture contents of the teacher are organized based on the captured image and recorded contents to create a teacher-specific lecture record.

Effects of the present disclosure are as follows but are not limited thereto.

In accordance with the present disclosure, a storage case that stores the XR device may charge the XR device. Thus, the storage case has the inherent function of protecting the XR device, but also serves as a spare battery, thereby enhancing user convenience.

In particular, in accordance with the present disclosure, an XR device may be charged using the storage case. Thus, the XR device may be equipped with a low-capacity, lightweight battery. In this way, since the weight of the XR device may be reduced, the fatigue delivered to the user due to the weight of the XR device when the XR device is worn on the user may be reduced.

In accordance with the present disclosure, a storage case that stores the XR device has a display and one or more cameras, which may support or extend the function of the XR device. Thus, information to be processed by the XR device may be reduced, such that an use time of the XR device may be increased.

In accordance with the present disclosure, the storage case, XR device, and AI may enable the user to receive analysis and coaching on user posture in sports such as golf. Thus, the user had a personal coach.

In accordance with the present disclosure, the storage case, XR device, and AI may enable the user to be trained for cooking preparation and process. Thus, the user has a cooking expert.

In accordance with the present disclosure, the storage case, XR device, and AI may enable the user to get advice on fashion. Thus, the user has a fashion coordinator.

In accordance with the present disclosure, the storage case, XR device, and AI may be used to pre-learn a lifestyle or life pattern of the user and to provide information about surroundings to the user based on the learned lifestyle or life pattern and to guide the user action. Thus, the user may have a secretary. Further, the user's daily life becomes more convenient and the user's life becomes more effective.

In addition to the effects as described above, specific effects of the present disclosure are described together with specific details for carrying out the invention.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 5 is a diagram illustrating exemplary uplink (UL) transmission based on a UL grant;

Figure 8:
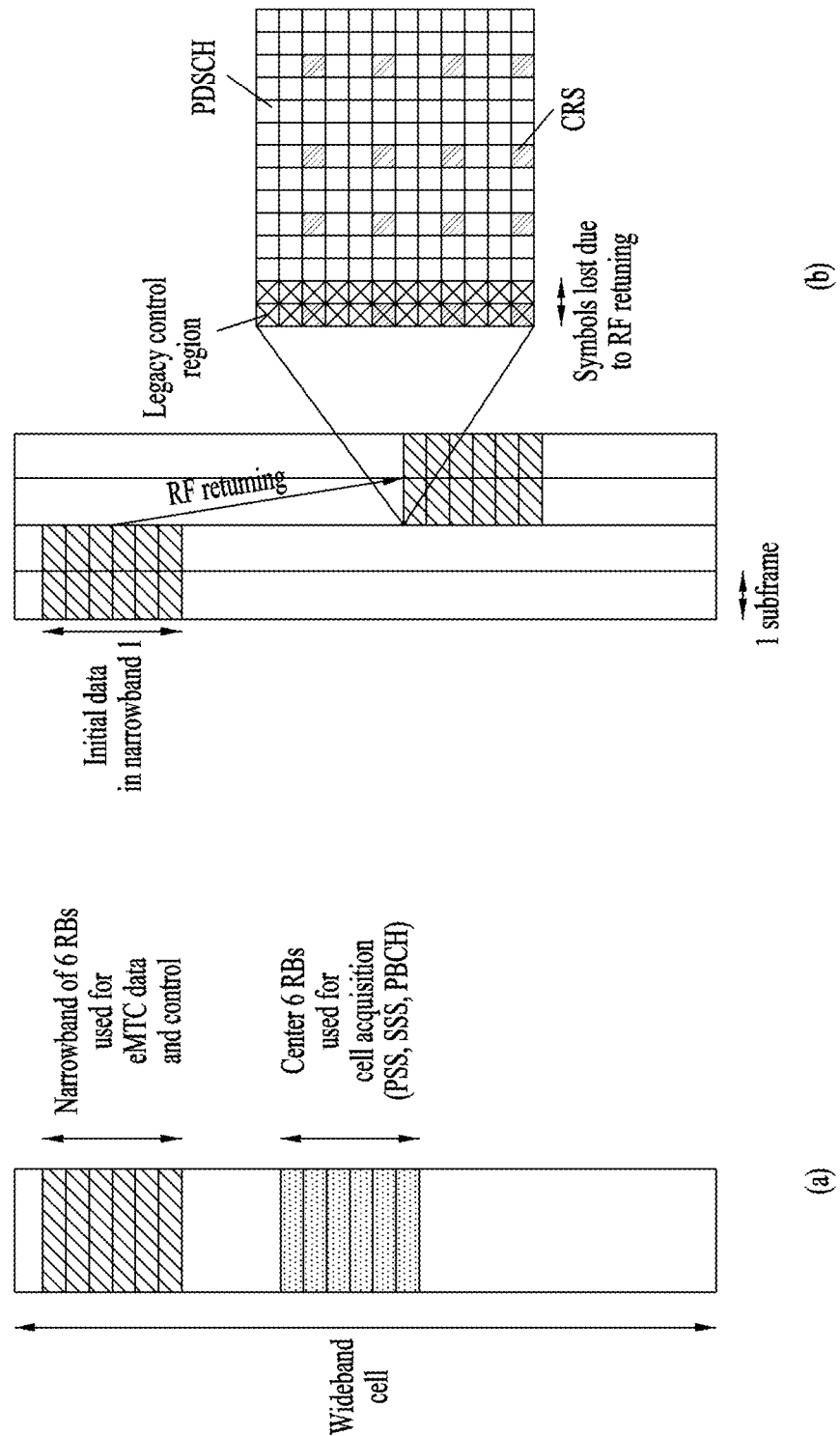
Figure 9:
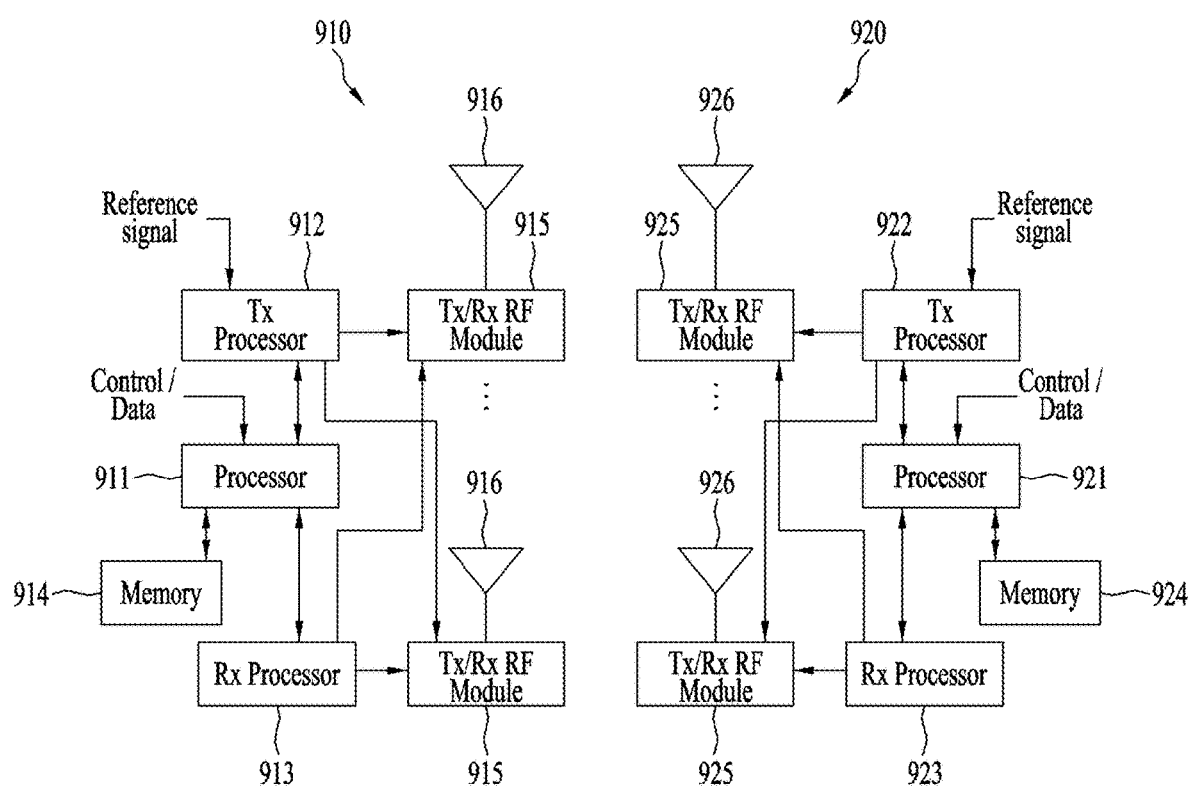
Figure 10:
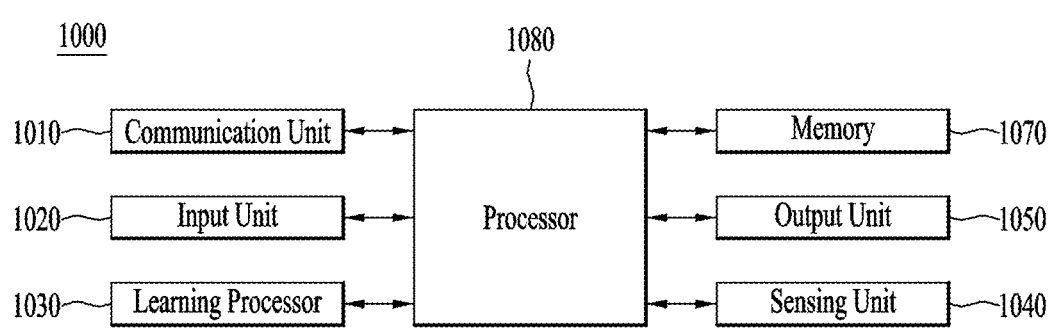
Figure 11:
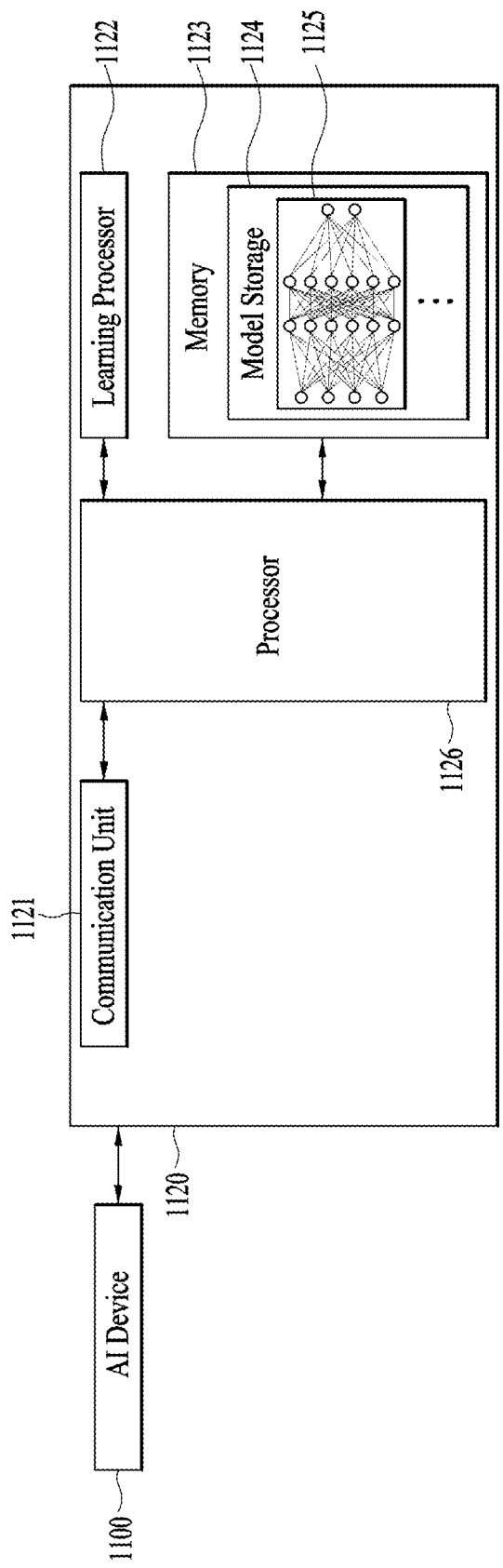
Figure 12:
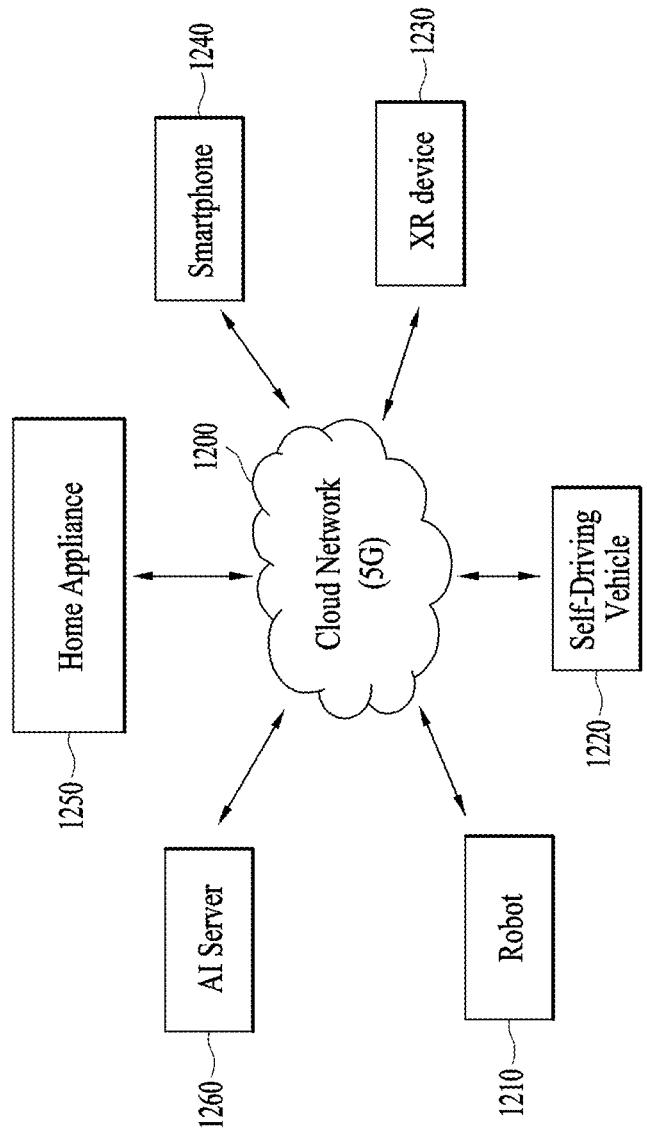
Figure 13:
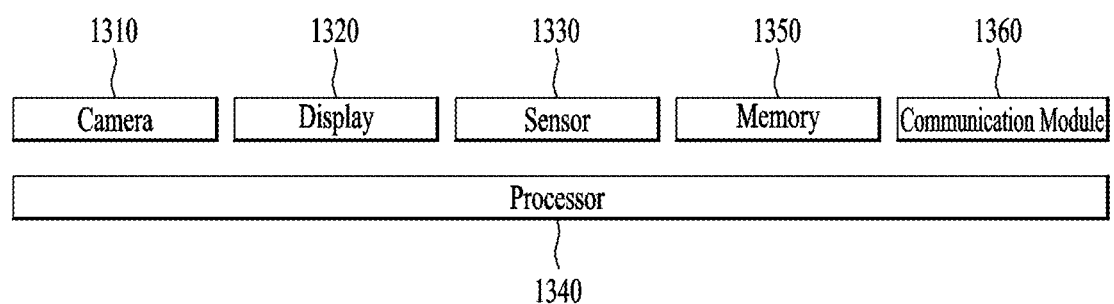
Figure 14:
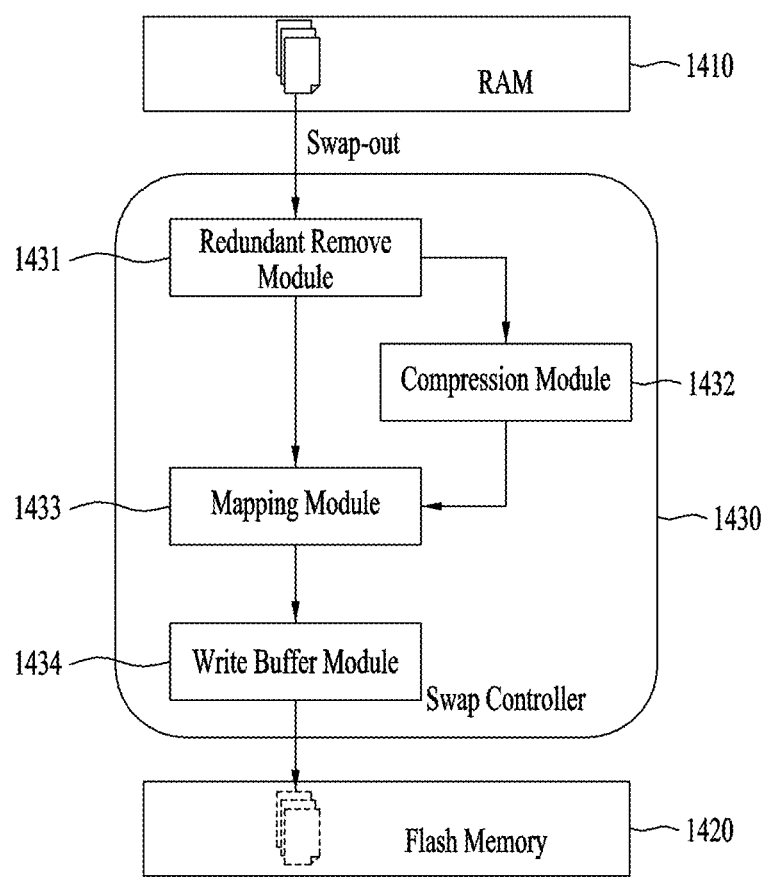
Figure 15:
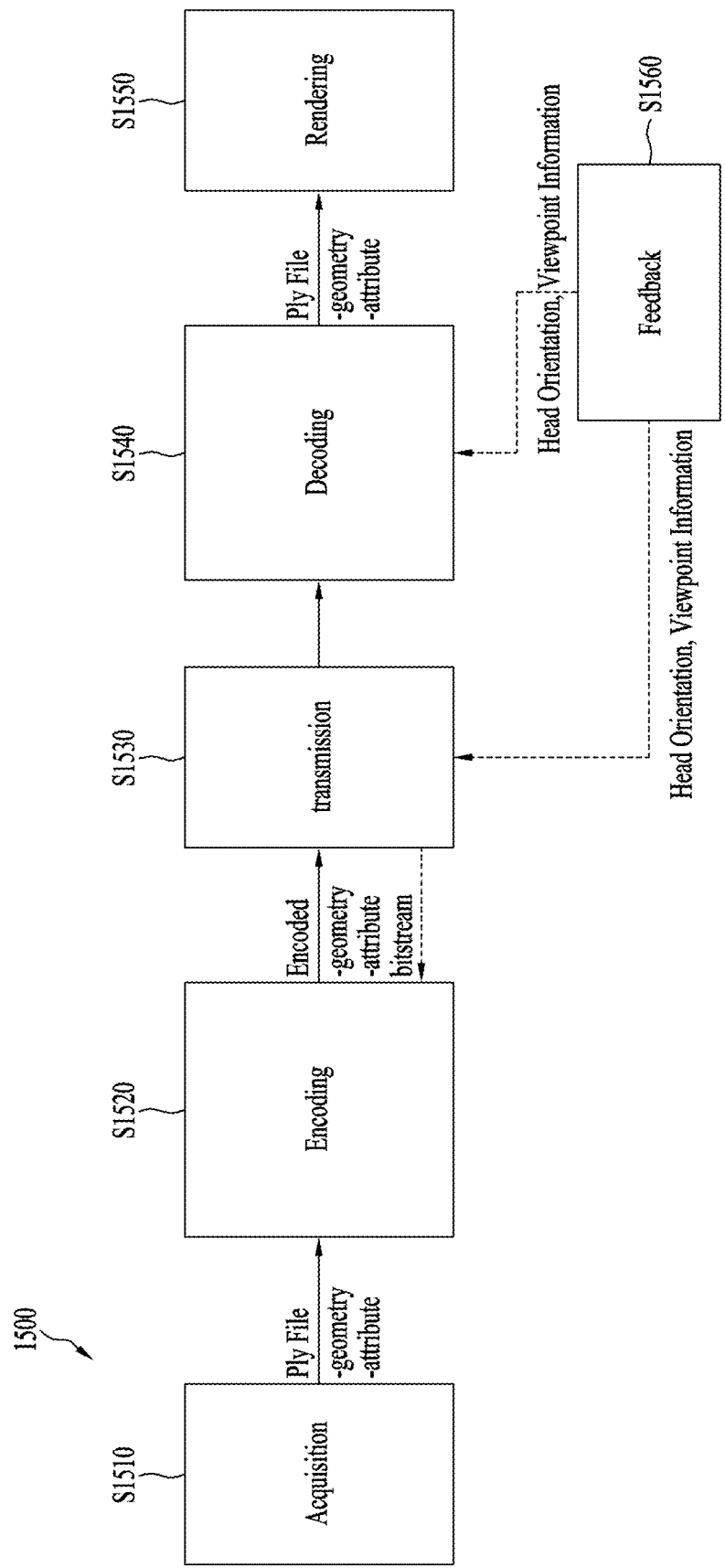
Figure 16:
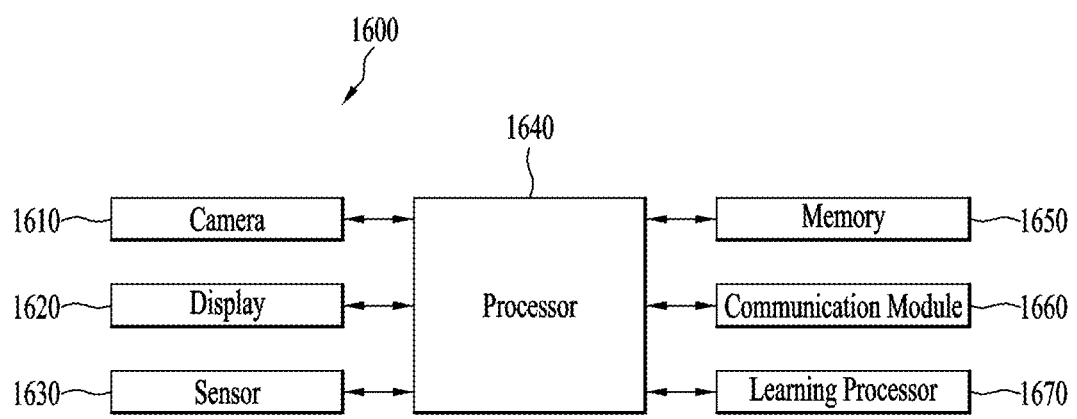
Figure 17:
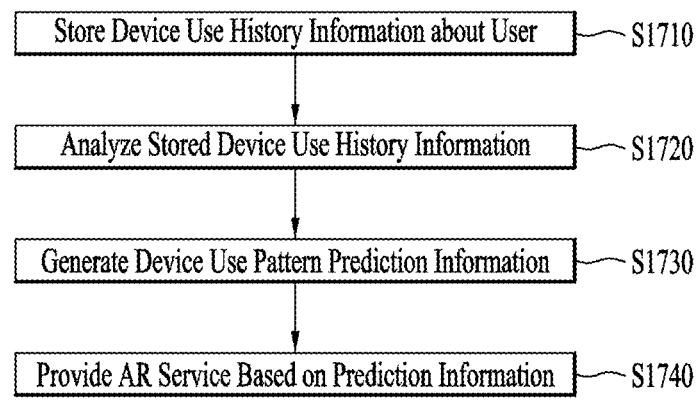
Figure 18:
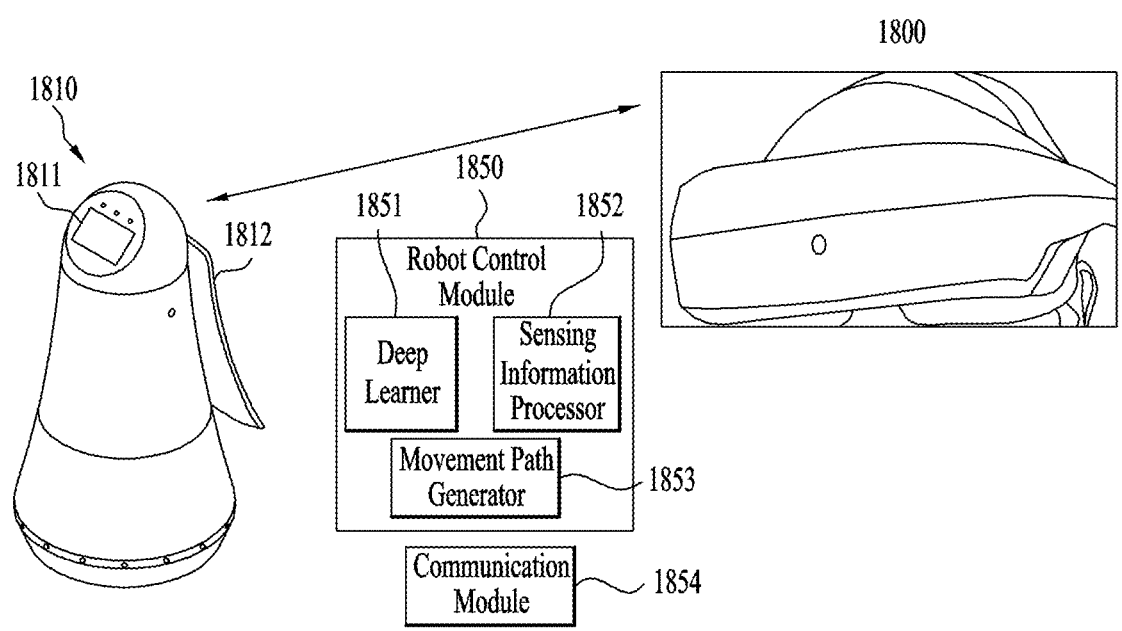
Figure 19:
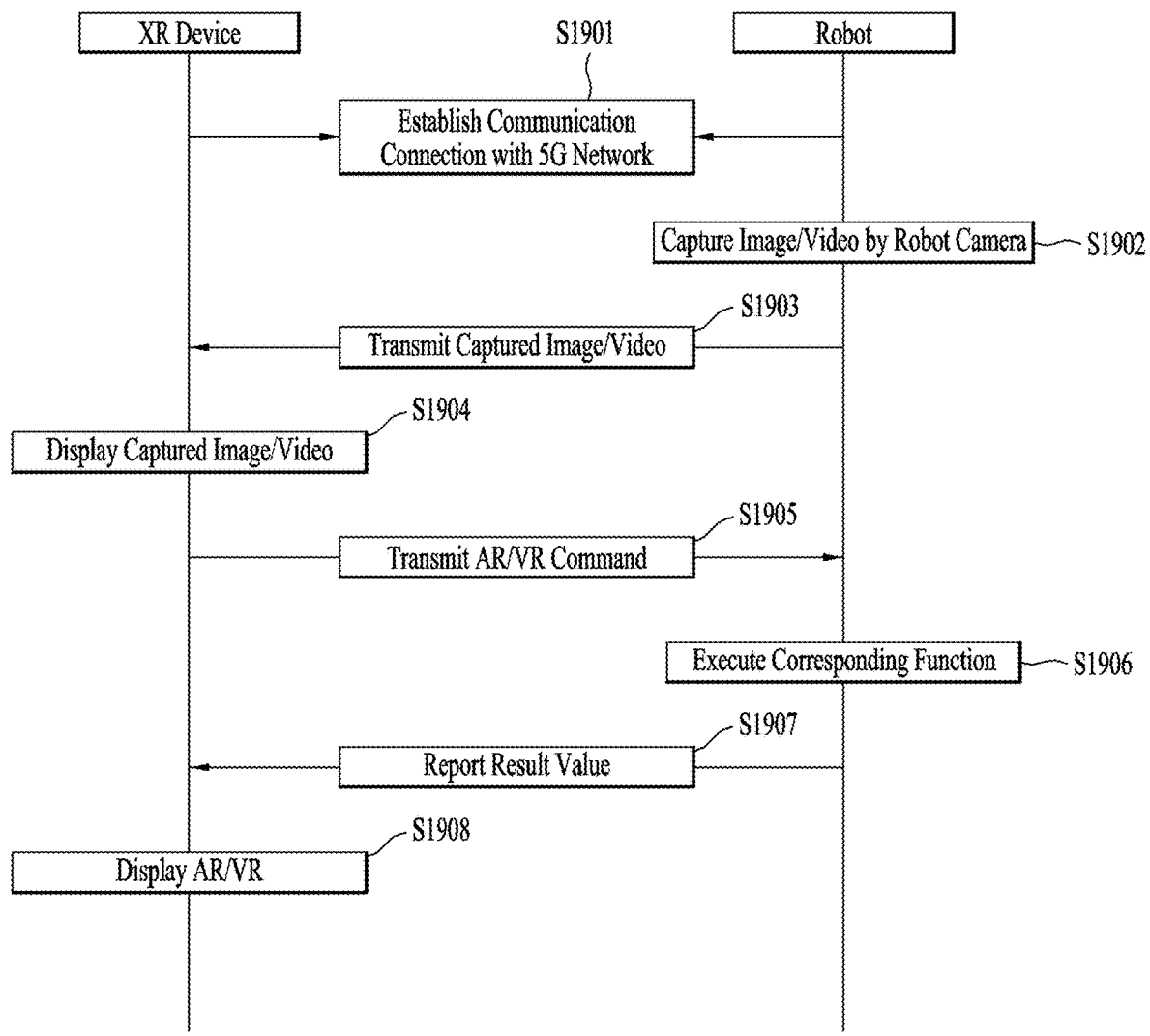
Figure 20:
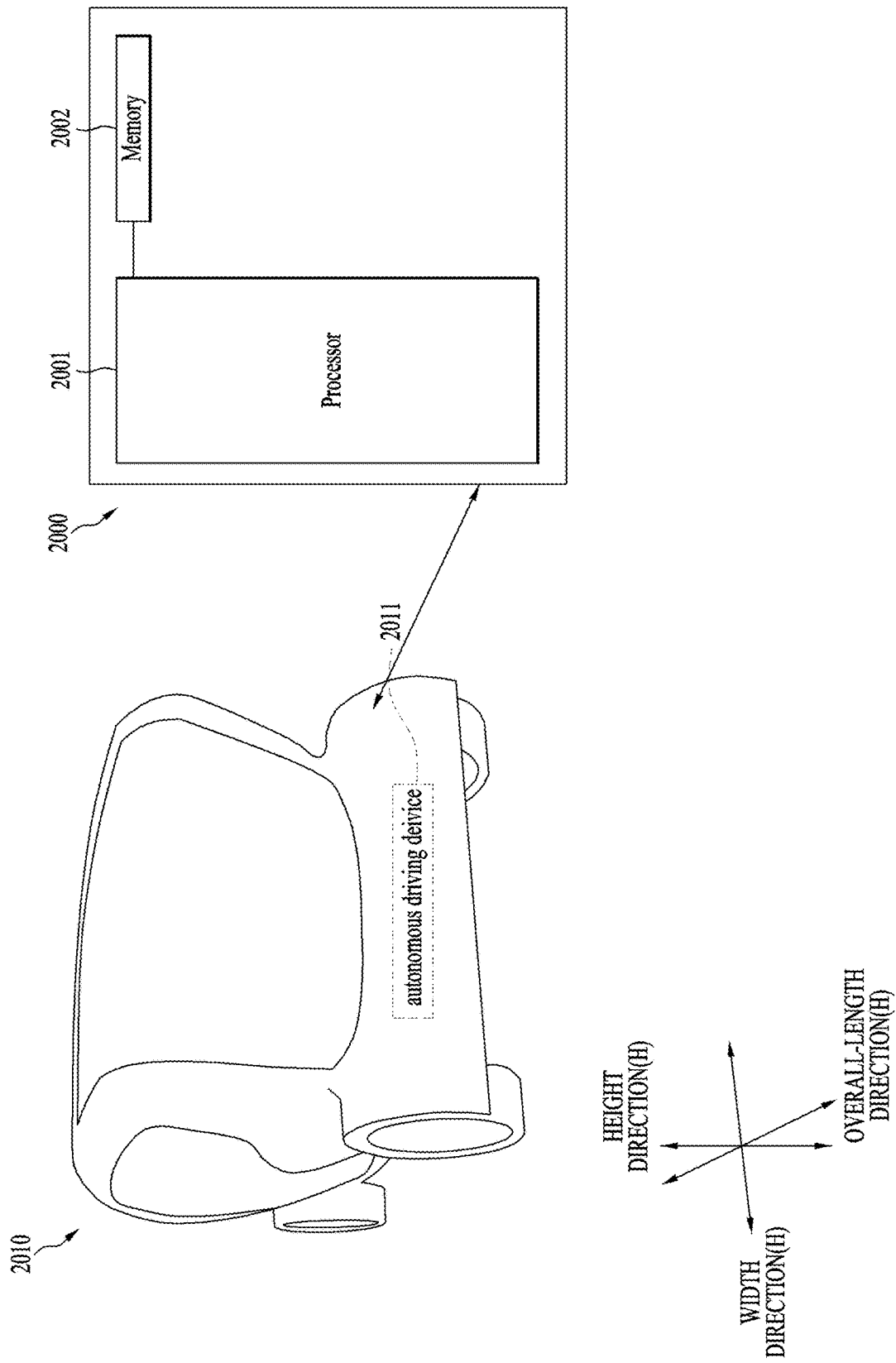
Figure 21:
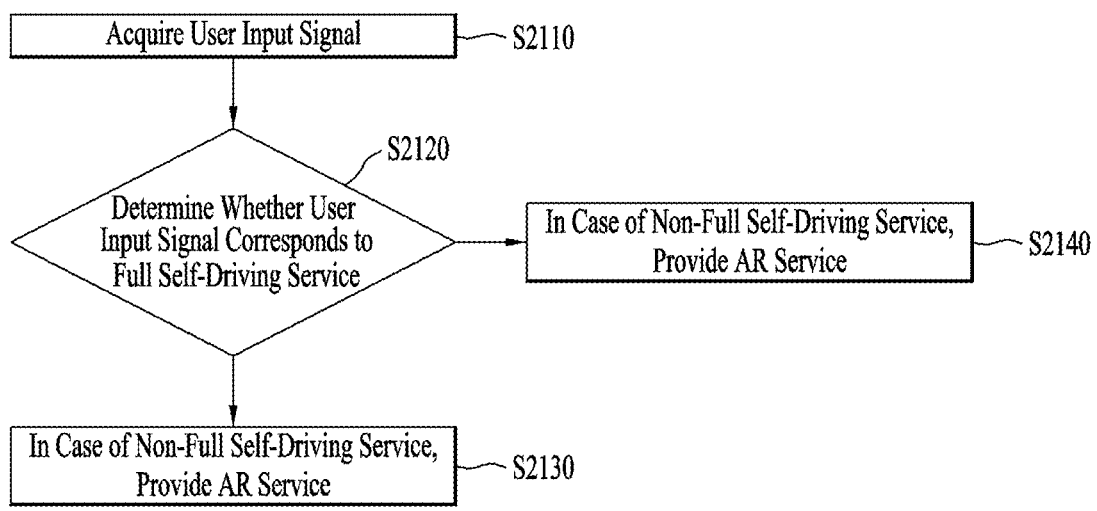
Figure 22:
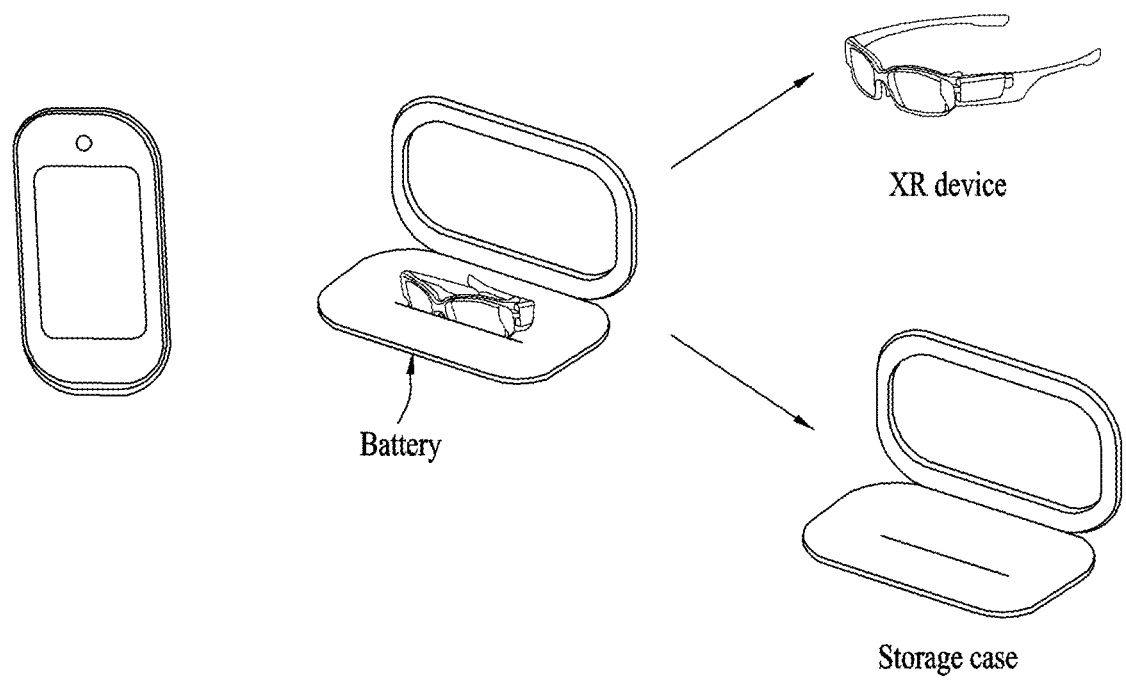
Figure 23:
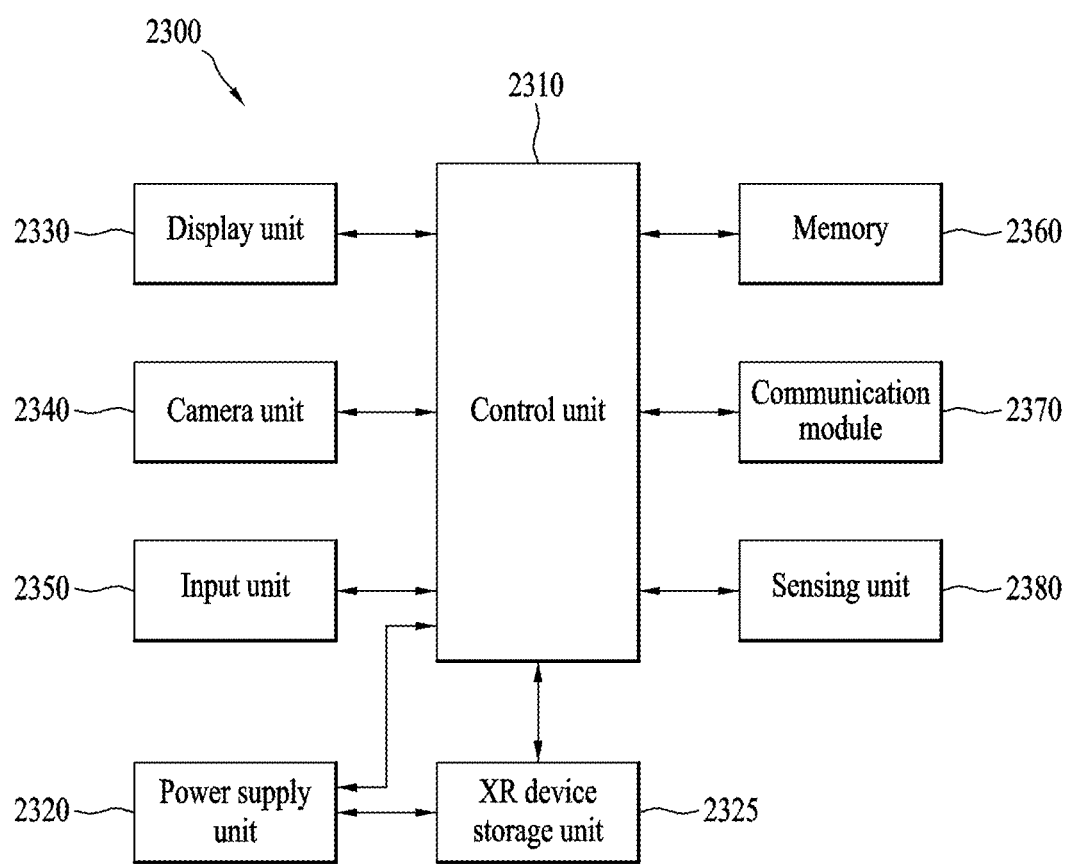
Figure 25:
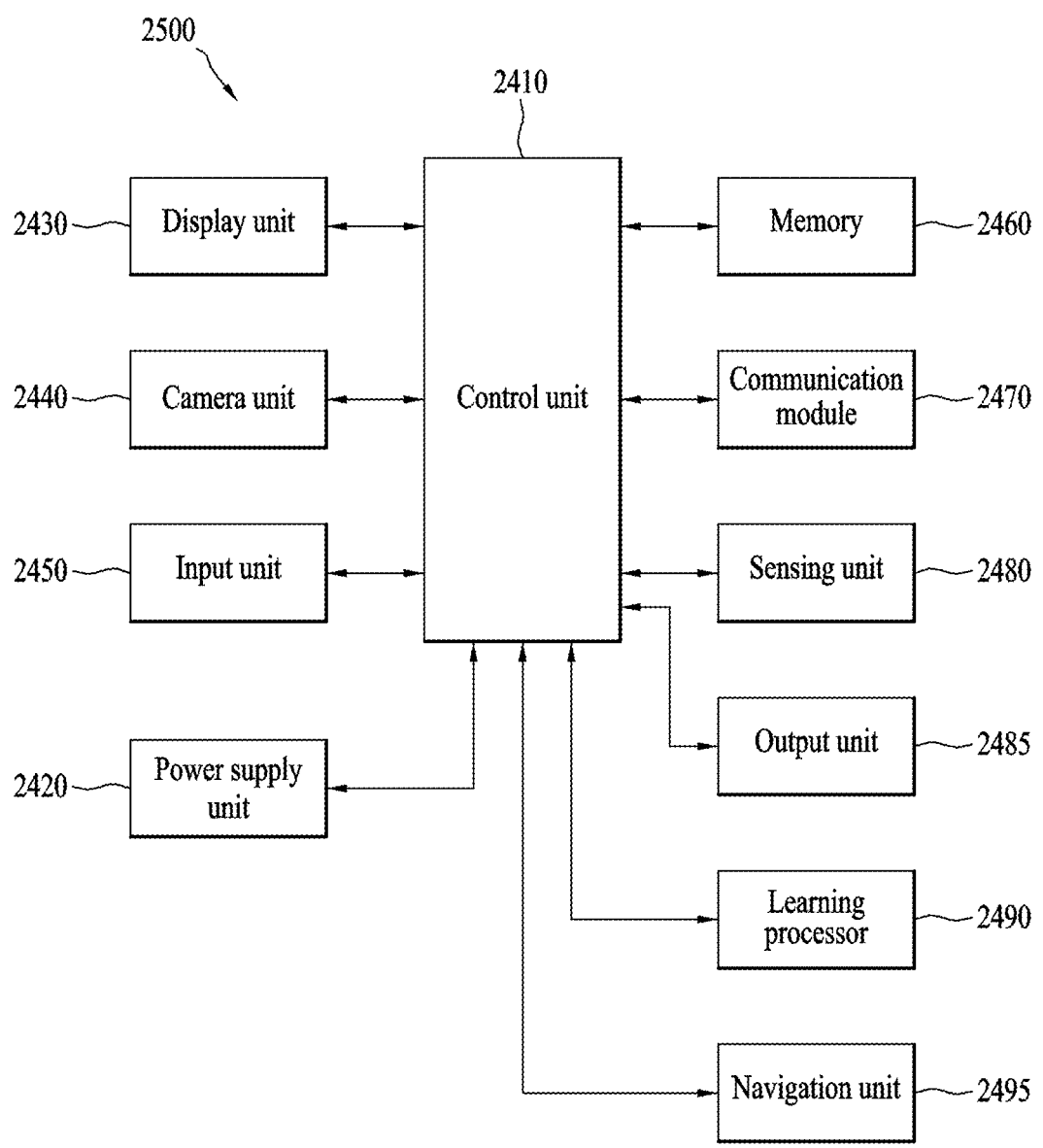
Figure 26:
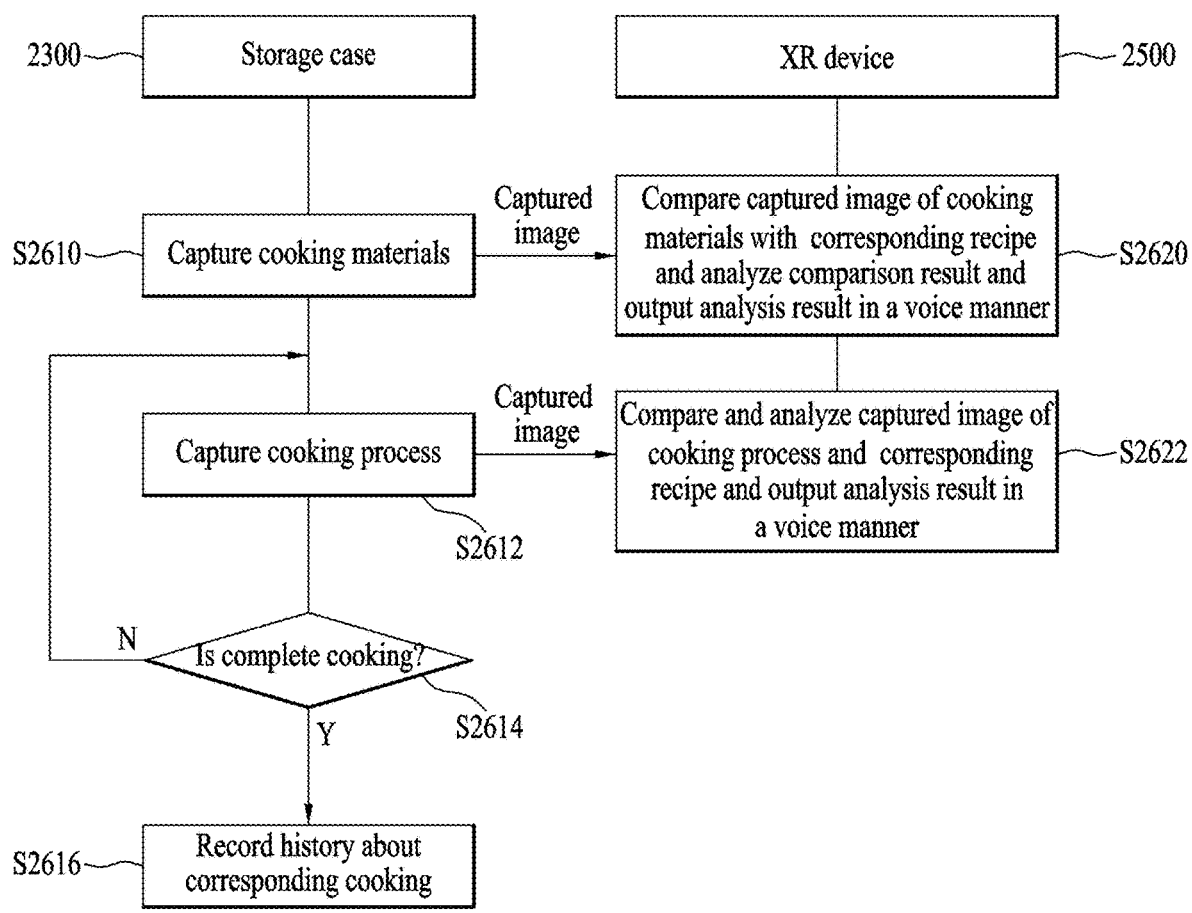
Figure 27:
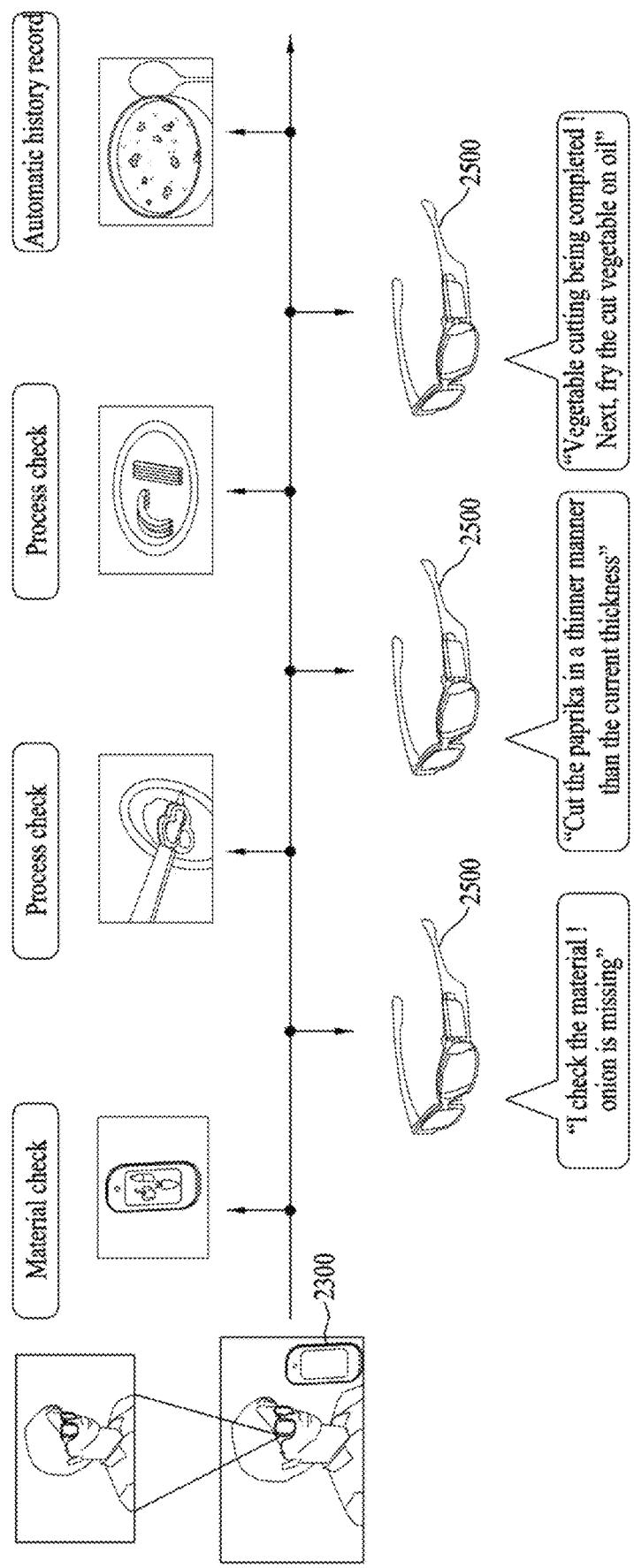
Figure 28:
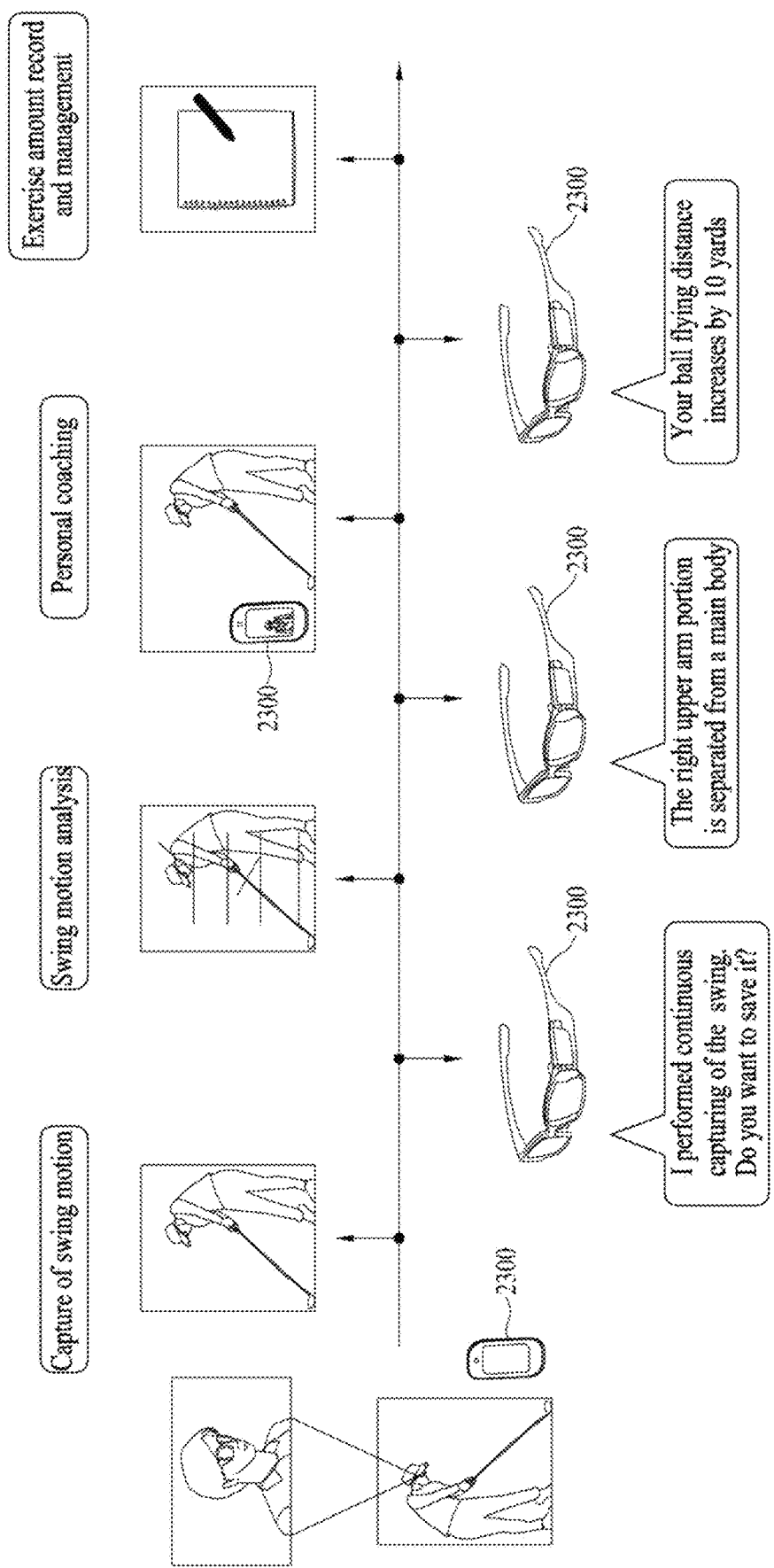
Figure 29:
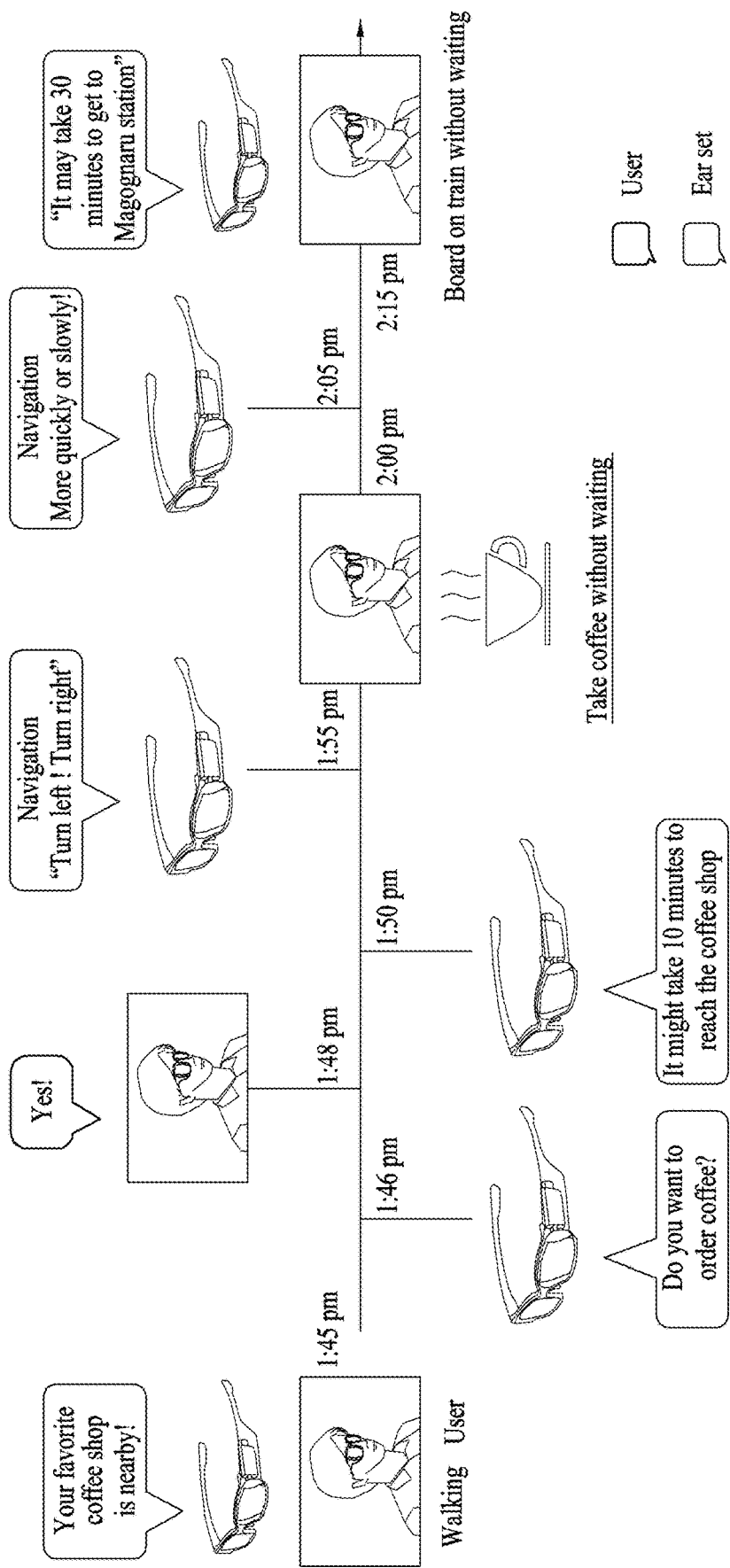
Figure 30:
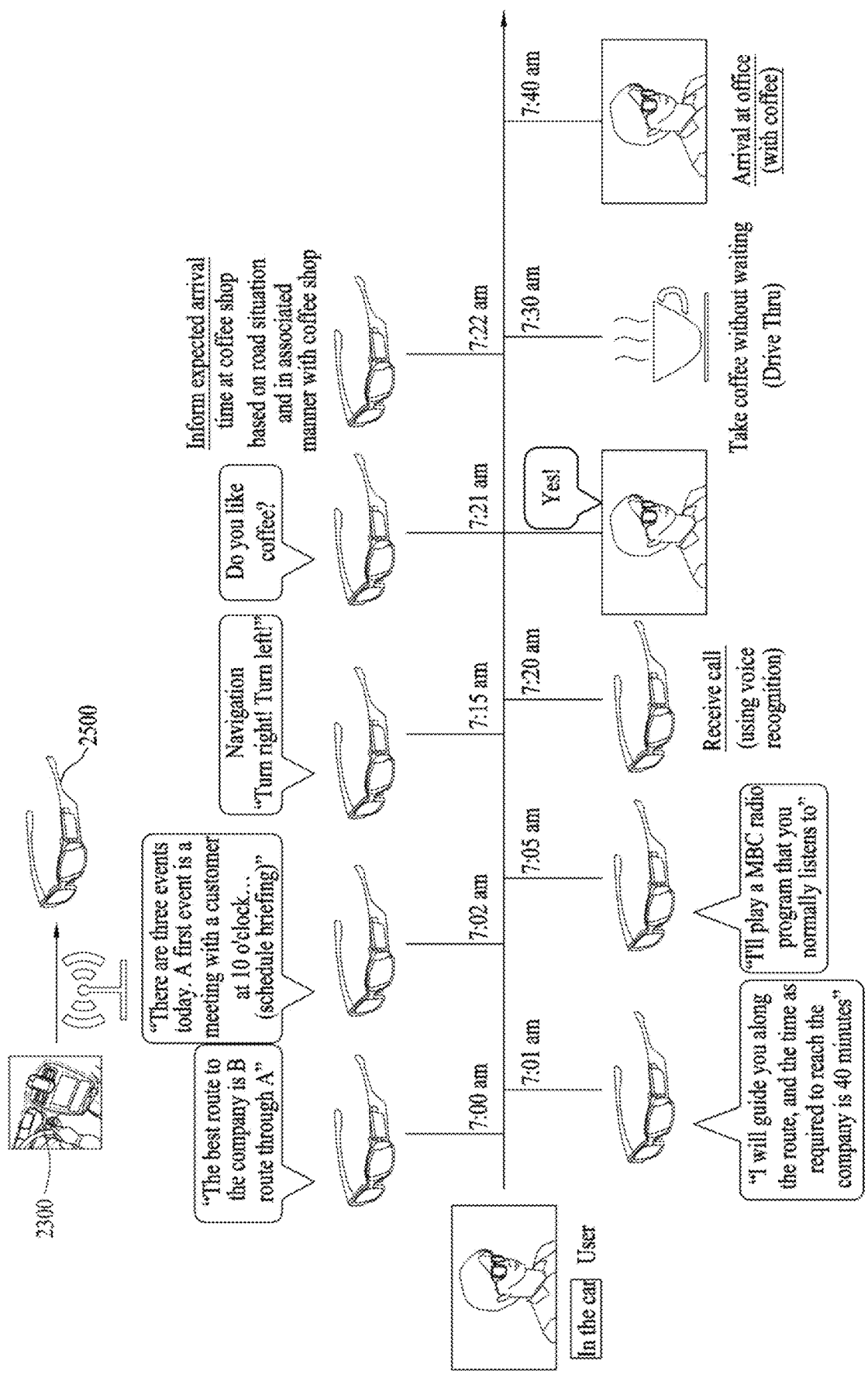
Figure 31:
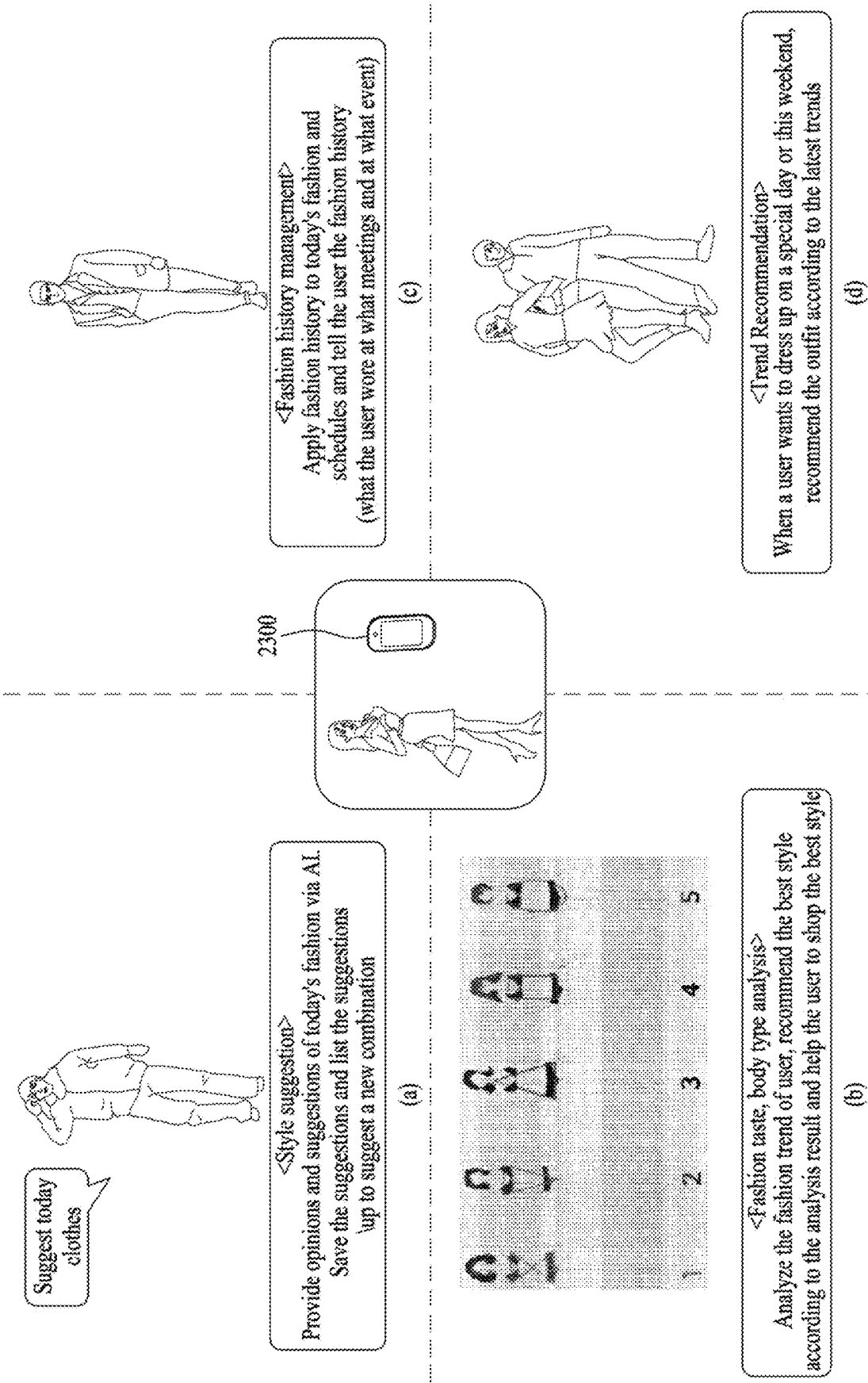
Figure 33:
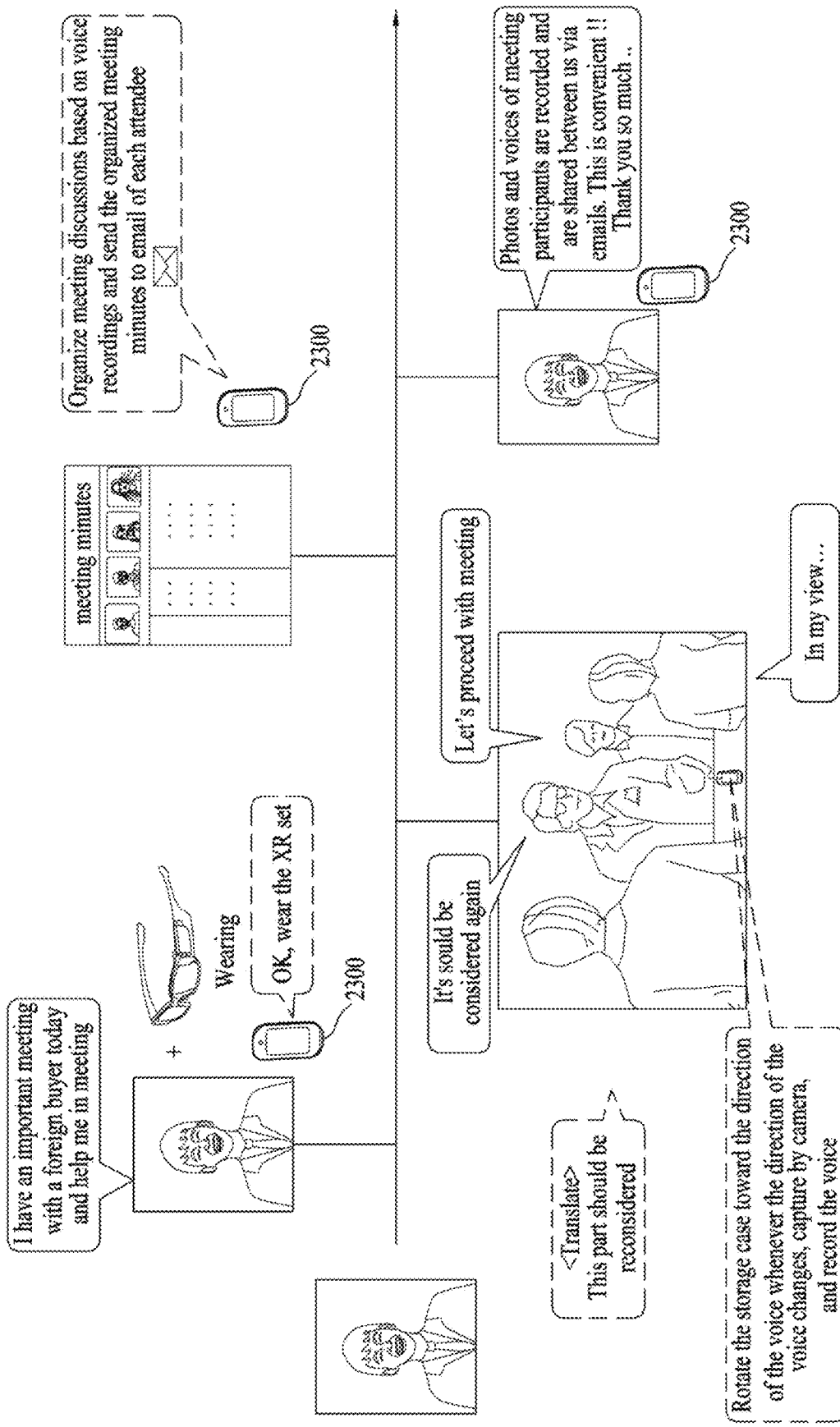
Figure 34:
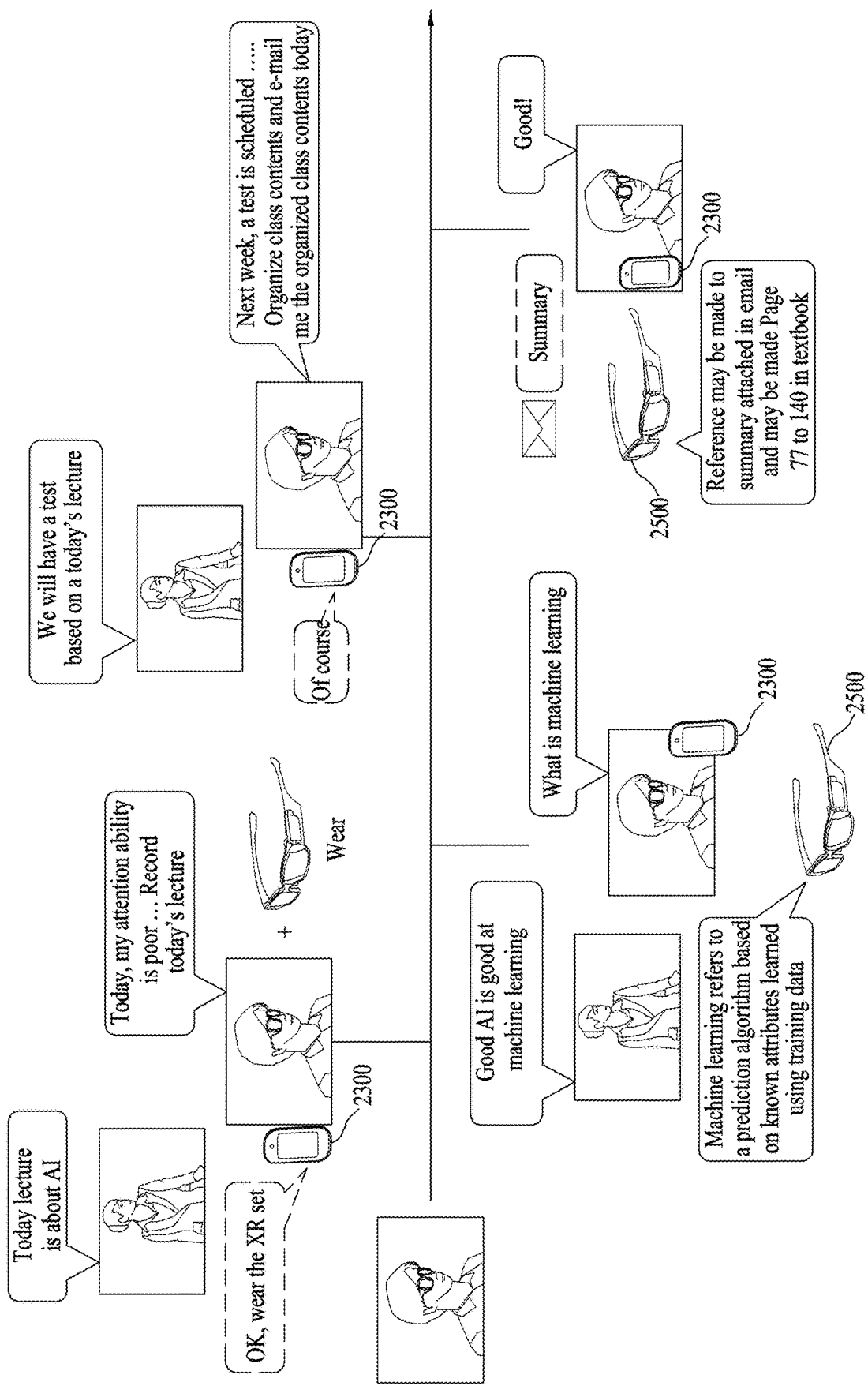
Figure 35:
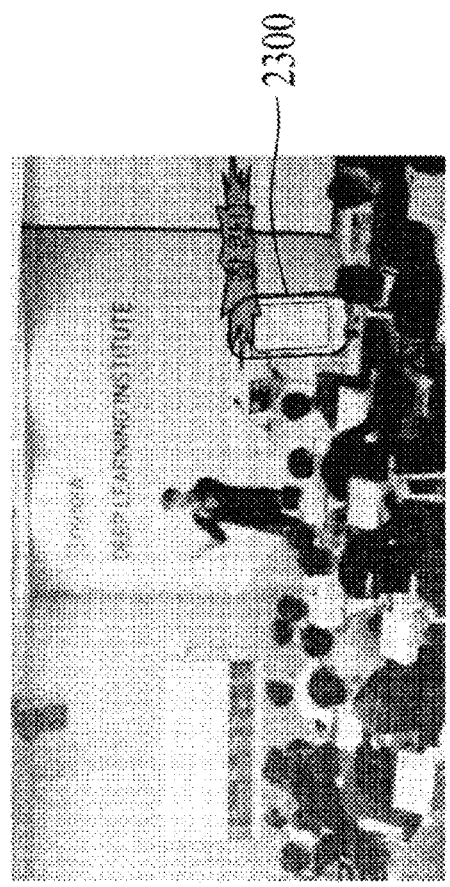
Figure 36:
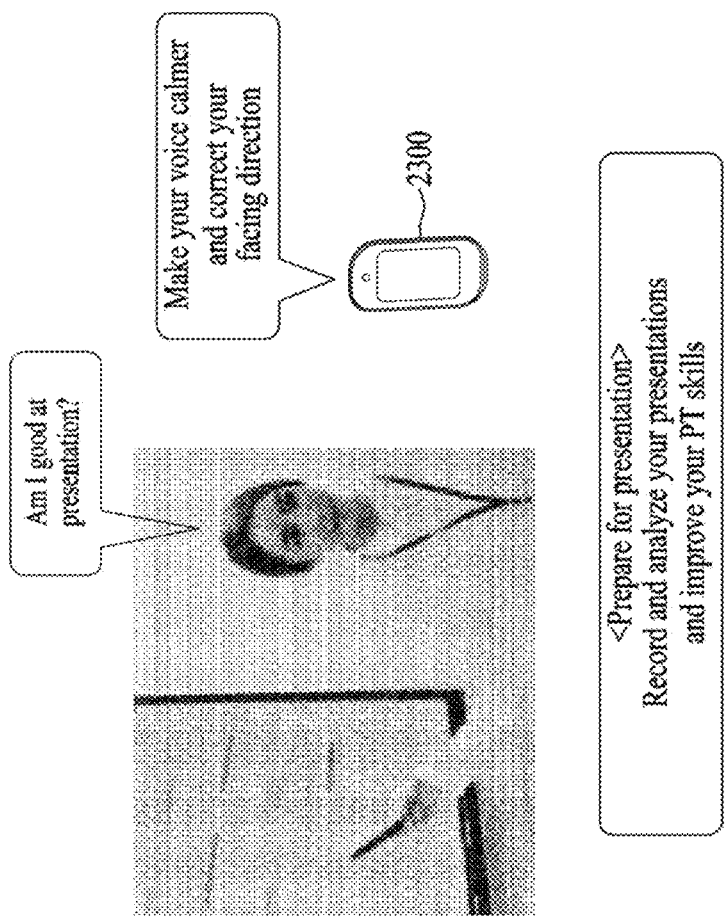
Figure 37:
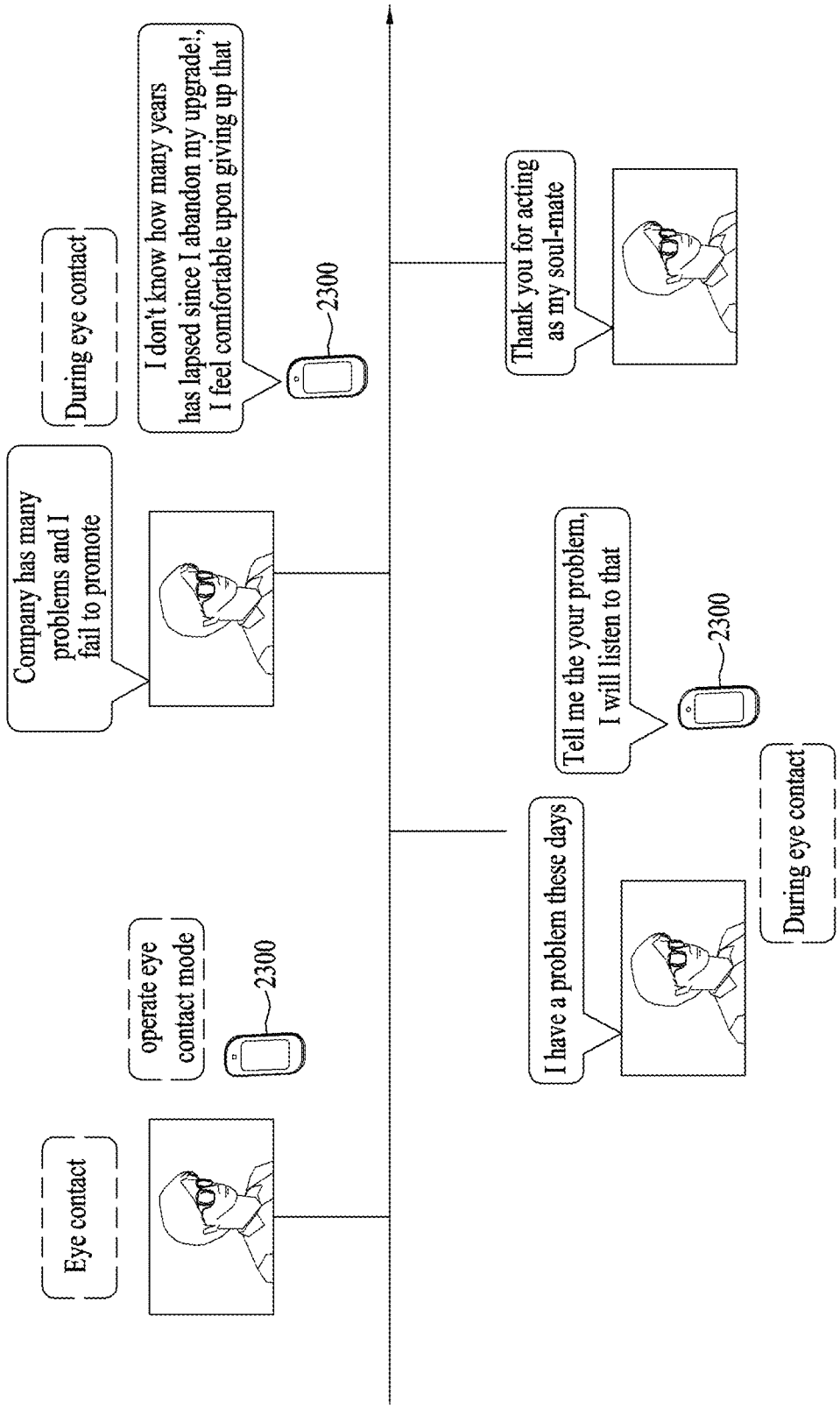
Figure 38:
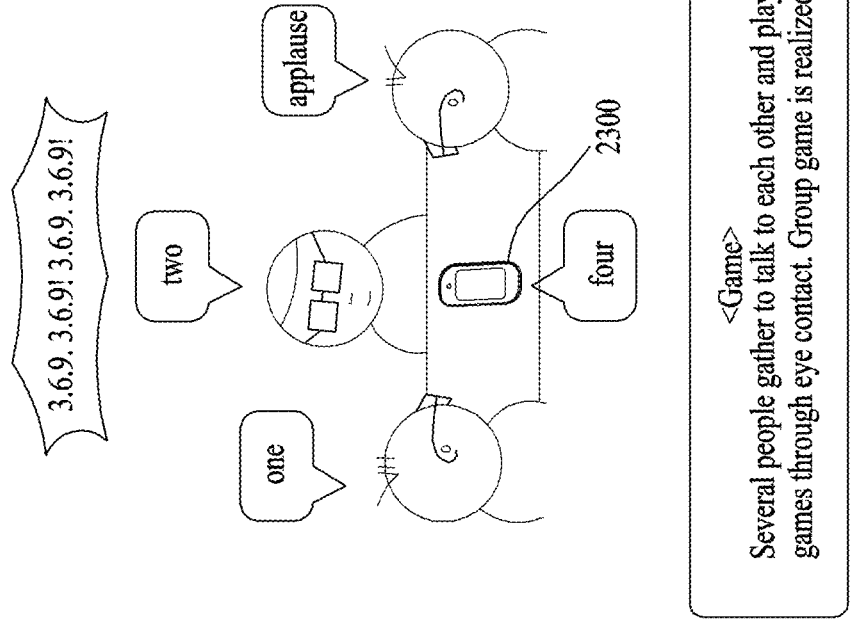
Figure 39:
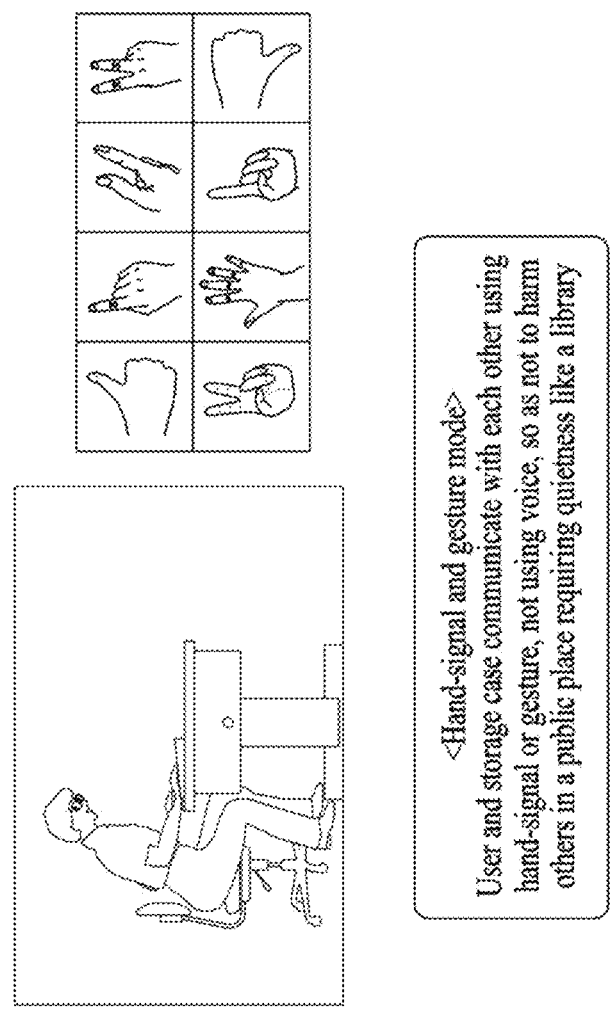

(a) of FIG. 8 is a diagram illustrating an exemplary narrowband operation, and (b) of FIG. 8 is a diagram illustrating exemplary machine type communication (MTC) channel repetition with radio frequency (RF) retuning;

FIG. 9 is a block diagram illustrating an exemplary wireless communication system to which proposed methods according to the present disclosure are applicable;

FIG. 10 is a block diagram illustrating an artificial intelligence (AI) device 100 according to an embodiment of the present disclosure;

FIG. 11 is a block diagram illustrating an AI server 200 according to an embodiment of the present disclosure;

FIG. 12 is a diagram illustrating an AI system 1 according to an embodiment of the present disclosure;

FIG. 13 is a block diagram illustrating an extended reality (XR) device according to embodiments of the present disclosure;

FIG. 14 is a detailed block diagram illustrating a memory illustrated in FIG. 13;

FIG. 15 is a block diagram illustrating a point cloud data processing system;

FIG. 16 is a block diagram illustrating a device including a learning processor;

FIG. 17 is a flowchart illustrating a process of providing an XR service by an XR device 1600 of the present disclosure, illustrated in FIG. 16;

FIG. 18 is a diagram illustrating the outer appearances of an XR device and a robot;

FIG. 19 is a flowchart illustrating a process of controlling a robot by using an XR device;

FIG. 20 is a diagram illustrating a vehicle that provides a self-driving service;

FIG. 21 is a flowchart illustrating a process of providing an augmented reality/virtual reality (AR/VR) service during a self-driving service in progress;

FIG. 22 shows an example of a storage case of an XR device according to the present disclosure;

FIG. 23 is a block diagram of an XR device according to another embodiment of the present disclosure;

(a) of FIG. 24 shows an example of implementing an XR device according to an embodiment of the present disclosure in an HMD type;

(b) of FIG. 24 shows an example of implementing an XR device according to an embodiment of the present disclosure in an AR glass type;

FIG. 25 is a block diagram showing another embodiment of an XR device according to the present disclosure;

FIG. 26 shows a flowchart of one embodiment of a cooking mate service according to the present disclosure;

FIG. 27 shows one embodiment of a cooking mate service according to the present disclosure in a chronological order;

FIG. 27 shows one embodiment of a cooking mate service according to the present disclosure in a chronological order;

FIG. 28 shows embodiments of a sports mate service according to the present disclosure;

FIG. 29 shows, in a chronological order, an embodiment of a secretary mate service according to the present disclosure;

FIG. 30 shows, in a chronological order, another embodiment of a secretary mate service according to the present disclosure;

(a) to (d) of FIG. 31 show embodiments of a fashion mate service according to the present disclosure;

(a) to (d) of FIG. 32 show embodiments of a self-development mate service according to the present disclosure;

FIG. 33 shows one embodiment of a meeting mate service according to the present disclosure;

FIG. 34 shows an embodiment of a class mate service according to the present disclosure;

FIG. 35 shows one embodiment of a seminar mate service according to the present disclosure;

FIG. 36 shows an embodiment of a presentation mate service according to the present disclosure;

FIG. 37 shows one embodiment of an eye-contact mate service according to the present disclosure;

FIG. 38 shows another embodiment of an eye-contact mate service according to the present disclosure; and FIG. 39 shows an embodiment of a hand-signal mate service according to the present disclosure.

DETAILED DESCRIPTIONS

Reference will now be made in detail to embodiments of the present disclosure, examples of which are illustrated in the accompanying drawings. Wherever possible, the same reference numbers will be used throughout the drawings to refer to the same or like parts, and a redundant description will be avoided. The terms "module" and "unit" are interchangeably used only for easiness of description and thus they should not be considered as having distinctive meanings or roles. Further, a detailed description of well-known technology will not be given in describing embodiments of the present disclosure lest it should obscure the subject matter of the embodiments. The attached drawings are provided to help the understanding of the embodiments of the present disclosure, not limiting the scope of the present disclosure. It is to be understood that the present disclosure covers various modifications, equivalents, and/or alternatives falling within the scope and spirit of the present disclosure.

The following embodiments of the present disclosure are intended to embody the present disclosure, not limiting the scope of the present disclosure. What could easily be derived from the detailed description of the present disclosure and the embodiments by a person skilled in the art is interpreted as falling within the scope of the present disclosure.

The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INTRODUCTION

In the disclosure, downlink (DL) refers to communication from a base station (BS) to a user equipment (UE), and uplink (UL) refers to communication from the UE to the BS. On DL, a transmitter may be a part of the BS and a receiver may be a part of the UE, whereas on UL, a transmitter may be a part of the UE and a receiver may be a part of the BS.

A UE may be referred to as a first communication device, and a BS may be referred to as a second communication device in the present disclosure. The term BS may be replaced with fixed station, Node B, evolved Node B (eNB), next generation Node B (gNB), base transceiver system (BTS), access point (AP), network or $5^{th}$ generation (5G) network node, artificial intelligence (AI) system, road side unit (RSU), robot, augmented reality/virtual reality (AR/VR) system, and so on. The term UE may be replaced with terminal, mobile station (MS), user terminal (UT), mobile subscriber station (MSS), subscriber station (SS), advanced mobile station (AMS), wireless terminal (WT), device-to-device (D2D) device, vehicle, robot, AI device (or module), AR/VR device (or module), and so on.

The following technology may be used in various wireless access systems including code division multiple access (CDMA), frequency division multiple access (FDMA), time division multiple access (TDMA), orthogonal frequency division multiple access (OFDMA), and single carrier FDMA (SC-FDMA).

For the convenience of description, the present disclosure is described in the context of a 3rd generation partnership project (3GPP) communication system (e.g., long term evolution-advanced (LTE-A) and new radio or new radio access technology (NR)), which should not be construed as limiting the present disclosure. For reference, 3GPP LTE is part of evolved universal mobile telecommunications system (E-UMTS) using evolved UMTS terrestrial radio access (E-UTRA), and LTE-A/LTE-A pro is an evolution of 3GPP LTE. 3GPP NR is an evolution of 3GPP/LTE-A/LTE-A pro.

In the present disclosure, a node refers to a fixed point capable of transmitting/receiving wireless signals by communicating with a UE. Various types of BSs may be used as nodes irrespective of their names. For example, any of a BS, an NB, an eNB, a pico-cell eNB (PeNB), a home eNB (HeNB), a relay, and a repeater may be a node. At least one antenna is installed in one node. The antenna may refer to a physical antenna, an antenna port, a virtual antenna, or an antenna group. A node is also referred to as a point.

In the present disclosure, a cell may refer to a certain geographical area or radio resources, in which one or more nodes provide a communication service. A "cell" as a geographical area may be understood as coverage in which a service may be provided in a carrier, while a "cell" as radio resources is associated with the size of a frequency configured in the carrier, that is, a bandwidth (BW). Because a range in which a node may transmit a valid signal, that is, DL coverage and a range in which the node may receive a valid signal from a UE, that is, UL coverage depend on a carrier carrying the signals, and thus the coverage of the node is associated with the "cell" coverage of radio resources used by the node. Accordingly, the term "cell" may mean the service overage of a node, radio resources, or a range in which a signal reaches with a valid strength in the radio resources, under circumstances.

In the present disclosure, communication with a specific cell may amount to communication with a BS or node that provides a communication service to the specific cell. Further, a DL/UL signal of a specific cell means a DL/UL signal from/to a BS or node that provides a communication service to the specific cell. Particularly, a cell that provides a UL/DL communication service to a UE is called a serving cell for the UE. Further, the channel state/quality of a specific cell refers to the channel state/quality of a channel or a communication link established between a UE and a BS or node that provides a communication service to the specific cell.

A "cell" associated with radio resources may be defined as a combination of DL resources and UL resources, that is, a combination of a DL component carrier (CC) and a UL CC. A cell may be configured with DL resources alone or both DL resources and UL resources in combination. When carrier aggregation (CA) is supported, linkage between the carrier frequency of DL resources (or a DL CC) and the carrier frequency of UL resources (or a UL CC) may be indicated by system information transmitted in a corresponding cell. A carrier frequency may be identical to or different from the center frequency of each cell or CC. Hereinbelow, a cell operating in a primary frequency is referred to as a primary cell (Pcell) or PCC, and a cell operating in a secondary frequency is referred to as a secondary cell (Scell) or SCC. The Scell may be configured after a UE and a BS perform a radio resource control (RRC) connection establishment procedure and thus an RRC connection is established between the UE and the BS, that is, the UE is RRC_CONNECTED. The RRC connection may mean a path in which the RRC of the UE may exchange RRC messages with the RRC of the BS. The Scell may be configured to provide additional radio resources to the UE. The S cell and the Pcell may form a set of serving cells for the UE according to the capabilities of the UE. Only one serving cell configured with a Pcell exists for an RRC_CONNECTED UE which is not configured with CA or does not support CA.

A cell supports a unique radio access technology (RAT). For example, LTE RAT-based transmission/reception is performed in an LTE cell, and 5G RAT-based transmission/reception is performed in a 5G cell.

CA aggregates a plurality of carriers each having a smaller system BW than a target BW to support broadband. CA differs from OFDMA in that DL or UL communication is conducted in a plurality of carrier frequencies each forming a system BW (or channel BW) in the former, and DL or UL communication is conducted by loading a basic frequency band divided into a plurality of orthogonal subcarriers in one carrier frequency in the latter. In OFDMA or orthogonal frequency division multiplexing (OFDM), for example, one frequency band having a certain system BW is divided into a plurality of subcarriers with a predetermined subcarrier spacing, information/data is mapped to the plurality of subcarriers, and the frequency band in which the information/data has been mapped is transmitted in a carrier frequency of the frequency band through frequency upconversion. In wireless CA, frequency bands each having a system BW and a carrier frequency may be used simultaneously for communication, and each frequency band used in CA may be divided into a plurality of subcarriers with a predetermined subcarrier spacing.

The 3GPP communication standards define DL physical channels corresponding to resource elements (REs) conveying information originated from upper layers of the physical layer (e.g., the medium access control (MAC) layer, the radio link control (RLC) layer, the packet data convergence protocol (PDCP) layer, the radio resource control (RRC) layer, the service data adaptation protocol (SDAP) layer, and the non-access stratum (NAS) layer), and DL physical signals corresponding to REs which are used in the physical layer but do not deliver information originated from the upper layers. For example, physical downlink shared channel (PDSCH), physical broadcast channel (PBCH), physical multicast channel (PMCH), physical control format indicator channel (PCFICH), and physical downlink control channel (PDCCH) are defined as DL physical channels, and a reference signal (RS) and a synchronization signal are defined as DL physical signals. An RS, also called a pilot is a signal in a predefined special waveform known to both a BS and a UE. For example, cell specific RS (CRS), UE-specific RS (UE-RS), positioning RS (PRS), channel state information RS (CSI-RS), and demodulation RS (DMRS) are defined as DL RSs. The 3GPP communication standards also define UL physical channels corresponding to REs conveying information originated from upper layers, and UL physical signals corresponding to REs which are used in the physical layer but do not carry information originated from the upper layers. For example, physical uplink shared channel (PUSCH), physical uplink control channel (PUCCH), and physical random access channel (PRACH) are defined as UL physical channels, and DMRS for a UL control/data signal and sounding reference signal (SRS) used for UL channel measurement are defined.

In the present disclosure, physical shared channels (e.g., PUSCH and PDSCH) are used to deliver information originated from the upper layers of the physical layer (e.g., the MAC layer, the RLC layer, the PDCP layer, the RRC layer, the SDAP layer, and the NAS layer).

In the present disclosure, an RS is a signal in a predefined special waveform known to both a BS and a UE. In a 3GPP communication system, for example, the CRS being a cell common RS, the UE-RS for demodulation of a physical channel of a specific UE, the CSI-RS used to measure/estimate a DL channel state, and the DMRS used to demodulate a physical channel are defined as DL RSs, and the DMRS used for demodulation of a UL control/data signal and the SRS used for UL channel state measurement/estimation are defined as UL RSs.

In the present disclosure, a transport block (TB) is payload for the physical layer. For example, data provided to the physical layer by an upper layer or the MAC layer is basically referred to as a TB. A UE which is a device including an AR/VR module (i.e., an AR/VR device) may transmit a TB including AR/VR data to a wireless communication network (e.g., a 5G network) on a PUSCH. Further, the UE may receive a TB including AR/VR data of the 5G network or a TB including a response to AR/VR data transmitted by the UE from the wireless communication network.

In the present disclosure, hybrid automatic repeat and request (HARQ) is a kind of error control technique. An HARQ acknowledgement (HARQ-ACK) transmitted on DL is used for error control of UL data, and a HARQ-ACK transmitted on UL is used for error control of DL data. A transmitter performing an HARQ operation awaits reception of an ACK after transmitting data (e.g., a TB or a codeword). A receiver performing an HARQ operation transmits an ACK only when data has been successfully received, and a negative ACK (NACK) when the received data has an error. Upon receipt of the ACK, the transmitter may transmit (new) data, and upon receipt of the NACK, the transmitter may retransmit the data.

In the present disclosure, CSI generically refers to information representing the quality of a radio channel (or link) established between a UE and an antenna port. The CSI may include at least one of a channel quality indicator (CQI), a precoding matrix indicator (PMI), a CSI-RS resource indicator (CRI), a synchronization signal block resource indicator (SSBRI), a layer indicator (LI), a rank indicator (RI), or a reference signal received power (RSRP).

In the present disclosure, frequency division multiplexing (FDM) is transmission/reception of signals/channels/users in different frequency resources, and time division multiplexing (TDM) is transmission/reception of signals/channels/users in different time resources.

In the present disclosure, frequency division duplex (FDD) is a communication scheme in which UL communication is performed in a UL carrier, and DL communication is performed in a DL carrier linked to the UL carrier, whereas time division duplex (TDD) is a communication scheme in which UL communication and DL communication are performed in time division in the same carrier. In the present disclosure, half-duplex is a scheme in which a communication device operates on UL or UL only in one frequency at one time point, and on DL or UL in another frequency at another time point. For example, when the communication device operates in half-duplex, the communication device communicates in UL and DL frequencies, wherein the communication device performs a UL transmission in the UL frequency for a predetermined time, and retunes to the DL frequency and performs a DL reception in the DL frequency for another predetermined time, in time division, without simultaneously using the UL and DL frequencies.

Figure 1:
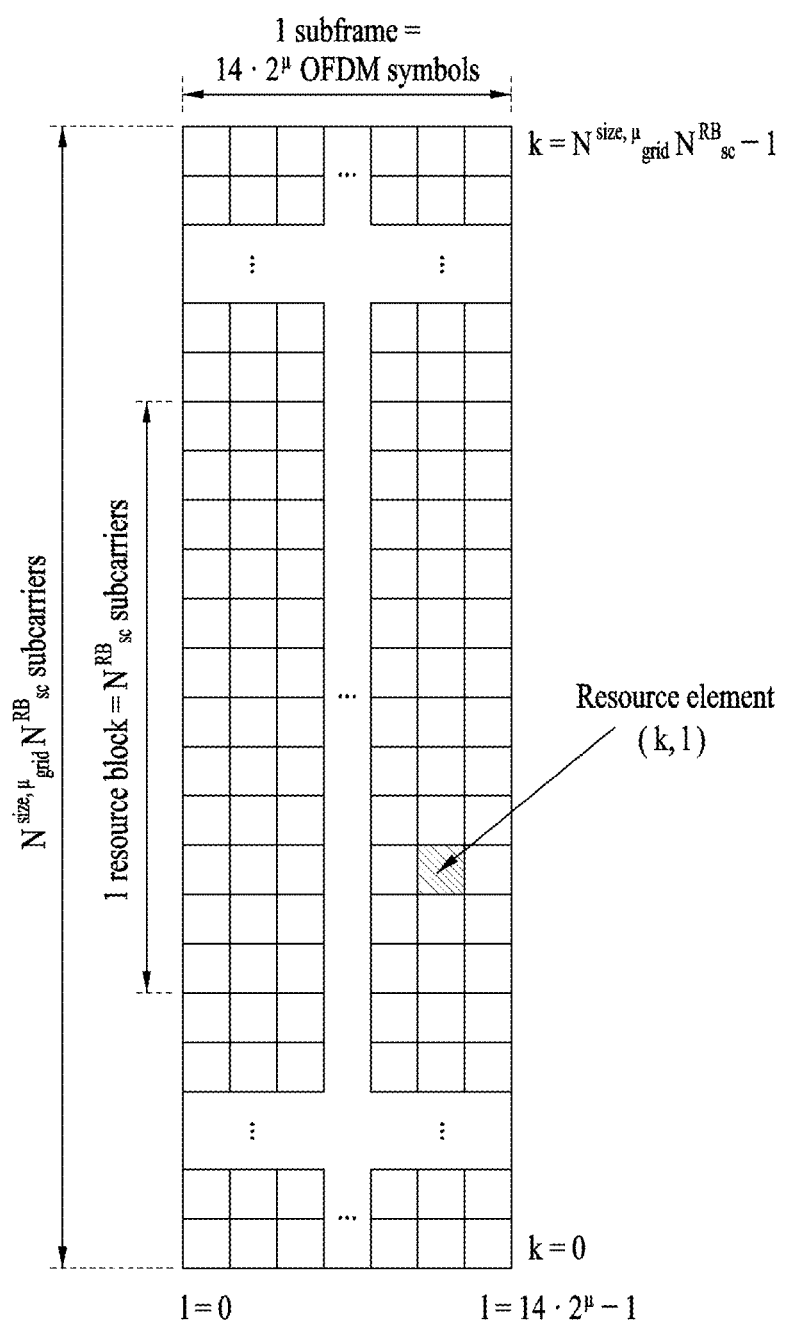
FIG. 1 is a diagram illustrating an exemplary resource grid to which physical signals/channels are mapped in a $3^{rd}$ generation partnership project (3GPP) system.

FIG. 1 is a diagram illustrating an exemplary resource grid to which physical signals/channels are mapped in a 3GPP system.

Referring to FIG. 1, for each subcarrier spacing configuration and carrier, a resource grid of $N^{size,\mu}_{grid} * N^{RB}_{sc}$ subcarriers by $14 \cdot 2^{\mu}$ OFDM symbols is defined. Herein, $N^{size,\mu}_{grid}$ is indicated by RRC signaling from a BS, and $\mu$ represents a subcarrier spacing $\Delta f$ given by $\Delta f = 2^{\mu} * 15$ [kHz] where $\mu \in \{0, 1, 2, 3, 4\}$ in a 5G system.

$N^{size,\mu}_{grid}$ may be different between UL and DL as well as a subcarrier spacing configuration $\mu$. For the subcarrier spacing configuration $\mu$, an antenna port p, and a transmission direction (UL or DL), there is one resource grid. Each element of a resource grid for the subcarrier spacing configuration $\mu$ and the antenna port p is referred to as an RE, uniquely identified by an index pair (k,l) where k is a frequency-domain index and l is the position of a symbol in a relative time domain with respect to a reference point. A frequency unit used for mapping physical channels to REs, resource block (RB) is defined by 12 consecutive subcarriers ($N^{RB}_{sc}=12$) in the frequency domain. Considering that a UE may not support a wide BW supported by the 5G system at one time, the UE may be configured to operate in a part (referred to as a bandwidth part (BWP)) of the frequency BW of a cell.

For the background technology, terminology, and abbreviations used in the present disclosure, standard specifications published before the present disclosure may be referred to. For example, the following documents may be referred to.

3GPP LTE
3GPP TS 36.211: Physical channels and modulation
3GPP TS 36.212: Multiplexing and channel coding
3GPP TS 36.213: Physical layer procedures
3GPP TS 36.214: Physical layer; Measurements
3GPP TS 36.300: Overall description
3GPP TS 36.304: User Equipment (UE) procedures in idle mode
3GPP TS 36.314: Layer 2—Measurements
3GPP TS 36.321: Medium Access Control (MAC) protocol
3GPP TS 36.322: Radio Link Control (RLC) protocol
3GPP TS 36.323: Packet Data Convergence Protocol (PDCP)
3GPP TS 36.331: Radio Resource Control (RRC) protocol
3GPP TS 23.303: Proximity-based services (Prose); Stage 2
3GPP TS 23.285: Architecture enhancements for V2X services
3GPP TS 23.401: General Packet Radio Service (GPRS) enhancements for Evolved Universal Terrestrial Radio Access Network (E-UTRAN) access
3GPP TS 23.402: Architecture enhancements for non-3GPP accesses
3GPP TS 23.286: Application layer support for V2X services; Functional architecture and information flows
3GPP TS 24.301: Non-Access-Stratum (NAS) protocol for Evolved Packet System (EPS); Stage 3
3GPP TS 24.302: Access to the 3GPP Evolved Packet Core (EPC) via non-3GPP access networks; Stage 3
3GPP TS 24.334: Proximity-services (ProSe) User Equipment (UE) to ProSe function protocol aspects; Stage 3
3GPP TS 24.386: User Equipment (UE) to V2X control function; protocol aspects; Stage 3
3GPP NR (e.g. 5G)
3GPP TS 38.211: Physical channels and modulation
3GPP TS 38.212: Multiplexing and channel coding
3GPP TS 38.213: Physical layer procedures for control
3GPP TS 38.214: Physical layer procedures for data
3GPP TS 38.215: Physical layer measurements
3GPP TS 38.300: NR and NG-RAN Overall Description
3GPP TS 38.304: User Equipment (UE) procedures in idle mode and in RRC inactive state
3GPP TS 38.321: Medium Access Control (MAC) protocol
3GPP TS 38.322: Radio Link Control (RLC) protocol
3GPP TS 38.323: Packet Data Convergence Protocol (PDCP)
3GPP TS 38.331: Radio Resource Control (RRC) protocol
3GPP TS 37.324: Service Data Adaptation Protocol (SDAP)
3GPP TS 37.340: Multi-connectivity; Overall description
3GPP TS 23.287: Application layer support for V2X services; Functional architecture and information flows
3GPP TS 23.501: System Architecture for the 5G System
3GPP TS 23.502: Procedures for the 5G System
3GPP TS 23.503: Policy and Charging Control Framework for the 5G System; Stage 2
3GPP TS 24.501: Non-Access-Stratum (NAS) protocol for 5G System (5GS); Stage 3
3GPP TS 24.502: Access to the 3GPP 5G Core Network (5GCN) via non-3GPP access networks
3GPP TS 24.526: User Equipment (UE) policies for 5G System (5GS); Stage 3

Figure 2:
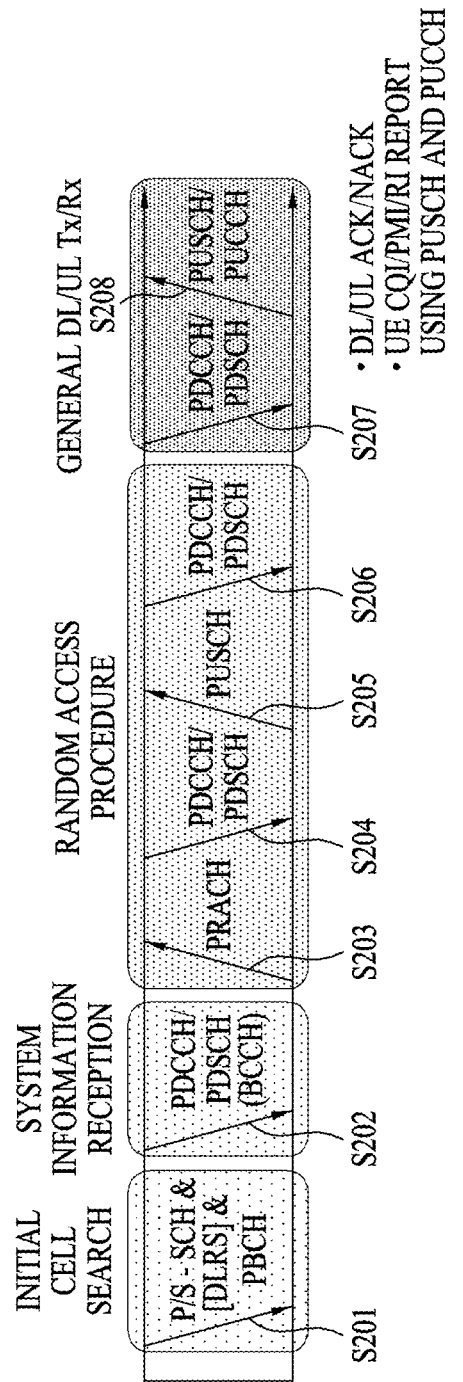
FIG. 2 is a diagram illustrating an exemplary method of transmitting and receiving 3GPP signals.

FIG. 2 is a diagram illustrating an exemplary method of transmitting/receiving 3GPP signals.

Referring to FIG. 2, when a UE is powered on or enters a new cell, the UE performs an initial cell search involving acquisition of synchronization with a BS (S201). For the initial cell search, the UE receives a primary synchronization channel (P-SCH) and a secondary synchronization channel (S-SCH), acquires synchronization with the BS, and obtains information such as a cell identifier (ID) from the P-SCH and the S-SCH. In the LTE system and the NR system, the P-SCH and the S-SCH are referred to as a primary synchronization signal (PSS) and a secondary synchronization signal (SSS), respectively. The initial cell search procedure will be described below in greater detail.

After the initial cell search, the UE may receive a PBCH from the BS and acquire broadcast information within a cell from the PBCH. During the initial cell search, the UE may check a DL channel state by receiving a DL RS.

Upon completion of the initial cell search, the UE may acquire more specific system information by receiving a PDCCH and receiving a PDSCH according to information carried on the PDCCH (S202).

When the UE initially accesses the BS or has no radio resources for signal transmission, the UE may perform a random access procedure with the BS (S203 to S206). For this purpose, the UE may transmit a predetermined sequence as a preamble on a PRACH (S203 and S205) and receive a PDCCH, and a random access response (RAR) message in response to the preamble on a PDSCH corresponding to the PDCCH (S204 and S206). If the random access procedure is contention-based, the UE may additionally perform a contention resolution procedure. The random access procedure will be described below in greater detail.

After the above procedure, the UE may then perform PDCCH/PDSCH reception (S207) and PUSCH/PUCCH transmission (S208) in a general UL/DL signal transmission procedure. Particularly, the UE receives DCI on a PDCCH.

The UE monitors a set of PDCCH candidates in monitoring occasions configured for one or more control element sets (CORESETs) in a serving cell according to a corresponding search space configuration. The set of PDCCH candidates to be monitored by the UE is defined from the perspective of search space sets. A search space set may be a common search space set or a UE-specific search space set. A CORESET includes a set of (physical) RBs that last for a time duration of one to three OFDM symbols. The network may configure a plurality of CORESETs for the UE. The UE monitors PDCCH candidates in one or more search space sets. Herein, monitoring is attempting to decode PDCCH candidate(s) in a search space. When the UE succeeds in decoding one of the PDCCH candidates in the search space, the UE determines that a PDCCH has been detected from among the PDCCH candidates and performs PDSCH reception or PUSCH transmission based on DCI included in the detected PDCCH.

The PDCCH may be used to schedule DL transmissions on a PDSCH and UL transmissions on a PUSCH. DCI in the PDCCH includes a DL assignment (i.e., a DL grant) including at least a modulation and coding format and resource allocation information for a DL shared channel, and a UL grant including a modulation and coding format and resource allocation information for a UL shared channel.

Initial Access (IA) Procedure

Synchronization Signal Block (SSB) Transmission and Related Operation

Figure 3:
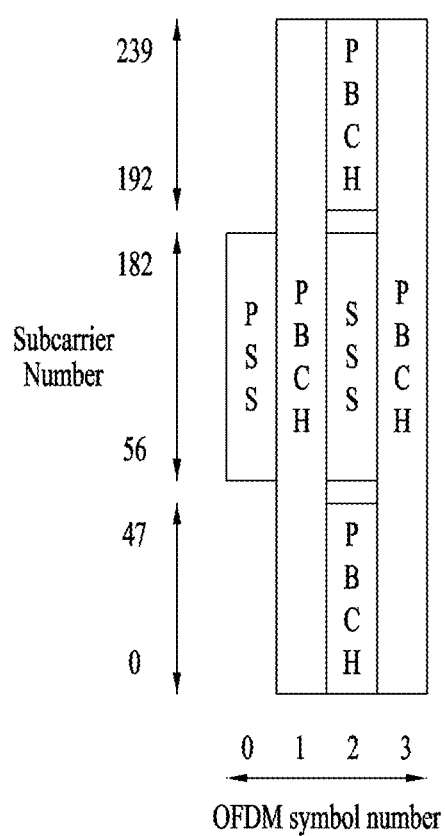
FIG. 3 is a diagram illustrating an exemplary structure of a synchronization signal block (SSB)

FIG. 3 is a diagram illustrating an exemplary SSB structure. The UE may perform cell search, system information acquisition, beam alignment for initial access, DL measurement, and so on, based on an SSB. The term SSB is interchangeably used with synchronization signal/physical broadcast channel (SS/PBCH).

Referring to FIG. 3, an SSB includes a PSS, an SSS, and a PBCH. The SSB includes four consecutive OFDM symbols, and the PSS, the PBCH, the SSS/PBCH, or the PBCH is transmitted in each of the OFDM symbols. The PBCH is encoded/decoded based on a polar code and modulated/demodulated in quadrature phase shift keying (QPSK). The PBCH in an OFDM symbol includes data REs to which a complex modulated value of the PBCH is mapped and DMRS REs to which a DMRS for the PBCH is mapped. There are three DMRS REs per RB in an OFDM symbol and three data REs between every two of the DMRS REs.

Cell Search

Cell search is a process of acquiring the time/frequency synchronization of a cell and detecting the cell ID (e.g., physical cell ID (PCI)) of the cell by a UE. The PSS is used to detect a cell ID in a cell ID group, and the SSS is used to detect the cell ID group. The PBCH is used for SSB (time) index detection and half-frame detection.

In the 5G system, there are 336 cell ID groups each including 3 cell IDs. Therefore, a total of 1008 cell IDs are available. Information about a cell ID group to which the cell ID of a cell belongs is provided/acquired by/from the SSS of the cell, and information about the cell ID among 336 cells within the cell ID is provided/acquired by/from the PSS.

The SSB is periodically transmitted with an SSB periodicity. The UE assumes a default SSB periodicity of 20 ms during initial cell search. After cell access, the SSB periodicity may be set to one of {5 ms, 10 ms, 20 ms, 40 ms, 80 ms, 160 ms} by the network (e.g., a BS). An SSB burst set is configured at the start of an SSB period. The SSB burst set is composed of a 5-ms time window (i.e., half-frame), and the SSB may be transmitted up to L times within the SSB burst set. The maximum number L of SSB transmissions may be given as follows according to the frequency band of a carrier.

For frequency range up to 3 GHz, L=4
For frequency range from 3 GHz to 6 GHz, L=8
For frequency range from 6 GHz to 52.6 GHz, L=64

The possible time positions of SSBs in a half-frame are determined by a subcarrier spacing, and the periodicity of half-frames carrying SSBs is configured by the network. The time positions of SSB candidates are indexed as 0 to L−1 (SSB indexes) in a time order in an SSB burst set (i.e., half-frame). Other SSBs may be transmitted in different spatial directions (by different beams spanning the coverage area of the cell) during the duration of a half-frame. Accordingly, an SSB index (SSBI) may be associated with a BS transmission (Tx) beam in the 5G system.

The UE may acquire DL synchronization by detecting an SSB. The UE may identify the structure of an SSB burst set based on a detected (time) SSBI and hence a symbol/slot/half-frame boundary. The number of a frame/half-frame to which the detected SSB belongs may be identified by using system frame number (SFN) information and half-frame indication information.

Specifically, the UE may acquire the 10-bit SFN of a frame carrying the PBCH from the PBCH. Subsequently, the UE may acquire 1-bit half-frame indication information. For example, when the UE detects a PBCH with a half-frame indication bit set to 0, the UE may determine that an SSB to which the PBCH belongs is in the first half-frame of the frame. When the UE detects a PBCH with a half-frame indication bit set to 1, the UE may determine that an SSB to which the PBCH belongs is in the second half-frame of the frame. Finally, the UE may acquire the SSBI of the SSB to which the PBCH belongs based on a DMRS sequence and PBCH payload delivered on the PBCH.

System Information (SI) Acquisition

SI is divided into a master information block (MIB) and a plurality of system information blocks (SIBs). The SI except for the MIB may be referred to as remaining minimum system information (RMSI). For details, the following may be referred to.

The MIB includes information/parameters for monitoring a PDCCH that schedules a PDSCH carrying systemInformationBlock1 (SIB1), and transmitted on a PBCH of an SSB by a BS. For example, a UE may determine from the MIB whether there is any CORESET for a Type0-PDCCH common search space. The Type0-PDCCH common search space is a kind of PDCCH search space and used to transmit a PDCCH that schedules an SI message. In the presence of a Type0-PDCCH common search space, the UE may determine (1) a plurality of contiguous RBs and one or more consecutive symbols included in a CORESET, and (ii) a PDCCH occasion (e.g., a time-domain position at which a PDCCH is to be received), based on information (e.g., pdcch-ConfigSIB1) included in the MIB.

SIB1 includes information related to availability and scheduling (e.g., a transmission period and an SI-window size) of the remaining SIBs (hereinafter, referred to SIBx where x is an integer equal to or larger than 2). For example, SIB1 may indicate whether SIBx is broadcast periodically or in an on-demand manner upon user request. If SIBx is provided in the on-demand manner, SIB1 may include information required for the UE to transmit an SI request. A PDCCH that schedules SIB1 is transmitted in the Type0-PDCCH common search space, and SIB1 is transmitted on a PDSCH indicated by the PDCCH.

SIBx is included in an SI message and transmitted on a PDSCH. Each SI message is transmitted within a periodic time window (i.e., SI-window).

Random Access Procedure

The random access procedure serves various purposes. For example, the random access procedure may be used for network initial access, handover, and UE-triggered UL data transmission. The UE may acquire UL synchronization and UL transmission resources in the random access procedure. The random access procedure may be contention-based or contention-free.

Figure 4:
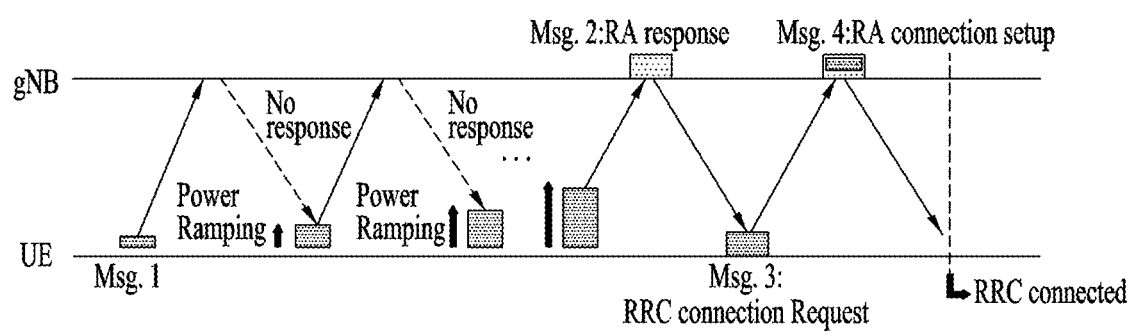
FIG. 4 is a diagram illustrating an exemplary random access procedure.

FIG. 4 is a diagram illustrating an exemplary random access procedure. Particularly, FIG. 4 illustrates a contention-based random access procedure.

First, a UE may transmit a random access preamble as a first message (Msg1) of the random access procedure on a PRACH. In the present disclosure, a random access procedure and a random access preamble are also referred to as a RACH procedure and a RACH preamble, respectively.

A plurality of preamble formats are defined by one or more RACH OFDM symbols and different cyclic prefixes (CPs) (and/or guard times). A RACH configuration for a cell is included in system information of the cell and provided to the UE. The RACH configuration includes information about a subcarrier spacing, available preambles, a preamble format, and so on for a PRACH. The RACH configuration includes association information between SSBs and RACH (time-frequency) resources, that is, association information between SSBIs and RACH (time-frequency) resources. The SSBIs are associated with Tx beams of a BS, respectively. The UE transmits a RACH preamble in RACH time-frequency resources associated with a detected or selected SSB. The BS may identify a preferred BS Tx beam of the UE based on time-frequency resources in which the RACH preamble has been detected.

An SSB threshold for RACH resource association may be configured by the network, and a RACH preamble transmission (i.e., PRACH transmission) or retransmission is performed based on an SSB in which an RSRP satisfying the threshold has been measured. For example, the UE may select one of SSB(s) satisfying the threshold and transmit or retransmit the RACH preamble in RACH resources associated with the selected SSB.

Upon receipt of the RACH preamble from the UE, the BS transmits an RAR message (a second message (Msg2)) to the UE. A PDCCH that schedules a PDSCH carrying the RAR message is cyclic redundancy check (CRC)-masked by an RA radio network temporary identifier (RNTI) (RA-RNTI) and transmitted. When the UE detects the PDCCH masked by the RA-RNTI, the UE may receive the RAR message on the PDSCH scheduled by DCI delivered on the PDCCH. The UE determines whether RAR information for the transmitted preamble, that is, Msg1 is included in the RAR message. The UE may determine whether random access information for the transmitted Msg1 is included by checking the presence or absence of the RACH preamble ID of the transmitted preamble. If the UE fails to receive a response to Msg1, the UE may transmit the RACH preamble a predetermined number of or fewer times, while performing power ramping. The UE calculates the PRACH transmission power of a preamble retransmission based on the latest pathloss and a power ramping counter.

Upon receipt of the RAR information for the UE on the PDSCH, the UE may acquire timing advance information for UL synchronization, an initial UL grant, and a UE temporary cell RNTI (C-RNTI). The timing advance information is used to control a UL signal transmission timing. To enable better alignment between PUSCH/PUCCH transmission of the UE and a subframe timing at a network end, the network (e.g., BS) may measure the time difference between PUSCH/PUCCH/SRS reception and a subframe and transmit the timing advance information based on the measured time difference. The UE may perform a UL transmission as a third message (Msg3) of the RACH procedure on a PUSCH. Msg3 may include an RRC connection request and a UE ID. The network may transmit a fourth message (Msg4) in response to Msg3, and Msg4 may be treated as a contention solution message on DL. As the UE receives Msg4, the UE may enter an RRC_CONNECTED state.

The contention-free RACH procedure may be used for handover of the UE to another cell or BS or performed when requested by a BS command. The contention-free RACH procedure is basically similar to the contention-based RACH procedure. However, compared to the contention-based RACH procedure in which a preamble to be used is randomly selected among a plurality of RACH preambles, a preamble to be used by the UE (referred to as a dedicated RACH preamble) is allocated to the UE by the BS in the contention-free RACH procedure. Information about the dedicated RACH preamble may be included in an RRC message (e.g., a handover command) or provided to the UE by a PDCCH order. When the RACH procedure starts, the UE transmits the dedicated RACH preamble to the BS. When the UE receives the RACH procedure from the BS, the RACH procedure is completed.

DL and UL Transmission/Reception Operations

DL Transmission/Reception Operation

DL grants (also called DL assignments) may be classified into (1) dynamic grant and (2) configured grant. A dynamic grant is a data transmission/reception method based on dynamic scheduling of a BS, aiming to maximize resource utilization.

The BS schedules a DL transmission by DCI. The UE receives the DCI for DL scheduling (i.e., including scheduling information for a PDSCH) (referred to as DL grant DCI) from the BS. The DCI for DL scheduling may include, for example, the following information: a BWP indicator, a frequency-domain resource assignment, a time-domain resource assignment, and a modulation and coding scheme (MCS).

The UE may determine a modulation order, a target code rate, and a TB size (TBS) for the PDSCH based on an MCS field in the DCI. The UE may receive the PDSCH in time-frequency resources according to the frequency-domain resource assignment and the time-domain resource assignment.

The DL configured grant is also called semi-persistent scheduling (SPS). The UE may receive an RRC message including a resource configuration for DL data transmission from the BS. In the case of DL SPS, an actual DL configured grant is provided by a PDCCH, and the DL SPS is activated or deactivated by the PDCCH. When DL SPS is configured, the BS provides the UE with at least the following parameters by RRC signaling: a configured scheduling RNTI (CS-RNTI) for activation, deactivation, and retransmission; and a periodicity. An actual DL grant (e.g., a frequency resource assignment) for DL SPS is provided to the UE by DCI in a PDCCH addressed to the CS-RNTI. If a specific field in the DCI of the PDCCH addressed to the CS-RNTI is set to a specific value for scheduling activation, SPS associated with the CS-RNTI is activated. The DCI of the PDCCH addressed to the CS-RNTI includes actual frequency resource allocation information, an MCS index, and so on. The UE may receive DL data on a PDSCH based on the SPS.

UL Transmission/Reception Operation

UL grants may be classified into (1) dynamic grant that schedules a PUSCH dynamically by UL grant DCI and (2) configured grant that schedules a PUSCH semi-statically by RRC signaling.

FIG. 5 is a diagram illustrating exemplary UL transmissions according to UL grants. Particularly, FIG. 5(a) illustrates a UL transmission procedure based on a dynamic grant, and FIG. 5(b) illustrates a UL transmission procedure based on a configured grant.

In the case of a UL dynamic grant, the BS transmits DCI including UL scheduling information to the UE. The UE receives DCI for UL scheduling (i.e., including scheduling information for a PUSCH) (referred to as UL grant DCI) on a PDCCH. The DCI for UL scheduling may include, for example, the following information: a BWP indicator, a frequency-domain resource assignment, a time-domain resource assignment, and an MCS. For efficient allocation of UL radio resources by the BS, the UE may transmit information about UL data to be transmitted to the BS, and the BS may allocate UL resources to the UE based on the information. The information about the UL data to be transmitted is referred to as a buffer status report (BSR), and the BSR is related to the amount of UL data stored in a buffer of the UE.

Referring to FIG. 5(a), the illustrated UL transmission procedure is for a UE which does not have UL radio resources available for BSR transmission. In the absence of a UL grant available for UL data transmission, the UE is not capable of transmitting a BSR on a PUSCH. Therefore, the UE should request resources for UL data, starting with transmission of an SR on a PUCCH. In this case, a 5-step UL resource allocation procedure is used.

Referring to FIG. 5(a), in the absence of PUSCH resources for BSR transmission, the UE first transmits an SR to the BS, for PUSCH resource allocation. The SR is used for the UE to request PUSCH resources for UL transmission to the BS, when no PUSCH resources are available to the UE in spite of occurrence of a buffer status reporting event. In the presence of valid PUCCH resources for the SR, the UE transmits the SR on a PUCCH, whereas in the absence of valid PUCCH resources for the SR, the UE starts the afore-described (contention-based) RACH procedure. Upon receipt of a UL grant in UL grant DCI from the BS, the UE transmits a BSR to the BS in PUSCH resources allocated by the UL grant. The BS checks the amount of UL data to be transmitted by the UE based on the BSR and transmits a UL grant in UL grant DCI to the UE. Upon detection of a PDCCH including the UL grant DCI, the UE transmits actual UL data to the BS on a PUSCH based on the UL grant included in the UL grant DCI.

Referring to FIG. 5(b), in the case of a configured grant, the UE receives an RRC message including a resource configuration for UL data transmission from the BS. In the NR system, two types of UL configured grants are defined: type 1 and type 2. In the case of UL configured grant type 1, an actual UL grant (e.g., time resources and frequency resources) is provided by RRC signaling, whereas in the case of UL configured grant type 2, an actual UL grant is provided by a PDCCH, and activated or deactivated by the PDCCH. If configured grant type 1 is configured, the BS provides the UE with at least the following parameters by RRC signaling: a CS-RNTI for retransmission; a periodicity of configured grant type 1; information about a starting symbol index S and the number L of symbols for a PUSCH in a slot; a time-domain offset representing a resource offset with respect to SFN=0 in the time domain; and an MCS index representing a modulation order, a target code rate, and a TB size. If configured grant type 2 is configured, the BS provides the UE with at least the following parameters by RRC signaling: a CS-RNTI for activation, deactivation, and retransmission; and a periodicity of configured grant type 2. An actual UL grant of configured grant type 2 is provided to the UE by DCI of a PDCCH addressed to a CS-RNTI. If a specific field in the DCI of the PDCCH addressed to the CS-RNTI is set to a specific value for scheduling activation, configured grant type 2 associated with the CS-RNTI is activated. The DCI set to a specific value for scheduling activation in the PDCCH includes actual frequency resource allocation information, an MCS index, and so on. The UE may perform a UL transmission on a PUSCH based on a configured grant of type 1 or type 2.

Figure 6:
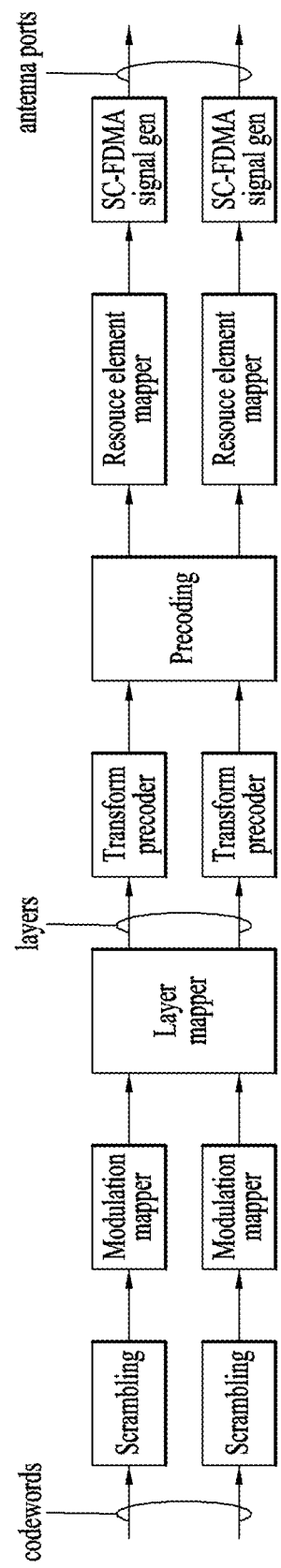
FIG. 6 is a conceptual diagram illustrating exemplary physical channel processing.

FIG. 6 is a conceptual diagram illustrating exemplary physical channel processing.

Each of the blocks illustrated in FIG. 6 may be performed in a corresponding module of a physical layer block in a transmission device. More specifically, the signal processing depicted in FIG. 6 may be performed for UL transmission by a processor of a UE described in the present disclosure. Signal processing of FIG. 6 except for transform precoding, with CP-OFDM signal generation instead of SC-FDMA signal generation may be performed for DL transmission in a processor of a BS described in the present disclosure. Referring to FIG. 6, UL physical channel processing may include scrambling, modulation mapping, layer mapping, transform precoding, precoding, RE mapping, and SC-FDMA signal generation. The above processes may be performed separately or together in the modules of the transmission device. The transform precoding, a kind of discrete Fourier transform (DFT), is to spread UL data in a special manner that reduces the peak-to-average power ratio (PAPR) of a waveform. OFDM which uses a CP together with transform precoding for DFT spreading is referred to as DFT-s-OFDM, and OFDM using a CP without DFT spreading is referred to as CP-OFDM. An SC-FDMA signal is generated by DFT-s-OFDM. In the NR system, if transform precoding is enabled for UL, transform precoding may be applied optionally. That is, the NR system supports two options for a UL waveform: one is CP-OFDM and the other is DFT-s-OFDM. The BS provides RRC parameters to the UE such that the UE determines whether to use CP-OFDM or DFT-s-OFDM for a UL transmission waveform. FIG. 6 is a conceptual view illustrating UL physical channel processing for DFT-s-OFDM. For CP-OFDM, transform precoding is omitted from the processes of FIG. 6. For DL transmission, CP-OFDM is used for DL waveform transmission.

Each of the above processes will be described in greater detail. For one codeword, the transmission device may scramble coded bits of the codeword by a scrambler and then transmit the scrambled bits on a physical channel. The codeword is obtained by encoding a TB. The scrambled bits are modulated to complex-valued modulation symbols by a modulation mapper. The modulation mapper may modulate the scrambled bits in a predetermined modulation scheme and arrange the modulated bits as complex-valued modulation symbols representing positions on a signal constellation. Pi/2-binary phase shift keying (pi/2-BPSK), m-phase shift keying (m-PSK), m-quadrature amplitude modulation (m-QAM), or the like is available for modulation of the coded data. The complex-valued modulation symbols may be mapped to one or more transmission layers by a layer mapper. A complexed-value modulation symbol on each layer may be precoded by a precoder, for transmission through an antenna port. If transform precoding is possible for UL transmission, the precoder may perform precoding after the complex-valued modulation symbols are subjected to transform precoding, as illustrated in FIG. 6. The precoder may output antenna-specific symbols by processing the complex-valued modulation symbols in a multiple input multiple output (MIMO) scheme according to multiple Tx antennas, and distribute the antenna-specific symbols to corresponding RE mappers. An output z of the precoder may be obtained by multiplying an output y of the layer mapper by an N×M precoding matrix, W where N is the number of antenna ports and M is the number of layers. The RE mappers map the complex-valued modulation symbols for the respective antenna ports to appropriate REs in an RB allocated for transmission. The RE mappers may map the complex-valued modulation symbols to appropriate subcarriers, and multiplex the mapped symbols according to users. SC-FDMA signal generators (CP-OFDM signal generators, when transform precoding is disabled in DL transmission or UL transmission) may generate complex-valued time domain OFDM symbol signals by modulating the complex-valued modulation symbols in a specific modulations scheme, for example, in OFDM. The SC-FDMA signal generators may perform inverse fast Fourier transform (IFFT) on the antenna-specific symbols and insert CPs into the time-domain IFFT-processed symbols. The OFDM symbols are subjected to digital-to-analog conversion, frequency upconversion, and so on, and then transmitted to a reception device through the respective Tx antennas. Each of the SC-FDMA signal generators may include an IFFT module, a CP inserter, a digital-to-analog converter (DAC), a frequency upconverter, and so on.

A signal processing procedure of the reception device is performed in a reverse order of the signal processing procedure of the transmission device. For details, refer to the above description and FIG. 6.

Now, a description will be given of the PUCCH.

The PUCCH is used for UCI transmission. UCI includes an SR requesting UL transmission resources, CSI representing a UE-measured DL channel state based on a DL RS, and/or an HARQ-ACK indicating whether a UE has successfully received DL data.

The PUCCH supports multiple formats, and the PUCCH formats are classified according to symbol durations, payload sizes, and multiplexing or non-multiplexing. [Table 1] below lists exemplary PUCCH formats.

TABLE 1

| Format | PUCCH length in OFDM symbols | Number of bits | Etc. |
|---|---|---|---|
| 0 | 1-2 | ≤2 | Sequence selection |
| 1 | 4-14 | ≤2 | Sequence modulation |
| 2 | 1-2 | >2 | CP-OFDM |
| 3 | 4-14 | >2 | DFT-s-OFDM (no UE multiplexing) |
| 4 | 4-14 | >2 | DFT-s-OFDM (Pre DFT orthogonal cover code (OCC)) |

The BS configures PUCCH resources for the UE by RRC signaling. For example, to allocate PUCCH resources, the BS may configure a plurality of PUCCH resource sets for the UE, and the UE may select a specific PUCCH resource set corresponding to a UCI (payload) size (e.g., the number of UCI bits). For example, the UE may select one of the following PUCCH resource sets according to the number of UCI bits, $N_{UCI}$.

PUCCH resource set #0, if the number of UCI bits≤2

PUCCH resource set #1, if 2<the number of UCI bits≤$N_1$

. . .

PUCCH resource set #(K−1), if NK−2<the number of UCI bits≤$N_{K-1}$

Herein, K represents the number of PUCCH resource sets (K>1), and Ni represents the maximum number of UCI bits supported by PUCCH resource set #i. For example, PUCCH resource set #1 may include resources of PUCCH format 0 to PUCCH format 1, and the other PUCCH resource sets may include resources of PUCCH format 2 to PUCCH format 4.

Subsequently, the BS may transmit DCI to the UE on a PDCCH, indicating a PUCCH resource to be used for UCI transmission among the PUCCH resources of a specific PUCCH resource set by an ACK/NACK resource indicator (ARI) in the DCI. The ARI may be used to indicate a PUCCH resource for HARQ-ACK transmission, also called a PUCCH resource indicator (PRI).

Enhanced Mobile Broadband Communication (eMBB)

In the NR system, a massive MIMO environment in which the number of Tx/Rx antennas is significantly increased is under consideration. On the other hand, in an NR system operating at or above 6 GHz, beamforming is considered, in which a signal is transmitted with concentrated energy in a specific direction, not omni-directionally, to compensate for rapid propagation attenuation. Accordingly, there is a need for hybrid beamforming with analog beamforming and digital beamforming in combination according to a position to which a beamforming weight vector/precoding vector is applied, for the purpose of increased performance, flexible resource allocation, and easiness of frequency-wise beam control.

Hybrid Beamforming

Figure 7:
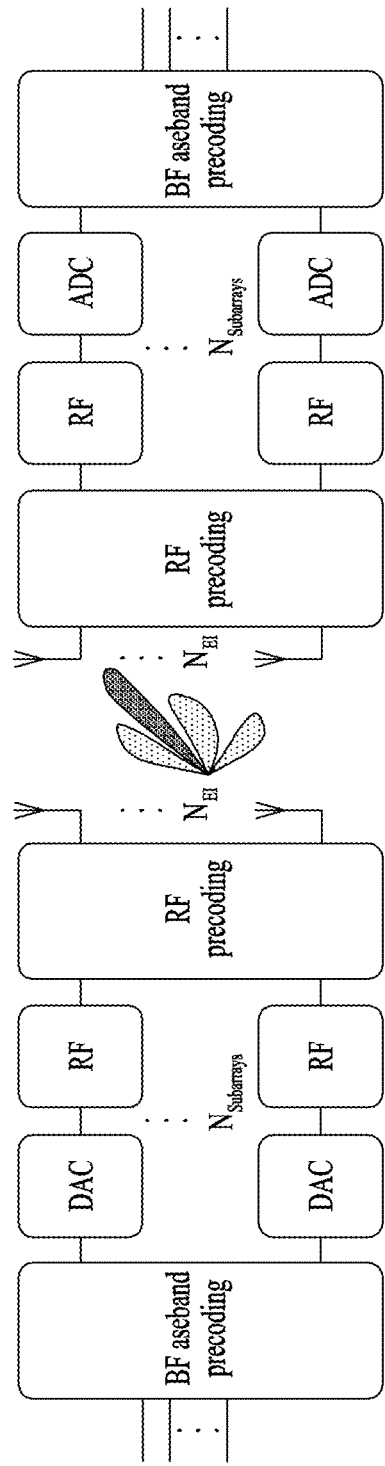
FIG. 7 is a block diagram illustrating an exemplary transmitter and receiver for hybrid beamforming.

FIG. 7 is a block diagram illustrating an exemplary transmitter and receiver for hybrid beamforming.

In hybrid beamforming, a BS or a UE may form a narrow beam by transmitting the same signal through multiple antennas, using an appropriate phase difference and thus increasing energy only in a specific direction.

Beam Management (BM)

BM is a series of processes for acquiring and maintaining a set of BS (or transmission and reception point (TRP))

beams and/or UE beams available for DL and UL transmissions/receptions. BM may include the following processes and terminology.

Beam measurement: the BS or the UE measures the characteristics of a received beamformed signal.

Beam determination: the BS or the UE selects its Tx beam/Rx beam.

Beam sweeping: a spatial domain is covered by using a Tx beam and/or an Rx beam in a predetermined method for a predetermined time interval.

Beam report: the UE reports information about a signal beamformed based on a beam measurement.

The BM procedure may be divided into (1) a DL BM procedure using an SSB or CSI-RS and (2) a UL BM procedure using an SRS. Further, each BM procedure may include Tx beam sweeping for determining a Tx beam and Rx beam sweeping for determining an Rx beam. The following description will focus on the DL BM procedure using an SSB.

The DL BM procedure using an SSB may include (1) transmission of a beamformed SSB from the BS and (2) beam reporting of the UE. An SSB may be used for both of Tx beam sweeping and Rx beam sweeping. SSB-based Rx beam sweeping may be performed by attempting SSB reception while changing Rx beams at the UE.

SSB-based beam reporting may be configured, when CSI/beam is configured in the RRC_CONNECTED state.

The UE receives information about an SSB resource set used for BM from the BS. The SSB resource set may be configured with one or more SSBIs. For each SSB resource set, SSBI 0 to SSBI 63 may be defined.

The UE receives signals in SSB resources from the BS based on the information about the SSB resource set.

When the BS configures the UE with an SSBRI and RSRP reporting, the UE reports a (best) SSBRI and an RSRP corresponding to the SSBRI to the BS.

The BS may determine a BS Tx beam for use in DL transmission to the UE based on a beam report received from the UE.

Beam Failure Recovery (BFR) Procedure

In a beamforming system, radio link failure (RLF) may often occur due to rotation or movement of a UE or beamforming blockage. Therefore, BFR is supported to prevent frequent occurrence of RLF in NR.

For beam failure detection, the BS configures beam failure detection RSs for the UE. If the number of beam failure indications from the physical layer of the UE reaches a threshold configured by RRC signaling within a period configured by RRC signaling of the BS, the UE declares beam failure.

After the beam failure is detected, the UE triggers BFR by initiating a RACH procedure on a Pcell, and performs BFR by selecting a suitable beam (if the BS provides dedicated RACH resources for certain beams, the UE performs the RACH procedure for BFR by using the dedicated RACH resources first of all). Upon completion of the RACH procedure, the UE considers that the BFR has been completed.

Ultra-Reliable and Low Latency Communication (URLLC)

A URLLC transmission defined in NR may mean a transmission with (1) a relatively small traffic size, (2) a relatively low arrival rate, (3) an extremely low latency requirement (e.g., 0.5 ms or 1 ms), (4) a relatively short transmission duration (e.g., 2 OFDM symbols), and (5) an emergency service/message.

Pre-Emption Indication

Although eMBB and URLLC services may be scheduled in non-overlapped time/frequency resources, a URLLC transmission may take place in resources scheduled for on-going eMBB traffic. To enable a UE receiving a PDSCH to determine that the PDSCH has been partially punctured due to URLLC transmission of another UE, a preemption indication may be used. The preemption indication may also be referred to as an interrupted transmission indication.

In relation to a preemption indication, the UE receives DL preemption RRC information (e.g., a DownlinkPreemption IE) from the BS by RRC signaling.

The UE receives DCI format 2_1 based on the DL preemption RRC information from the BS. For example, the UE attempts to detect a PDCCH conveying preemption indication-related DCI, DCI format 2_1 by using an int-RNTI configured by the DL preemption RRC information.

Upon detection of DCI format 2_1 for serving cell(s) configured by the DL preemption RRC information, the UE may assume that there is no transmission directed to the UE in RBs and symbols indicated by DCI format 2_1 in a set of RBs and a set of symbols during a monitoring interval shortly previous to a monitoring interval to which DCI format 2_1 belongs. For example, the UE decodes data based on signals received in the remaining resource areas, considering that a signal in a time-frequency resource indicated by a preemption indication is not a DL transmission scheduled for the UE.

Massive MTC (mMTC)

mMTC is one of 5G scenarios for supporting a hyper-connectivity service in which communication is conducted with multiple UEs at the same time. In this environment, a UE intermittently communicates at a very low transmission rate with low mobility. Accordingly, mMTC mainly seeks long operation of a UE with low cost. In this regard, MTC and narrow band-Internet of things (NB-IoT) handled in the 3GPP will be described below.

The following description is given with the appreciation that a transmission time interval (TTI) of a physical channel is a subframe. For example, a minimum time interval between the start of transmission of a physical channel and the start of transmission of the next physical channel is one subframe. However, a subframe may be replaced with a slot, a mini-slot, or multiple slots in the following description.

Machine Type Communication (MTC)

MTC is an application that does not require high throughput, applicable to machine-to-machine (M2M) or IoT. MTC is a communication technology which the 3GPP has adopted to satisfy the requirements of the IoT service.

While the following description is given mainly of features related to enhanced MTC (eMTC), the same thing is applicable to MTC, eMTC, and MTC to be applied to 5G (or NR), unless otherwise mentioned. The term MTC as used herein may be interchangeable with eMTC, LTE-M1/M2, bandwidth reduced low complexity (BL)/coverage enhanced (CE), non-BL UE (in enhanced coverage), NR MTC, enhanced BL/CE, and so on.

MTC General (1) MTC operates only in a specific system BW (or channel BW).

MTC may use a predetermined number of RBs among the RBs of a system band in the legacy LTE system or the NR system. The operating frequency BW of MTC may be defined in consideration of a frequency range and a subcarrier spacing in NR. A specific system or frequency BW in which MTC operates is referred to as an MTC narrowband (NB) or MTC subband. In NR, MTC may operate in at least one BWP or a specific band of a BWP.

While MTC is supported by a cell having a much larger BW (e.g., 10 MHz) than 1.08 MHz, a physical channel and signal transmitted/received in MTC is always limited to 1.08 MHz or 6 (LTE) RBs. For example, a narrowband is defined as 6 non-overlapped consecutive physical resource blocks (PRBs) in the frequency domain in the LTE system.

In MTC, some DL and UL channels are allocated restrictively within a narrowband, and one channel does not occupy a plurality of narrowbands in one time unit. FIG. 8(a) is a diagram illustrating an exemplary narrowband operation, and FIG. 8(b) is a diagram illustrating exemplary MTC channel repetition with RF retuning.

An MTC narrowband may be configured for a UE by system information or DCI transmitted by a BS.

(2) MTC does not use a channel (defined in legacy LTE or NR) which is to be distributed across the total system BW of the legacy LTE or NR. For example, because a legacy LTE PDCCH is distributed across the total system BW, the legacy PDCCH is not used in MTC. Instead, a new control channel, MTC PDCCH (MPDCCH) is used in MTC. The MPDCCH is transmitted/received in up to 6 RBs in the frequency domain. In the time domain, the MPDCCH may be transmitted in one or more OFDM symbols starting with an OFDM symbol of a starting OFDM symbol index indicated by an RRC parameter from the BS among the OFDM symbols of a subframe.

(3) In MTC, PBCH, PRACH, MPDCCH, PDSCH, PUCCH, and PUSCH may be transmitted repeatedly. The MTC repeated transmissions may make these channels decodable even when signal quality or power is very poor as in a harsh condition like basement, thereby leading to the effect of an increased cell radius and signal penetration.

MTC Operation Modes and Levels

For CE, two operation modes, CE Mode A and CE Mode B and four different CE levels are used in MTC, as listed in [Table 2] below.

TABLE 2

| Mode | Level | Description |
| --- | --- | --- |
| Mode A | Level 1 | No repetition for PRACH |
|  | Level 2 | Small Number of Repetition for PRACH |
| Mode B | Level 3 | Medium Number of Repetition for PRACH |
|  | Level 4 | Large Number of Repetition for PRACH |

An MTC operation mode is determined by a BS and a CE level is determined by an MTC UE.

MTC Guard Period

The position of a narrowband used for MTC may change in each specific time unit (e.g., subframe or slot). An MTC UE may tune to different frequencies in different time units. A certain time may be required for frequency retuning and thus used as a guard period for MTC. No transmission and reception take place during the guard period.

MTC Signal Transmission/Reception Method

Apart from features inherent to MTC, an MTC signal transmission/reception procedure is similar to the procedure illustrated in FIG. 2. The operation of S201 in FIG. 2 may also be performed for MTC. A PSS/SSS used in an initial cell search operation in MTC may be the legacy LTE PSS/SSS.

After acquiring synchronization with a BS by using the PSS/SSS, an MTC UE may acquire broadcast information within a cell by receiving a PBCH signal from the BS. The broadcast information transmitted on the PBCH is an MIB. In MTC, reserved bits among the bits of the legacy LTE MIB are used to transmit scheduling information for a new system information block 1 bandwidth reduced (SIB1-BR). The scheduling information for the SIB1-BR may include information about a repetition number and a TBS for a PDSCH conveying SIB1-BR. A frequency resource assignment for the PDSCH conveying SIB-BR may be a set of 6 consecutive RBs within a narrowband. The SIB-BR is transmitted directly on the PDSCH without a control channel (e.g., PDCCH or MPDCCH) associated with SIB-BR.

After completing the initial cell search, the MTC UE may acquire more specific system information by receiving an MPDCCH and a PDSCH based on information of the MPDCCH (S202).

Subsequently, the MTC UE may perform a RACH procedure to complete connection to the BS (S203 to S206). A basic configuration for the RACH procedure of the MTC UE may be transmitted in SIB2. Further, SIB2 includes paging-related parameters. In the 3GPP system, a paging occasion (PO) means a time unit in which a UE may attempt to receive paging. Paging refers to the network's indication of the presence of data to be transmitted to the UE. The MTC UE attempts to receive an MPDCCH based on a P-RNTI in a time unit corresponding to its PO in a narrowband configured for paging, paging narrowband (PNB). When the UE succeeds in decoding the MPDCCH based on the P-RNTI, the UE may check its paging message by receiving a PDSCH scheduled by the MPDCCH. In the presence of its paging message, the UE accesses the network by performing the RACH procedure.

In MTC, signals and/or messages (Msg1, Msg2, Msg3, and Msg4) may be transmitted repeatedly in the RACH procedure, and a different repetition pattern may be set according to a CE level.

For random access, PRACH resources for different CE levels are signaled by the BS. Different PRACH resources for up to 4 respective CE levels may be signaled to the MTC UE. The MTC UE measures an RSRP using a DL RS (e.g., CRS, CSI-RS, or TRS) and determines one of the CE levels signaled by the BS based on the measurement. The UE selects one of different PRACH resources (e.g., frequency, time, and preamble resources for a PARCH) for random access based on the determined CE level and transmits a PRACH. The BS may determine the CE level of the UE based on the PRACH resources that the UE has used for the PRACH transmission. The BS may determine a CE mode for the UE based on the CE level that the UE indicates by the PRACH transmission. The BS may transmit DCI to the UE in the CE mode.

Search spaces for an RAR for the PRACH and contention resolution messages are signaled in system information by the BS.

After the above procedure, the MTC UE may receive an MPDCCH signal and/or a PDSCH signal (S207) and transmit a PUSCH signal and/or a PUCCH signal (S208) in a general UL/DL signal transmission procedure. The MTC UE may transmit UCI on a PUCCH or a PUSCH to the BS.

Once an RRC connection for the MTC UE is established, the MTC UE attempts to receive an MDCCH by monitoring an MPDCCH in a configured search space in order to acquire UL and DL data allocations.

In legacy LTE, a PDSCH is scheduled by a PDCCH. Specifically, the PDCCH may be transmitted in the first N (N=1, 2 or 3) OFDM symbols of a subframe, and the PDSCH scheduled by the PDCCH is transmitted in the same subframe.

Compared to legacy LTE, an MPDCCH and a PDSCH scheduled by the MPDCCH are transmitted/received in different subframes in MTC. For example, an MPDCCH with a last repetition in subframe #n schedules a PDSCH starting in subframe #n+2. The MPDCCH may be transmitted only once or repeatedly. A maximum repetition number of the MPDCCH is configured for the UE by RRC signaling from the BS. DCI carried on the MPDCCH provides information on how many times the MPDCCH is repeated so that the UE may determine when the PDSCH transmission starts. For example, if DCI in an MPDCCH starting in subframe #n includes information indicating that the MPDCCH is repeated 10 times, the MPDCCH may end in subframe #n+9 and the PDSCH may start in subframe #n+11. The DCI carried on the MPDCCH may include information about a repetition number for a physical data channel (e.g., PUSCH or PDSCH) scheduled by the DCI. The UE may transmit/receive the physical data channel repeatedly in the time domain according to the information about the repetition number of the physical data channel scheduled by the DCI. The PDSCH may be scheduled in the same or different narrowband as or from a narrowband in which the MPDCCH scheduling the PDSCH is transmitted. When the MPDCCH and the PDSCH are in different narrowbands, the MTC UE needs to retune to the frequency of the narrowband carrying the PDSCH before decoding the PDSCH. For UL scheduling, the same timing as in legacy LTE may be followed. For example, an MPDCCH ending in subframe #n may schedule a PUSCH transmission starting in subframe #n+4. If a physical channel is repeatedly transmitted, frequency hopping is supported between different MTC subbands by RF retuning. For example, if a PDSCH is repeatedly transmitted in 32 subframes, the PDSCH is transmitted in the first 16 subframes in a first MTC subband, and in the remaining 16 subframes in a second MTC subband. MTC may operate in half-duplex mode.

Narrowband-Internet of Things (NB-IoT)

NB-IoT may refer to a system for supporting low complexity, low power consumption, and efficient use of frequency resources by a system BW corresponding to one RB of a wireless communication system (e.g., the LTE system or the NR system). NB-IoT may operate in half-duplex mode. NB-IoT may be used as a communication scheme for implementing IoT by supporting, for example, an MTC device (or UE) in a cellular system.

In NB-IoT, each UE perceives one RB as one carrier. Therefore, an RB and a carrier as mentioned in relation to NB-IoT may be interpreted as the same meaning.

While a frame structure, physical channels, multi-carrier operations, and general signal transmission/reception in relation to NB-IoT will be described below in the context of the legacy LTE system, the description is also applicable to the next generation system (e.g., the NR system). Further, the description of NB-IoT may also be applied to MTC serving similar technical purposes (e.g., low power, low cost, and coverage enhancement).

NB-IoT Frame Structure and Physical Resources

A different NB-IoT frame structure may be configured according to a subcarrier spacing. For example, for a subcarrier spacing of 15 kHz, the NB-IoT frame structure may be identical to that of a legacy system (e.g., the LTE system). For example, a 10-ms NB-IoT frame may include 10 1-ms NB-IoT subframes each including two 0.5-ms slots. Each 0.5-ms NB-IoT slot may include 7 OFDM symbols. In another example, for a BWP or cell/carrier having a subcarrier spacing of 3.75 kHz, a 10-ms NB-IoT frame may include five 2-ms NB-IoT subframes each including 7 OFDM symbols and one guard period (GP). Further, a 2-ms NB-IoT subframe may be represented in NB-IoT slots or NB-IoT resource units (RUs). The NB-IoT frame structures are not limited to the subcarrier spacings of 15 kHz and 3.75 kHz, and NB-IoT for other subcarrier spacings (e.g., 30 kHz) may also be considered by changing time/frequency units.

NB-IoT DL physical resources may be configured based on physical resources of other wireless communication systems (e.g., the LTE system or the NR system) except that a system BW is limited to a predetermined number of RBs (e.g., one RB, that is, 180 kHz). For example, if the NB-IoT DL supports only the 15-kHz subcarrier spacing as described before, the NB-IoT DL physical resources may be configured as a resource area in which the resource grid illustrated in FIG. 1 is limited to one RB in the frequency domain.

Like the NB-IoT DL physical resources, NB-IoT UL resources may also be configured by limiting a system BW to one RB. In NB-IoT, the number of UL subcarriers $N^{UL}_{SC}$ and a slot duration $T_{slot}$ may be given as illustrated in [Table 3] below. In NB-IoT of the LTE system, the duration of one slot, $T_{slot}$ is defined by 7 SC-FDMA symbols in the time domain.

TABLE 3

| Subcarrier spacing | $N^{UL}_{SC}$ | $T_{slot}$ |
| --- | --- | --- |
| $\Delta f = 3.75$ kHz | 48 | $6144 \cdot T_s$ |
| $\Delta f = 15$ kHz | 12 | $15360 \cdot T_s$ |

In NB-IoT, RUs are used for mapping to REs of a PUSCH for NB-IoT (referred to as an NPUSCH). An RU may be defined by $N^{UL}_{symb} * N^{UL}_{slot}$. SC-FDMA symbols in the time domain by $N^{RU}_{sc}$ consecutive subcarriers in the frequency domain. For example, $N^{RU}_{sc}$ and $N^{UL}_{symb}$ are listed in [Table 4] for a cell/carrier having an FDD frame structure and in [Table 5] for a cell/carrier having a TDD frame structure.

TABLE 4

| NPUSCH format | $\Delta f$ | $N^{RU}_{SC}$ | $N^{UL}_{slots}$ | $N^{UL}_{symb}$ |
| --- | --- | --- | --- | --- |
| 1 | 3.75 kHz | 1 | 16 | 7 |
|  | 15 kHz | 1 | 16 |  |
|  |  | 3 | 8 |  |
|  |  | 6 | 4 |  |
|  |  | 12 | 2 |  |
| 2 | 3.75 kHz | 1 | 4 |  |
|  | 15 kHz | 1 | 4 |  |

TABLE 5

| NPUSCH format | $\Delta f$ | Support uplink-downlink configurations | $N^{RU}_{SC}$ | $N^{UL}_{slots}$ | $N^{UL}_{symb}$ |
| --- | --- | --- | --- | --- | --- |
| 1 | 3.75 kHz | 1, 4 | 1 | 16 | 7 |
|  | 15 kHz | 1, 2, 3, 4, 5 | 1 | 16 |  |
|  |  |  | 3 | 8 |  |
|  |  |  | 6 | 4 |  |
|  |  |  | 12 | 2 |  |
| 2 | 3.75 kHz | 1, 4 | 1 | 4 |  |
|  | 15 kHz | 1, 2, 3, 4, 5 | 1 | 4 |  |

NB-IoT Physical Channels

OFDMA may be adopted for NB-IoT DL based on the 15-kHz subcarrier spacing. Because OFDMA provides orthogonality between subcarriers, co-existence with other systems (e.g., the LTE system or the NR system) may be supported efficiently. The names of DL physical channels/ signals of the NB-IoT system may be prefixed with "N (narrowband)" to be distinguished from their counterparts in the legacy system. For example, DL physical channels may be named NPBCH, NPDCCH, NPDSCH, and so on, and DL physical signals may be named NPSS, NSSS, narrowband reference signal (NRS), narrowband positioning reference signal (NPRS), narrowband wake up signal (NWUS), and so on. The DL channels, NPBCH, NPDCCH, NPDSCH, and so on may be repeatedly transmitted to enhance coverage in the NB-IoT system. Further, new defined DCI formats may be used in NB-IoT, such as DCI format NO, DCI format N1, and DCI format N2.

SC-FDMA may be applied with the 15-kHz or 3.75-kHz subcarrier spacing to NB-IoT UL. As described in relation to DL, the names of physical channels of the NB-IoT system may be prefixed with "N (narrowband)" to be distinguished from their counterparts in the legacy system. For example, UL channels may be named NPRACH, NPUSCH, and so on, and UL physical signals may be named NDMRS and so on. NPUSCHs may be classified into NPUSCH format 1 and NPUSCH format 2. For example, NPUSCH format 1 may be used to transmit (or deliver) an uplink shared channel (UL-SCH), and NPUSCH format 2 may be used for UCI transmission such as HARQ ACK signaling. A UL channel, NPRACH in the NB-IoT system may be repeatedly transmitted to enhance coverage. In this case, the repeated transmissions may be subjected to frequency hopping.

Multi-Carrier Operation in NB-IoT

NB-IoT may be implemented in multi-carrier mode. A multi-carrier operation may refer to using multiple carriers configured for different usages (i.e., multiple carriers of different types) in transmitting/receiving channels and/or signals between a BS and a UE.

In the multi-carrier mode in NB-IoT, carriers may be divided into anchor type carrier (i.e., anchor carrier or anchor PRB) and non-anchor type carrier (i.e., non-anchor carrier or non-anchor PRB).

The anchor carrier may refer to a carrier carrying an NPSS, an NSSS, and an NPBCH for initial access, and an NPDSCH for a system information block, N-SIB from the perspective of a BS. That is, a carrier for initial access is referred to as an anchor carrier, and the other carrier(s) is referred to as a non-anchor carrier in NB-IoT.

NB-IoT Signal Transmission/Reception Process

In NB-IoT, a signal is transmitted/received in a similar manner to the procedure illustrated in FIG. 2, except for features inherent to NB-IoT. Referring to FIG. 2, when an NB-IoT UE is powered on or enters a new cell, the NB-IoT UE may perform an initial cell search (S201). For the initial cell search, the NB-IoT UE may acquire synchronization with a BS and obtain information such as a cell ID by receiving an NPSS and an NSSS from the BS. Further, the NB-IoT UE may acquire broadcast information within a cell by receiving an NPBCH from the BS.

Upon completion of the initial cell search, the NB-IoT UE may acquire more specific system information by receiving an NPDCCH and receiving an NPDSCH corresponding to the NPDCCH (S202). In other words, the BS may transmit more specific system information to the NB-IoT UE which has completed the initial call search by transmitting an NPDCCH and an NPDSCH corresponding to the NPDCCH.

The NB-IoT UE may then perform a RACH procedure to complete a connection setup with the BS (S203 to S206). For this purpose, the NB-IoT UE may transmit a preamble on an NPRACH to the BS (S203). As described before, it may be configured that the NPRACH is repeatedly transmitted based on frequency hopping, for coverage enhancement. In other words, the BS may (repeatedly) receive the preamble on the NPRACH from the NB-IoT UE. The NB-IoT UE may then receive an NPDCCH, and a RAR in response to the preamble on an NPDSCH corresponding to the NPDCCH from the BS (S204). In other words, the BS may transmit the NPDCCH, and the RAR in response to the preamble on the NPDSCH corresponding to the NPDCCH to the NB-IoT UE. Subsequently, the NB-IoT UE may transmit an NPUSCH to the BS, using scheduling information in the RAR (S205) and perform a contention resolution procedure by receiving an NPDCCH and an NPDSCH corresponding to the NPDCCH (S206).

After the above process, the NB-IoT UE may perform an NPDCCH/NPDSCH reception (S207) and an NPUSCH transmission (S208) in a general UL/DL signal transmission procedure. In other words, after the above process, the BS may perform an NPDCCH/NPDSCH transmission and an NPUSCH reception with the NB-IoT UE in the general UL/DL signal transmission procedure.

In NB-IoT, the NPBCH, the NPDCCH, and the NPDSCH may be transmitted repeatedly, for coverage enhancement. A UL-SCH (i.e., general UL data) and UCI may be delivered on the PUSCH in NB-IoT. It may be configured that the UL-SCH and the UCI are transmitted in different NPUSCH formats (e.g., NPUSCH format 1 and NPUSCH format 2).

In NB-IoT, UCI may generally be transmitted on an NPUSCH. Further, the UE may transmit the NPUSCH periodically, aperiodically, or semi-persistently according to request/indication of the network (e.g., BS).

Wireless Communication Apparatus

FIG. 9 is a block diagram of an exemplary wireless communication system to which proposed methods of the present disclosure are applicable.

Referring to FIG. 9, the wireless communication system includes a first communication device 910 and/or a second communication device 920. The phrases "A and/or B" and "at least one of A or B" are may be interpreted as the same meaning. The first communication device 910 may be a BS, and the second communication device 920 may be a UE (or the first communication device 910 may be a UE, and the second communication device 920 may be a BS).

Each of the first communication device 910 and the second communication device 920 includes a processor 911 or 921, a memory 914 or 924, one or more Tx/Rx RF modules 915 or 925, a Tx processor 912 or 922, an Rx processor 913 or 923, and antennas 916 or 926. A Tx/Rx module may also be called a transceiver. The processor performs the afore-described functions, processes, and/or methods. More specifically, on DL (communication from the first communication device 910 to the second communication device 920), a higher-layer packet from a core network is provided to the processor 911. The processor 911 implements Layer 2 (i.e., L2) functionalities. On DL, the processor 911 is responsible for multiplexing between a logical channel and a transport channel, provisioning of a radio resource assignment to the second communication device 920, and signaling to the second communication device 920. The Tx processor 912 executes various signal processing functions of L1 (i.e., the physical layer). The signal processing functions facilitate forward error correction (FEC) of the second communication device 920, including coding and interleaving. An encoded and interleaved signal is modulated to complex-valued modulation symbols after scrambling and modulation. For the modulation, BPSK, QPSK, 16QAM, 64QAM, 246QAM, and so on are available according to channels. The complex-valued modulation symbols (hereinafter, referred to as modulation symbols) are divided into parallel streams. Each stream is mapped to OFDM subcarriers and multiplexed with an RS in the time and/or frequency domain. A physical channel is generated to carry a time-domain OFDM symbol stream by subjecting the mapped signals to IFFT. The OFDM symbol stream is spatially precoded to multiple spatial streams. Each spatial stream may be provided to a different antenna 916 through an individual Tx/Rx module (or transceiver) 915. Each Tx/Rx module 915 may upconvert the frequency of each spatial stream to an RF carrier, for transmission. In the second communication device 920, each Tx/Rx module (or transceiver) 925 receives a signal of the RF carrier through each antenna 926. Each Tx/Rx module 925 recovers the signal of the RF carrier to a baseband signal and provides the baseband signal to the Rx processor 923. The Rx processor 923 executes various signal processing functions of L1 (i.e., the physical layer). The Rx processor 923 may perform spatial processing on information to recover any spatial stream directed to the second communication device 920. If multiple spatial streams are directed to the second communication device 920, multiple Rx processors may combine the multiple spatial streams into a single OFDMA symbol stream. The Rx processor 923 converts an OFDM symbol stream being a time-domain signal to a frequency-domain signal by FFT. The frequency-domain signal includes an individual OFDM symbol stream on each subcarrier of an OFDM signal. Modulation symbols and an RS on each subcarrier are recovered and demodulated by determining most likely signal constellation points transmitted by the first communication device 910. These soft decisions may be based on channel estimates. The soft decisions are decoded and deinterleaved to recover the original data and control signal transmitted on physical channels by the first communication device 910. The data and control signal are provided to the processor 921.

On UL (communication from the second communication device 920 to the first communication device 910), the first communication device 910 operates in a similar manner as described in relation to the receiver function of the second communication device 920. Each Tx/Rx module 925 receives a signal through an antenna 926. Each Tx/Rx module 925 provides an RF carrier and information to the Rx processor 923. The processor 921 may be related to the memory 924 storing a program code and data. The memory 924 may be referred to as a computer-readable medium.

Artificial Intelligence (AI)

Artificial intelligence is a field of studying AI or methodologies for creating AI, and machine learning is a field of defining various issues dealt with in the AI field and studying methodologies for addressing the various issues. Machine learning is defined as an algorithm that increases the performance of a certain operation through steady experiences for the operation.

An artificial neural network (ANN) is a model used in machine learning and may generically refer to a model having a problem-solving ability, which is composed of artificial neurons (nodes) forming a network via synaptic connections. The ANN may be defined by a connection pattern between neurons in different layers, a learning process for updating model parameters, and an activation function for generating an output value.

The ANN may include an input layer, an output layer, and optionally, one or more hidden layers. Each layer includes one or more neurons, and the ANN may include a synapse that links between neurons. In the ANN, each neuron may output the function value of the activation function, for the input of signals, weights, and deflections through the synapse.

Model parameters refer to parameters determined through learning and include a weight value of a synaptic connection and deflection of neurons. A hyperparameter means a parameter to be set in the machine learning algorithm before learning, and includes a learning rate, a repetition number, a mini batch size, and an initialization function.

The purpose of learning of the ANN may be to determine model parameters that minimize a loss function. The loss function may be used as an index to determine optimal model parameters in the learning process of the ANN.

Machine learning may be classified into supervised learning, unsupervised learning, and reinforcement learning according to learning methods.

Supervised learning may be a method of training an ANN in a state in which a label for training data is given, and the label may mean a correct answer (or result value) that the ANN should infer with respect to the input of training data to the ANN. Unsupervised learning may be a method of training an ANN in a state in which a label for training data is not given. Reinforcement learning may be a learning method in which an agent defined in a certain environment is trained to select a behavior or a behavior sequence that maximizes cumulative compensation in each state.

Machine learning, which is implemented by a deep neural network (DNN) including a plurality of hidden layers among ANNs, is also referred to as deep learning, and deep learning is part of machine learning. The following description is given with the appreciation that machine learning includes deep learning.

<Robot>

A robot may refer to a machine that automatically processes or executes a given task by its own capabilities. Particularly, a robot equipped with a function of recognizing an environment and performing an operation based on its decision may be referred to as an intelligent robot.

Robots may be classified into industrial robots, medical robots, consumer robots, military robots, and so on according to their usages or application fields.

A robot may be provided with a driving unit including an actuator or a motor, and thus perform various physical operations such as moving robot joints. Further, a movable robot may include a wheel, a brake, a propeller, and the like in a driving unit, and thus travel on the ground or fly in the air through the driving unit.

<Self-Driving>

Self-driving refers to autonomous driving, and a self-driving vehicle refers to a vehicle that travels with no user manipulation or minimum user manipulation.

For example, self-driving may include a technology of maintaining a lane while driving, a technology of automatically adjusting a speed, such as adaptive cruise control, a technology of automatically traveling along a predetermined route, and a technology of automatically setting a route and traveling along the route when a destination is set.

Vehicles may include a vehicle having only an internal combustion engine, a hybrid vehicle having both an internal combustion engine and an electric motor, and an electric vehicle having only an electric motor, and may include not only an automobile but also a train, a motorcycle, and the like.

Herein, a self-driving vehicle may be regarded as a robot having a self-driving function.

<eXtended Reality (XR)>

Extended reality is a generical term covering virtual reality (VR), augmented reality (AR), and mixed reality (MR). VR provides a real-world object and background only as a computer graphic (CG) image, AR provides a virtual CG image on a real object image, and MR is a computer graphic technology that mixes and combines virtual objects into the real world.

MR is similar to AR in that the real object and the virtual object are shown together. However, in AR, the virtual object is used as a complement to the real object, whereas in MR, the virtual object and the real object are handled equally.

XR may be applied to a head-mounted display (HMD), a head-up display (HUD), a portable phone, a tablet PC, a laptop computer, a desktop computer, a TV, a digital signage, and so on. A device to which XR is applied may be referred to as an XR device.

FIG. 10 illustrates an AI device 1000 according to an embodiment of the present disclosure.

The AI device 1000 illustrated in FIG. 10 may be configured as a stationary device or a mobile device, such as a TV, a projector, a portable phone, a smartphone, a desktop computer, a laptop computer, a digital broadcasting terminal, a personal digital assistant (PDA), a portable multimedia player (PMP), a navigation device, a tablet PC, a wearable device, a set-top box (STB), a digital multimedia broadcasting (DMB) receiver, a radio, a washing machine, a refrigerator, a digital signage, a robot, or a vehicle.

Referring to FIG. 10, the AI device 1000 may include a communication unit 1010, an input unit 1020, a learning processor 1030, a sensing unit 1040, an output unit 1050, a memory 1070, and a processor 1080.

The communication unit 1010 may transmit and receive data to and from an external device such as another AI device or an AI server by wired or wireless communication. For example, the communication unit 1010 may transmit and receive sensor information, a user input, a learning model, and a control signal to and from the external device.

Communication schemes used by the communication unit 1010 include global system for mobile communication (GSM), CDMA, LTE, 5G, wireless local area network (WLAN), wireless fidelity (Wi-Fi), Bluetooth™, radio frequency identification (RFID), infrared data association (IrDA), ZigBee, near field communication (NFC), and so on. Particularly, the 5G technology described before with reference to FIGS. 1 to 9 may also be applied.

The input unit 1020 may acquire various types of data. The input unit 1020 may include a camera for inputting a video signal, a microphone for receiving an audio signal, and a user input unit for receiving information from a user. The camera or the microphone may be treated as a sensor, and thus a signal acquired from the camera or the microphone may be referred to as sensing data or sensor information.

The input unit 1020 may acquire training data for model training and input data to be used to acquire an output by using a learning model. The input unit 1020 may acquire raw input data. In this case, the processor 1080 or the learning processor 1030 may extract an input feature by preprocessing the input data.

The learning processor 1030 may train a model composed of an ANN by using training data. The trained ANN may be referred to as a learning model. The learning model may be used to infer a result value for new input data, not training data, and the inferred value may be used as a basis for determination to perform a certain operation.

The learning processor 1030 may perform AI processing together with a learning processor of an AI server.

The learning processor 1030 may include a memory integrated or implemented in the AI device 1000. Alternatively, the learning processor 1030 may be implemented by using the memory 1070, an external memory directly connected to the AI device 1000, or a memory maintained in an external device.

The sensing unit 1040 may acquire at least one of internal information about the AI device 1000, ambient environment information about the AI device 1000, and user information by using various sensors.

The sensors included in the sensing unit 1040 may include a proximity sensor, an illumination sensor, an accelerator sensor, a magnetic sensor, a gyro sensor, an inertial sensor, a red, green, blue (RGB) sensor, an IR sensor, a fingerprint recognition sensor, an ultrasonic sensor, an optical sensor, a microphone, a light detection and ranging (LiDAR), and a radar.

The output unit 1050 may generate a visual, auditory, or haptic output.

Accordingly, the output unit 1050 may include a display unit for outputting visual information, a speaker for outputting auditory information, and a haptic module for outputting haptic information.

The memory 1070 may store data that supports various functions of the AI device 1000. For example, the memory 1070 may store input data acquired by the input unit 1020, training data, a learning model, a learning history, and so on.

The processor 1080 may determine at least one executable operation of the AI device 100 based on information determined or generated by a data analysis algorithm or a machine learning algorithm. The processor 1080 may control the components of the AI device 1000 to execute the determined operation.

To this end, the processor 1080 may request, search, receive, or utilize data of the learning processor 1030 or the memory 1070. The processor 1080 may control the components of the AI device 1000 to execute a predicted operation or an operation determined to be desirable among the at least one executable operation.

When the determined operation needs to be performed in conjunction with an external device, the processor 1080 may generate a control signal for controlling the external device and transmit the generated control signal to the external device.

The processor 1080 may acquire intention information with respect to a user input and determine the user's requirements based on the acquired intention information.

The processor 1080 may acquire the intention information corresponding to the user input by using at least one of a speech to text (STT) engine for converting a speech input into a text string or a natural language processing (NLP) engine for acquiring intention information of a natural language.

At least one of the STT engine or the NLP engine may be configured as an ANN, at least part of which is trained according to the machine learning algorithm. At least one of the STT engine or the NLP engine may be trained by the learning processor, a learning processor of the AI server, or distributed processing of the learning processors. For reference, specific components of the AI server are illustrated in FIG. 11.

The processor 1080 may collect history information including the operation contents of the AI device 1000 or the user's feedback on the operation and may store the collected history information in the memory 1070 or the learning processor 1030 or transmit the collected history information to the external device such as the AI server. The collected history information may be used to update the learning model.

The processor 1080 may control at least a part of the components of AI device 1000 so as to drive an application program stored in the memory 1070. Furthermore, the processor 1080 may operate two or more of the components included in the AI device 1000 in combination so as to drive the application program.

FIG. 11 illustrates an AI server 1120 according to an embodiment of the present disclosure.

Referring to FIG. 11, the AI server 1120 may refer to a device that trains an ANN by a machine learning algorithm or uses a trained ANN. The AI server 1120 may include a plurality of servers to perform distributed processing, or may be defined as a 5G network. The AI server 1120 may be included as part of the AI device 1100, and perform at least part of the AI processing.

The AI server 1120 may include a communication unit 1121, a memory 1123, a learning processor 1122, a processor 1126, and so on.

The communication unit 1121 may transmit and receive data to and from an external device such as the AI device 1100.

The memory 1123 may include a model storage 1124. The model storage 1124 may store a model (or an ANN 1125) which has been trained or is being trained through the learning processor 1122.

The learning processor 1122 may train the ANN 1125 by training data. The learning model may be used, while being loaded on the AI server 1120 of the ANN, or on an external device such as the AI device 1110.

The learning model may be implemented in hardware, software, or a combination of hardware and software. If all or part of the learning model is implemented in software, one or more instructions of the learning model may be stored in the memory 1123.

The processor 1126 may infer a result value for new input data by using the learning model and may generate a response or a control command based on the inferred result value.

FIG. 12 illustrates an AI system according to an embodiment of the present disclosure.

Referring to FIG. 12, in the AI system, at least one of an AI server 1260, a robot 1210, a self-driving vehicle 1220, an XR device 1230, a smartphone 1240, or a home appliance 1250 is connected to a cloud network 1200. The robot 1210, the self-driving vehicle 1220, the XR device 1230, the smartphone 1240, or the home appliance 1250, to which AI is applied, may be referred to as an AI device.

The cloud network 1200 may refer to a network that forms part of cloud computing infrastructure or exists in the cloud computing infrastructure. The cloud network 1200 may be configured by using a 3G network, a 4G or LTE network, or a 5G network.

That is, the devices 1210 to 1260 included in the AI system may be interconnected via the cloud network 1200. In particular, each of the devices 1210 to 1260 may communicate with each other directly or through a BS.

The AI server 1260 may include a server that performs AI processing and a server that performs computation on big data.

The AI server 1260 may be connected to at least one of the AI devices included in the AI system, that is, at least one of the robot 1210, the self-driving vehicle 1220, the XR device 1230, the smartphone 1240, or the home appliance 1250 via the cloud network 1200, and may assist at least part of AI processing of the connected AI devices 1210 to 1250.

The AI server 1260 may train the ANN according to the machine learning algorithm on behalf of the AI devices 1210 to 1250, and may directly store the learning model or transmit the learning model to the AI devices 1210 to 1250.

The AI server 1260 may receive input data from the AI devices 1210 to 1250, infer a result value for received input data by using the learning model, generate a response or a control command based on the inferred result value, and transmit the response or the control command to the AI devices 1210 to 1250.

Alternatively, the AI devices 1210 to 1250 may infer the result value for the input data by directly using the learning model, and generate the response or the control command based on the inference result.

Hereinafter, various embodiments of the AI devices 1210 to 1250 to which the above-described technology is applied will be described. The AI devices 1210 to 1250 illustrated in FIG. 12 may be regarded as a specific embodiment of the AI device 1000 illustrated in FIG. 10.

<AI+XR>

The XR device 1230, to which AI is applied, may be configured as a HMD, a HUD provided in a vehicle, a TV, a portable phone, a smartphone, a computer, a wearable device, a home appliance, a digital signage, a vehicle, a fixed robot, a mobile robot, or the like.

The XR device 1230 may acquire information about a surrounding space or a real object by analyzing 3D point cloud data or image data acquired from various sensors or an external device and thus generating position data and attribute data for the 3D points, and may render an XR object to be output. For example, the XR device 1230 may output an XR object including additional information about a recognized object in correspondence with the recognized object.

The XR device 1230 may perform the above-described operations by using the learning model composed of at least one ANN. For example, the XR device 1230 may recognize a real object from 3D point cloud data or image data by using the learning model, and may provide information corresponding to the recognized real object. The learning model may be trained directly by the XR device 1230 or by the external device such as the AI server 1260.

While the XR device 1230 may operate by generating a result by directly using the learning model, the XR device 1230 may operate by transmitting sensor information to the external device such as the AI server 1260 and receiving the result.

<AI+Robot+XR>

The robot 1210, to which AI and XR are applied, may be implemented as a guide robot, a delivery robot, a cleaning robot, a wearable robot, an entertainment robot, a pet robot, an unmanned flying robot, a drone, or the like.

The robot 1210, to which XR is applied, may refer to a robot to be controlled/interact within an XR image. In this case, the robot 1210 may be distinguished from the XR device 1230 and interwork with the XR device 1230.

When the robot 1210 to be controlled/interact within an XR image acquires sensor information from sensors each including a camera, the robot 1210 or the XR device 1230 may generate an XR image based on the sensor information, and the XR device 1230 may output the generated XR image. The robot 1210 may operate based on the control signal received through the XR device 1230 or based on the user's interaction.

For example, the user may check an XR image corresponding to a view of the robot 1210 interworking remotely through an external device such as the XR device 1210, adjust a self-driving route of the robot 1210 through interaction, control the operation or driving of the robot 1210, or check information about an ambient object around the robot 1210.

<AI+Self-Driving+XR>

The self-driving vehicle 1220, to which AI and XR are applied, may be implemented as a mobile robot, a vehicle, an unmanned flying vehicle, or the like.

The self-driving driving vehicle 1220, to which XR is applied, may refer to a self-driving vehicle provided with a means for providing an XR image or a self-driving vehicle to be controlled/interact within an XR image. Particularly, the self-driving vehicle 1220 to be controlled/interact within an XR image may be distinguished from the XR device 1230 and interwork with the XR device 1230.

The self-driving vehicle 1220 provided with the means for providing an XR image may acquire sensor information from the sensors each including a camera and output the generated XR image based on the acquired sensor information. For example, the self-driving vehicle 1220 may include an HUD to output an XR image, thereby providing a passenger with an XR object corresponding to a real object or an object on the screen.

When the XR object is output to the HUD, at least part of the XR object may be output to be overlaid on an actual object to which the passenger's gaze is directed. When the XR object is output to a display provided in the self-driving vehicle 1220, at least part of the XR object may be output to be overlaid on the object within the screen. For example, the self-driving vehicle 1220 may output XR objects corresponding to objects such as a lane, another vehicle, a traffic light, a traffic sign, a two-wheeled vehicle, a pedestrian, a building, and so on.

When the self-driving vehicle 1220 to be controlled/interact within an XR image acquires sensor information from the sensors each including a camera, the self-driving vehicle 1220 or the XR device 1230 may generate the XR image based on the sensor information, and the XR device 1230 may output the generated XR image. The self-driving vehicle 1220 may operate based on a control signal received through an external device such as the XR device 1230 or based on the user's interaction.

VR, AR, and MR technologies of the present disclosure are applicable to various devices, particularly, for example, a HMD, a HUD attached to a vehicle, a portable phone, a tablet PC, a laptop computer, a desktop computer, a TV, and a signage. The VR, AR, and MR technologies may also be applicable to a device equipped with a flexible or rollable display.

The above-described VR, AR, and MR technologies may be implemented based on CG and distinguished by the ratios of a CG image in an image viewed by the user.

That is, VR provides a real object or background only in a CG image, whereas AR overlays a virtual CG image on an image of a real object.

MR is similar to AR in that virtual objects are mixed and combined with a real world. However, a real object and a virtual object created as a CG image are distinctive from each other and the virtual object is used to complement the real object in AR, whereas a virtual object and a real object are handled equally in MR. More specifically, for example, a hologram service is an MR representation.

These days, VR, AR, and MR are collectively called XR without distinction among them. Therefore, embodiments of the present disclosure are applicable to all of VR, AR, MR, and XR.

For example, wired/wireless communication, input interfacing, output interfacing, and computing devices are available as hardware (HW)-related element techniques applied to VR, AR, MR, and XR. Further, tracking and matching, speech recognition, interaction and user interfacing, location-based service, search, and AI are available as software (SW)-related element techniques.

Particularly, the embodiments of the present disclosure are intended to address at least one of the issues of communication with another device, efficient memory use, data throughput decrease caused by inconvenient user experience/user interface (UX/UI), video, sound, motion sickness, or other issues.

FIG. 13 is a block diagram illustrating an XR device according to embodiments of the present disclosure. The XR device 1300 includes a camera 1310, a display 1320, a sensor 1330, a processor 1340, a memory 1350, and a communication module 1360. Obviously, one or more of the modules may be deleted or modified, and one or more modules may be added to the modules, when needed, without departing from the scope and spirit of the present disclosure.

The communication module 1360 may communicate with an external device or a server, wiredly or wirelessly. The communication module 1360 may use, for example, Wi-Fi, Bluetooth, or the like, for short-range wireless communication, and for example, a 3GPP communication standard for long-range wireless communication. LTE is a technology beyond 3GPP TS 36.xxx Release 8. Specifically, LTE beyond 3GPP TS 36.xxx Release 10 is referred to as LTE-A, and LTE beyond 3GPP TS 36.xxx Release 13 is referred to as LTE-A pro. 3GPP 5G refers to a technology beyond TS 36.xxx Release 15 and a technology beyond TS 38.XXX Release 15. Specifically, the technology beyond TS 38.xxx Release 15 is referred to as 3GPP NR, and the technology beyond TS 36.xxx Release 15 is referred to as enhanced LTE. "xxx" represents the number of a technical specification. LTE/NR may be collectively referred to as a 3GPP system.

The camera 1310 may capture an ambient environment of the XR device 1300 and convert the captured image to an electric signal. The image, which has been captured and converted to an electric signal by the camera 1310, may be stored in the memory 1350 and then displayed on the display 1320 through the processor 1340. Further, the image may be displayed on the display 1320 by the processor 1340, without being stored in the memory 1350. Further, the camera 110 may have a field of view (FoV). The FoV is, for example, an area in which a real object around the camera 1310 may be detected. The camera 1310 may detect only a real object within the FoV. When a real object is located within the FoV of the camera 1310, the XR device 1300 may display an AR object corresponding to the real object. Further, the camera 1310 may detect an angle between the camera 1310 and the real object.

The sensor 1330 may include at least one sensor. For example, the sensor 1330 includes a sensing means such as a gravity sensor, a geomagnetic sensor, a motion sensor, a gyro sensor, an accelerator sensor, an inclination sensor, a brightness sensor, an altitude sensor, an olfactory sensor, a temperature sensor, a depth sensor, a pressure sensor, a bending sensor, an audio sensor, a video sensor, a global positioning system (GPS) sensor, and a touch sensor. Further, although the display 1320 may be of a fixed type, the display 1320 may be configured as a liquid crystal display (LCD), an organic light emitting diode (OLED) display, an electroluminescent display (ELD), or a micro LED (M-LED) display, to have flexibility. Herein, the sensor 1330 is designed to detect a bending degree of the display 1320 configured as the afore-described LCD, OLED display, ELD, or M-LED display.

The memory 1350 is equipped with a function of storing all or a part of result values obtained by wired/wireless communication with an external device or a service as well as a function of storing an image captured by the camera 1310. Particularly, considering the trend toward increased communication data traffic (e.g., in a 5G communication environment), efficient memory management is required. In this regard, a description will be given below with reference to FIG. 14.

FIG. 14 is a detailed block diagram of the memory 1350 illustrated in FIG. 13. With reference to FIG. 14, a swap-out process between a random access memory (RAM) and a flash memory according to an embodiment of the present disclosure will be described.

When swapping out AR/VR page data from a RAM 1410 to a flash memory 1420, a controller 1430 may swap out only one of two or more AR/VR page data of the same contents among AR/VR page data to be swapped out to the flash memory 1420.

That is, the controller 1430 may calculate an identifier (e.g., a hash function) that identifies each of the contents of the AR/VR page data to be swapped out, and determine that two or more AR/VR page data having the same identifier among the calculated identifiers contain the same contents. Accordingly, the problem that the lifetime of an AR/VR device including the flash memory 1420 as well as the lifetime of the flash memory 1420 is reduced because unnecessary AR/VR page data is stored in the flash memory 1420 may be overcome.

The operations of the controller 1430 may be implemented in software or hardware without departing from the scope of the present disclosure. More specifically, the memory illustrated in FIG. 14 is included in a HMD, a vehicle, a portable phone, a tablet PC, a laptop computer, a desktop computer, a TV, a signage, or the like, and executes a swap function.

A device according to embodiments of the present disclosure may process 3D point cloud data to provide various services such as VR, AR, MR, XR, and self-driving to a user.

A sensor collecting 3D point cloud data may be any of, for example, a LiDAR, a red, green, blue depth (RGB-D), and a 3D laser scanner. The sensor may be mounted inside or outside of a HMD, a vehicle, a portable phone, a tablet PC, a laptop computer, a desktop computer, a TV, a signage, or the like.

FIG. 15 illustrates a point cloud data processing system.

Referring to FIG. 15, a point cloud processing system 1500 includes a transmission device which acquires, encodes, and transmits point cloud data, and a reception device which acquires point cloud data by receiving and decoding video data. As illustrated in FIG. 15, point cloud data according to embodiments of the present disclosure may be acquired by capturing, synthesizing, or generating the point cloud data (S1510). During the acquisition, data (e.g., a polygon file format or standard triangle format (PLY) file) of 3D positions (x, y, z)/attributes (color, reflectance, transparency, and so on) of points may be generated. For a video of multiple frames, one or more files may be acquired. Point cloud data-related metadata (e.g., metadata related to capturing) may be generated during the capturing. The transmission device or encoder according to embodiments of the present disclosure may encode the point cloud data by video-based point cloud compression (V-PCC) or geometry-based point cloud compression (G-PCC), and output one or more video streams (S1520). V-PCC is a scheme of compressing point cloud data based on a 2D video codec such as high efficiency video coding (HEVC) or versatile video coding (VVC), G-PCC is a scheme of encoding point cloud data separately into two streams: geometry and attribute. The geometry stream may be generated by reconstructing and encoding position information about points, and the attribute stream may be generated by reconstructing and encoding attribute information (e.g., color) related to each point. In V-PCC, despite compatibility with a 2D video, much data is required to recover V-PCC-processed data (e.g., geometry video, attribute video, occupancy map video, and auxiliary information), compared to G-PCC, thereby causing a long latency in providing a service. One or more output bit streams may be encapsulated along with related metadata in the form of a file (e.g., a file format such as ISOBMFF) and transmitted over a network or through a digital storage medium (S1530).

The device or processor according to embodiments of the present disclosure may acquire one or more bit streams and related metadata by decapsulating the received video data, and recover 3D point cloud data by decoding the acquired bit streams in V-PCC or G-PCC (S1540). A renderer may render the decoded point cloud data and provide content suitable for VR/AR/MR/service to the user on a display (S1550).

As illustrated in FIG. 15, the device or processor according to embodiments of the present disclosure may perform a feedback process of transmitting various pieces of feedback information acquired during the rendering/display to the transmission device or to the decoding process (S1560). The feedback information according to embodiments of the present disclosure may include head orientation information, viewport information indicating an area that the user is viewing, and so on. Because the user interacts with a service (or content) provider through the feedback process, the device according to embodiments of the present disclosure may provide a higher data processing speed by using the afore-described V-PCC or G-PCC scheme or may enable clear video construction as well as provide various services in consideration of high user convenience.

FIG. 16 is a block diagram of an XR device 1600 including a learning processor. Compared to FIG. 13, only a learning processor 1670 is added, and thus a redundant description is avoided because FIG. 13 may be referred to for the other components.

Referring to FIG. 16, the XR device 1600 may be loaded with a learning model. The learning model may be implemented in hardware, software, or a combination of hardware and software. If the whole or part of the learning model is implemented in software, one or more instructions that form the learning model may be stored in a memory 1650.

According to embodiments of the present disclosure, a learning processor 1670 may be coupled communicably to a processor 1640, and repeatedly train a model including ANNs by using training data. An ANN is an information processing system in which multiple neurons are linked in layers, modeling an operation principle of biological neurons and links between neurons. An ANN is a statistical learning algorithm inspired by a neural network (particularly the brain in the central nervous system of an animal) in machine learning and cognitive science. Machine learning is one field of AI, in which the ability of learning without an explicit program is granted to a computer. Machine learning is a technology of studying and constructing a system for learning, predicting, and improving its capability based on empirical data, and an algorithm for the system. Therefore, according to embodiments of the present disclosure, the learning processor 1670 may infer a result value from new input data by determining optimized model parameters of an ANN. Therefore, the learning processor 1670 may analyze a device use pattern of a user based on device use history information about the user. Further, the learning processor 1670 may be configured to receive, classify, store, and output information to be used for data mining, data analysis, intelligent decision, and a machine learning algorithm and technique.

According to embodiments of the present disclosure, the processor 1640 may determine or predict at least one executable operation of the device based on data analyzed or generated by the learning processor 1670. Further, the processor 1640 may request, search, receive, or use data of the learning processor 1670, and control the XR device 1600 to perform a predicted operation or an operation determined to be desirable among the at least one executable operation. According to embodiments of the present disclosure, the processor 1640 may execute various functions of realizing intelligent emulation (i.e., knowledge-based system, reasoning system, and knowledge acquisition system). The various functions may be applied to an adaptation system, a machine learning system, and various types of systems including an ANN (e.g., a fuzzy logic system). That is, the processor 1640 may predict a user's device use pattern based on data of a use pattern analyzed by the learning processor 1670, and control the XR device 1600 to provide a more suitable XR service to the UE. Herein, the XR service includes at least one of the AR service, the VR service, or the MR service.

FIG. 17 illustrates a process of providing an XR service by the XR service 1600 of the present disclosure illustrated in FIG. 16.

According to embodiments of the present disclosure, the processor 1670 may store device use history information about a user in the memory 1650 (S1710). The device use history information may include information about the name, category, and contents of content provided to the user, information about a time at which a device has been used, information about a place in which the device has been used, time information, and information about use of an application installed in the device.

According to embodiments of the present disclosure, the learning processor 1670 may acquire device use pattern information about the user by analyzing the device use history information (S1720). For example, when the XR device 1600 provides specific content A to the user, the learning processor 1670 may learn information about a pattern of the device used by the user using the corresponding terminal by combining specific information about content A (e.g., information about the ages of users that generally use content A, information about the contents of content A, and content information similar to content A), and information about the time points, places, and number of times in which the user using the corresponding terminal has consumed content A.

According to embodiments of the present disclosure, the processor 1640 may acquire the user device pattern information generated based on the information learned by the learning processor 1670, and generate device use pattern prediction information (S1730). Further, when the user is not using the device 1600, if the processor 1640 determines that the user is located in a place where the user has frequently used the device 1600, or it is almost time for the user to usually use the device 1600, the processor 1640 may indicate the device 1600 to operate. In this case, the device according to embodiments of the present disclosure may provide AR content based on the user pattern prediction information (S1740).

When the user is using the device 1600, the processor 1640 may check information about content currently provided to the user, and generate device use pattern prediction information about the user in relation to the content (e.g., when the user requests other related content or additional data related to the current content). Further, the processor 1640 may provide AR content based on the device use pattern prediction information by indicating the device 1600 to operate (S1740). The AR content according to embodiments of the present disclosure may include an advertisement, navigation information, danger information, and so on.

FIG. 18 illustrates the outer appearances of an XR device and a robot.

Component modules of an XR device 1800 according to an embodiment of the present disclosure have been described before with reference to the previous drawings, and thus a redundant description is not provided herein.

The outer appearance of a robot 1810 illustrated in FIG. 18 is merely an example, and the robot 1810 may be implemented to have various outer appearances according to the present disclosure. For example, the robot 1810 illustrated in FIG. 18 may be a drone, a cleaner, a cook root, a wearable robot, or the like. Particularly, each component of the robot 1810 may be disposed at a different position such as up, down, left, right, back, or forth according to the shape of the robot 1810.

The robot 1810 may be provided, on the exterior thereof, with various sensors to identify ambient objects. Further, to provide specific information to a user, the robot 1810 may be provided with an interface unit 1811 on top or the rear surface 1812 thereof.

To sense movement of the robot 1810 and an ambient object, and control the robot 1810, a robot control module 1850 is mounted inside the robot 1810. The robot control module 1850 may be implemented as a software module or a hardware chip with the software module implemented therein. The robot control module 1850 may include a deep learner 1851, a sensing information processor 1852, a movement path generator 1853, and a communication module 1854.

The sensing information processor 1852 collects and processes information sensed by various types of sensors (e.g., a LiDAR sensor, an IR sensor, an ultrasonic sensor, a depth sensor, an image sensor, and a microphone) arranged in the robot 1810.

The deep learner 1851 may receive information processed by the sensing information processor 1851 or accumulative information stored during movement of the robot 1810, and output a result required for the robot 1810 to determine an ambient situation, process information, or generate a moving path.

The moving path generator 1852 may calculate a moving path of the robot 1810 by using the data calculated by the deep learner 8151 or the data processed by the sensing information processor 1852.

Because each of the XR device 1800 and the robot 1810 is provided with a communication module, the XR device 1800 and the robot 1810 may transmit and receive data by short-range wireless communication such as Wi-Fi or Bluetooth, or 5G long-range wireless communication. A technique of controlling the robot 1810 by using the XR device 1800 will be described below with reference to FIG. 19.

FIG. 19 is a flowchart illustrating a process of controlling a robot by using an XR device.

The XR device and the robot are connected communicably to a 5G network (S1901). Obviously, the XR device and the robot may transmit and receive data by any other short-range or long-range communication technology without departing from the scope of the present disclosure.

The robot captures an image/video of the surroundings of the robot by means of at least one camera installed on the interior or exterior of the robot (S1902) and transmits the captured image/video to the XR device (S1903). The XR device displays the captured image/video (S1904) and transmits a command for controlling the robot to the robot (S1905). The command may be input manually by a user of the XR device or automatically generated by AI without departing from the scope of the disclosure.

The robot executes a function corresponding to the command received in step S1905 (S1906) and transmits a result value to the XR device (S1907). The result value may be a general indicator indicating whether data has been successfully processed or not, a current captured image, or specific data in which the XR device is considered. The specific data is designed to change, for example, according to the state of the XR device. If a display of the XR device is in an off state, a command for turning on the display of the XR device is included in the result value in step S1907. Therefore, when an emergency situation occurs around the robot, even though the display of the remote XR device is turned off, a notification message may be transmitted.

AR/VR content is displayed according to the result value received in step S1907 (S1908).

According to another embodiment of the present disclosure, the XR device may display position information about the robot by using a GPS module attached to the robot.

The XR device 1300 described with reference to FIG. 13 may be connected to a vehicle that provides a self-driving service in a manner that allows wired/wireless communication, or may be mounted on the vehicle that provides the self-driving service. Accordingly, various services including AR/VR may be provided even in the vehicle that provides the self-driving service.

FIG. 20 illustrates a vehicle that provides a self-driving service.

According to embodiments of the present disclosure, a vehicle 2010 may include a car, a train, and a motor bike as transportation means traveling on a road or a railway. According to embodiments of the present disclosure, the vehicle 2010 may include all of an internal combustion engine vehicle provided with an engine as a power source, a hybrid vehicle provided with an engine and an electric motor as a power source, and an electric vehicle provided with an electric motor as a power source.

According to embodiments of the present disclosure, the vehicle 2010 may include the following components in order to control operations of the vehicle 2010: a user interface device, an object detection device, a communication device, a driving maneuver device, a main electronic control unit (ECU), a drive control device, a self-driving device, a sensing unit, and a position data generation device.

Each of the user interface device, the object detection device, the communication device, the driving maneuver device, the main ECU, the drive control device, the self-driving device, the sensing unit, and the position data generation device may generate an electric signal, and be implemented as an electronic device that exchanges electric signals.

The user interface device may receive a user input and provide information generated from the vehicle 2010 to a user in the form of a UI or UX. The user interface device may include an input/output (I/O) device and a user monitoring device. The object detection device may detect the presence or absence of an object outside of the vehicle 2010, and generate information about the object. The object detection device may include at least one of, for example, a camera, a LiDAR, an IR sensor, or an ultrasonic sensor. The camera may generate information about an object outside of the vehicle 2010. The camera may include one or more lenses, one or more image sensors, and one or more processors for generating object information. The camera may acquire information about the position, distance, or relative speed of an object by various image processing algorithms. Further, the camera may be mounted at a position where the camera may secure an FoV in the vehicle 2010, to capture an image of the surroundings of the vehicle 1020, and may be used to provide an AR/VR-based service. The LiDAR may generate information about an object outside of the vehicle 2010. The LiDAR may include a light transmitter, a light receiver, and at least one processor which is electrically coupled to the light transmitter and the light receiver, processes a received signal, and generates data about an object based on the processed signal.

The communication device may exchange signals with a device (e.g., infrastructure such as a server or a broadcasting station), another vehicle, or a terminal) outside of the vehicle 2010. The driving maneuver device is a device that receives a user input for driving. In manual mode, the vehicle 2010 may travel based on a signal provided by the driving maneuver device. The driving maneuver device may include a steering input device (e.g., a steering wheel), an acceleration input device (e.g., an accelerator pedal), and a brake input device (e.g., a brake pedal).

The sensing unit may sense a state of the vehicle 2010 and generate state information. The position data generation device may generate position data of the vehicle 2010. The position data generation device may include at least one of a GPS or a differential global positioning system (DGPS). The position data generation device may generate position data of the vehicle 2010 based on a signal generated from at least one of the GPS or the DGPS. The main ECU may provide overall control to at least one electronic device provided in the vehicle 2010, and the drive control device may electrically control a vehicle drive device in the vehicle 2010.

The self-driving device may generate a path for the self-driving service based on data acquired from the object detection device, the sensing unit, the position data generation device, and so on. The self-driving device may generate a driving plan for driving along the generated path, and generate a signal for controlling movement of the vehicle according to the driving plan. The signal generated from the self-driving device is transmitted to the drive control device, and thus the drive control device may control the vehicle drive device in the vehicle 2010.

As illustrated in FIG. 20, the vehicle 2010 that provides the self-driving service is connected to an XR device 2000 in a manner that allows wired/wireless communication. The XR device 2000 may include a processor 2001 and a memory 2002. While not shown, the XR device 2000 of FIG. 20 may further include the components of the XR device 1300 described before with reference to FIG. 13.

If the XR device 2000 is connected to the vehicle 2010 in a manner that allows wired/wireless communication. The XR device 2000 may receive/process AR/VR service-related content data that may be provided along with the self-driving service, and transmit the received/processed AR/VR service-related content data to the vehicle 2010. Further, when the XR device 2000 is mounted on the vehicle 2010, the XR device 2000 may receive/process AR/VR service-related content data according to a user input signal received through the user interface device and provide the received/processed AR/VR service-related content data to the user. In this case, the processor 2001 may receive/process the AR/VR service-related content data based on data acquired from the object detection device, the sensing unit, the position data generation device, the self-driving device, and so on. According to embodiments of the present disclosure, the AR/VR service-related content data may include entertainment content, weather information, and so on which are not related to the self-driving service as well as information related to the self-driving service such as driving information, path information for the self-driving service, driving maneuver information, vehicle state information, and object information.

FIG. 21 illustrates a process of providing an AR/VR service during a self-driving service.

According to embodiments of the present disclosure, a vehicle or a user interface device may receive a user input signal (S2110). According to embodiments of the present disclosure, the user input signal may include a signal indicating a self-driving service. According to embodiments of the present disclosure, the self-driving service may include a full self-driving service and a general self-driving service. The full self-driving service refers to perfect self-driving of a vehicle to a destination without a user's manual driving, whereas the general self-driving service refers to driving a vehicle to a destination through a user's manual driving and self-driving in combination.

It may be determined whether the user input signal according to embodiments of the present disclosure corresponds to the full self-driving service (S2120). When it is determined that the user input signal corresponds to the full self-driving service, the vehicle according to embodiments of the present disclosure may provide the full self-driving service (S2130). Because the full self-driving service does not need the user's manipulation, the vehicle according to embodiments of the present disclosure may provide VR service-related content to the user through a window of the vehicle, a side mirror of the vehicle, an HMD, or a smartphone (S2130). The VR service-related content according to embodiments of the present disclosure may be content related to full self-driving (e.g., navigation information, driving information, and external object information), and may also be content which is not related to full self-driving according to user selection (e.g., weather information, a distance image, a nature image, and a voice call image).

If it is determined that the user input signal does not correspond to the full self-driving service, the vehicle according to embodiments of the present disclosure may provide the general self-driving service (S2140). Because the FoV of the user should be secured for the user's manual driving in the general self-driving service, the vehicle according to embodiments of the present disclosure may provide AR service-related content to the user through a window of the vehicle, a side mirror of the vehicle, an HMD, or a smartphone (S2140).

The AR service-related content according to embodiments of the present disclosure may be content related to full self-driving (e.g., navigation information, driving information, and external object information), and may also be content which is not related to self-driving according to user selection (e.g., weather information, a distance image, a nature image, and a voice call image).

In general, when not using the XR device, it is recommended to store the XR device in a storage case to prevent scratches or breakdowns of the XR device. Especially when the XR device is not used, the user may keep wearing the XR device. In this case, the fatigue of the user increases due to the weight of the XR device. Thus, when not using the XR device, it is recommended to remove the XR device from the user and place the XR device in the storage case. In one example, when the user continues to use the XR device, it will be necessary to charge the XR device due to the capacity limitation of an internal battery.

In one embodiment of the present disclosure, a battery may be mounted onto the storage case to power the XR device or to charge the XR device. In this way, the storage case has the inherent function of protecting the XR device, and also has the effect of simply and easily charging the XR device when the charging is required.

FIG. 22 shows an embodiment of a storage case of an XR device according to the present disclosure. FIG. 22 shows an example where the XR device is placed in a storage case with a battery for storage and/or charging and an example where the XR device is taken out of the storage case.

In this case, the shape or internal structure of the storage case may vary depending on the XR device. Thus, the present disclosure is not limited to the above examples.

In one example of the present disclosure, components may be added to the storage case to assist or expand the functionality of the XR device in addition to the charging function of the XR device.

FIG. 22 shows an example where a display and a camera are mounted on an outer face of the storage case in accordance with the present disclosure.

FIG. 23 is a block diagram showing one embodiment of a storage case according to the present disclosure.

In one embodiment, a storage case 2300 of FIG. 23 includes a control unit 2310, a power supply unit 2320, a XR device storage unit 2325, a display unit 2330, and a camera unit 2340.

The storage case may further include an input unit 2350 for receiving an user input and a memory 2360 for storing application programs and captured images.

The storage case may further include a communication module 2370 to exchange data with the XR device or to charge the XR device.

The storage case may further include a sensing unit 2380. The sensing unit 2380 may include one or more sensors to sense at least one of information inside the storage case, environment information around the storage case, and user information.

The control unit 2310 may be a central processing unit (CPU), and may be referred to as a processor for ease of explanation.

The control unit 2310 controls overall operations of the storage case 2300.

In an embodiment, the control unit 2310 controls the power supply unit 2320 and the XR device storage unit 2325 to charge the XR device.

In one embodiment, the power supply unit 2320 includes a battery having a charging function. The battery may be a built-in battery that is integrated with the storage case and cannot be replaced by a user or a battery that may be replaced by a user. In one embodiment, the battery is a large capacity battery.

In one embodiment, the battery not only provides power required by the storage case thereto but also is electrically connected to the XR device to supply power to the XR device to charge the battery of the XR device.

Various embodiments of charging the battery of the XR device by using the battery of the power supply unit 2320 may be used.

In an embodiment, the control unit 2310 electrically connects the XR device and the storage case to each other when the XR device is inserted into a designated position inside the storage case, that is, the XR device storage unit 2325. In this case, the power supplied from the battery of the power supply unit 2320 of the storage case charges the XR device. In this case, the charging scheme may use a wireless charging scheme such as a magnetic induction scheme or a magnetic resonance scheme. When the wireless charging scheme is used, the XR device may be charged even when the XR device is placed at a designated position outside the storage case.

In another embodiment of the present disclosure, the XR device may be charged by the power supply unit 2320 by connecting the XR device and the power supply unit 2320 of the storage case via a charging cable. The power supply unit 2320 may be equipped with a USB port to supply power via the charging cable. The XR device may be provided with one of various types of terminals such as a 5-pin type, an 8-pin type, and a USB-C type to perform charging upon receiving power from the storage case. Using the charging cable, the XR device and storage case may send and receive data to and from each other.

The present disclosure assumes that the battery of the power supply unit 2320 of the storage case has been pre-charged to charge the XR device.

According to an embodiment of the present disclosure, the battery of the power supply unit 2320 of the storage case 2300 may be connected to the charger via a charging port (not shown) in a wired manner or may be wirelessly connected to the charger and thus may be charged by the charger. The power supply unit 2320 charges the battery with the supplied power. The power supply unit may supply power to each component included in the corresponding storage case 2300 or may charge a battery of an electrically connected XR device thereto.

As such, in accordance with the present disclosure, the XR device may be charged using a portable storage case, thereby allowing a low-capacity, lightweight battery to be mounted on the XR device. In this manner, it is possible to reduce the weight of the XR device, thereby reducing the fatigue delivered to the user due to the weight of the XR device when the user keeps wearing the XR device. Further, the power required by the XR device may be secured sufficiently.

In one example, the control unit 2310 may control at least some of the components of FIG. 23 to run an application stored in the memory 2360 or to execute a user command input through the input unit 2350.

The camera unit 2340 may be composed of one or more cameras to capture an image. The captured image may be at least one of a still image and a moving image. The images captured by the camera unit 2340 may be displayed on the display unit 2330 or stored in the memory 2360 depending on the capturing purpose or user command. This image may be transmitted to the XR device through the communication module 2370. For example, when an image captured by the camera unit 2340 is transmitted to the XR device through the communication module 2370, the image may or may not be stored in the memory 2360 of the storage case. One or more cameras of the camera unit 2340 may be fixed on the storage case 2300. At least one camera may rotate.

The capturing command to the camera unit 2340 may be input thereto via the input unit 2350. Alternatively, the capturing command may be input thereto through the communication module 2370 from the paired XR device thereto.

The display unit 2330 may implement a touch screen by forming a layer structure with a touch sensor or by being formed integrally with the touch sensor.

The display unit 2330 may display an image captured using one or more cameras. The display unit may output data provided by the XR device. The display unit may display visual information such as text and images provided through memory or the Internet.

The input unit 2350 may include a microphone, touch input means, etc. to receive a user's touch input or voice input. As an example, the touch input means may include a virtual key, a soft key, a soft key, or a visual key visual key displayed on the touch screen through a software process, or a touch key disposed on a portion other than the touch screen. In one example, the virtual key or visual key may be displayed on the touch screen in various forms. For example, the virtual key or visual key may be composed of graphic, text, icon, video, or a combination thereof.

In one embodiment, the touch input or voice input through the input unit 2350 is analyzed by the control unit 2310 and processed into a user's control command. The input unit 2350 may include a microphone, touch key, push key (mechanical key), and the like. when the storage case is not equipped with the input unit 2350, the control unit 2310 of the storage case may receive a user command from the paired XR device therewith.

The memory 2360 may include volatile and/or nonvolatile memory to store instructions or data that support various functions of the storage case. That is, the memory 2360 may store a plurality of application programs or applications that are driven in the storage case, data or instructions for operating the storage case or the XR device. At least some of these applications may be downloaded from an external server via wireless communication using the communication module 2370. The memory 2360 may store images captured through the camera unit 2340.

The storage case and the XR device may exchange data each other or may be associated with each other via the communication module 2370. In one embodiment, pairing is performed between the two devices, that is, the storage case and the XR device. For this purpose, the communication module 2370 may include a short-range communication module. The short-range communication module could be based on Bluetooth, Wi-Fi, etc. That is, the data processed by the storage case may be transmitted to the XR device through the communication module 2370. Data processed by the XR device may be transmitted to the storage case via the communication module 2370.

Further, the communication module 2370 may use 5G communication to exchange data with other devices or servers remote therefrom and other than the XR device.

Embodiments using the storage case and the XR device will be described in detail later.

For components among the components included in FIG. 23 or operations thereof that are not described, reference may be made to FIG. 10, FIG. 13, and FIG. 16.

In one example of the present disclosure, the XR device may be of an HMD type such as (a) in FIG. 24 or may be of a glass type with an AR function, such as (b) in FIG. 24. All XR devices that may be stored in the storage case may be included in a scope of the present disclosure.

The XR device 100*a* of the HMD type shown in (a) of FIG. 24 includes a communication unit 110, a control unit 120, a memory unit 130, an I/O unit 140*a*, a sensor unit 140*b*, and a power supply unit 140*c*. In particular, the communication unit 110 in the XR device 10*a* performs wired/wireless communication with a mobile terminal 100*b*.

(b) of FIG. 24 shows an embodiment of a perspective view of a glass-type XR device having an AR function according to the present disclosure.

FIG. 25 is a block diagram showing another embodiment of the XR device according to the present disclosure. The device in FIG. 25 may be applied to the XR device of (b) of FIG. 24 in an embodiment.

Components that are not shown or described in FIG. 24(*b*) and FIG. 25 may be the same as those as described above with reference to FIG. 13 and FIG. 16, and, thus, descriptions thereof will be omitted.

A glass-type XR device 2500 having an AR function according to the present disclosure may include a frame 2400, a control unit 2410, and a display unit 2430.

The frame 2400 may have a form of glasses worn on a face of the user 2420, as shown in (b) of FIG. 24, but is not limited thereto. The frame 2400 may have a shape such as goggles worn close to the face of the user 2420.

Such a frame 2400 may include a front frame and first and second side frames.

The front frame has at least one opening defined therein and extends in a first horizontal direction x. The first and second side frames may extend in a second horizontal direction y crossing the front frame and may extend in parallel with each other.

The control unit 2410 may create a still image or a moving image to be shown to the user 2420. To this end, the control unit 2410 may include an image source for generating an image and a plurality of lenses for diffusing and converging light generated from the image source. The image generated by the control unit 2410 may be emitted to the display unit 2430 through a guide lens P2410 positioned between the control unit 2410 and the display unit 2430.

The control unit 2410 may be fixed to one side frame of the first and second side frames. For example, the control unit 2410 may be fixed to an inner face or outer face of one side frame, or may be integrally embedded in one side frame.

The display unit 2430 may be used to make the image created by the control unit 2410 visible to the user 2420. The display unit 2430 may be made of a translucent or transparent material so that the external environment may be visible to the user through the opening while the image is visible to the user 2420. The display unit 2430 may display an image provided from the storage case 2300. Further, in an embodiment, the display unit 2430 may be configured for displaying not only an image but also visual information such as text and diagrams.

The display unit 2430 according to the present disclosure may be inserted into and fixed to an opening included in the front frame, or may be positioned on a back of the opening, that is, between the opening and the user and may be fixed to the front frame. In accordance with the present disclosure, an example where the display unit 2430 is located on the back of the opening and is fixed to the front frame is shown.

In Such an XR device, when image light corresponding to the image is incident from the control unit 2410 to an incident area 51 of the display unit 2430, as shown in (b) of FIG. 24, the incident image light is directed to an exit area S2 of the display unit 2430. Thus, the image created by the control unit 2410 may be visible to the user 2420.

Therefore, the user 2420 may view the external environment through the opening of the frame 2400 and simultaneously view the image generated by the control unit 2410. That is, the image output through the display unit 2430 may be provided to the user while overlapping with the actual external environment. In other words, the XR device may provide the user 2420 with an AR function in which the real image and the virtual image are overlapped with each other to form one image using the display characteristic.

The XR device in accordance with the present disclosure may further include a camera unit 2440. The camera unit 2440 may include more than one camera. The one or more cameras are disposed adjacent to at least one of the left and right eyes or between the left and right eyes to capture an image of a front scene. As described above, when one or more cameras are positioned adjacent to the eye, the one or more cameras may acquire a scene viewed by the user as an image. The image captured by the camera unit may be a still image or a moving image. Alternatively, one or more cameras may be disposed adjacent to the left eye and the right eye, respectively, or may be disposed at positions other than the positions adjacent to the left and right eyes, for example, may be disposed on a side face of the frame.

The control unit 2410 may analyze the user's touch input or voice input to activate the display unit 2430 or camera unit 2440.

The control unit 2410 may be a CPU. For the convenience of explanation, as used herein, the control unit may be sometimes called a processor.

Further, the XR device may further include an input unit 2450 to receive user's touch or voice input. In one embodiment, the touch input or voice input received by the input unit 2450 is provided to the control unit 2410 and is processed by the control unit 2410 into a user command or a control command. The input unit 2450 may include a microphone, touch key, push key (mechanical key), and the like.

Further, the user input processed by the control unit 2410 may be utilized in various ways depending on the function being executed on the XR device or the running application programs thereon.

The XR device in (b) in FIG. 24 may further include an output unit 2485. In an embodiment, the output unit 2485 includes a speaker. The speaker may include at least one of a loudspeaker and a bone conduction speaker. The bone conduction speaker vibrates the skull to transmit sound. The bone conduction speaker may be configured to be extractable from the XR device.

The output unit 2485 outputs the processing result or current status in the form of voice according to the control of the control unit 2410. In FIG. 25, the display unit 2430 is shown separately from the output unit 2485, but the output unit 2485 may include the display unit 2430.

The XR device 2500 according to the present disclosure includes a power supply unit 2420. The power supply unit 2420 includes a rechargeable battery.

The battery included in the power supply unit 2420 may be built in the XR device 2500 or may be configured to be detachable from the XR device 2500. That is, the battery included in the power supply unit 2420 may be a built-in battery that is not replaceable by the user or a battery that is replaceable by the user.

The power supply unit 2420 supplies the power required by each component of the XR device thereto.

According to an embodiment of the present disclosure, the battery of the power supply unit 2420 of the XR device may be connected to the charger via a charging port (not shown) in a wired manner or may be wirelessly connected to the charger and thus may be charged by the charger. The power supply unit 2420 charges the battery with the supplied power. The power supply unit may supply power to each component included in the corresponding XR device.

Further, the battery of the power supply unit 2420 of the XR device 2500 may be electrically connected to the battery of the storage case 2300 and may be charged by the power from the battery of the storage case 2300.

The embodiment in which the battery included in the power supply unit 2420 of the XR device 2500 is charged by the power provided from the storage case 2300 has been described in detail in the description of the storage case of FIG. 22 and FIG. 23. Thus, detailed descriptions thereof will be omitted.

The control unit 2410 controls overall operations of the XR device in addition to the above operations and controls.

The XR device 2500 may further include a memory 2460 to store applications, store captured images, etc.

The control unit 2410 may process input or output signals, data, or information to provide appropriate information or functions to the user. The control unit may execute an application stored in the memory 2460 to provide the user with the appropriate information or functionality.

The XR device 2500 may further include a learning processor 2490 to record and learn user experiences. The learning processor 2490 may perform AI processing together with a learning processor of the AI server. For details on recording and learning the user experience by the learning processor 2490, reference may be made to FIG. 10 to FIG. 12. Thus, the detailed description thereof is omitted below. The learning processor may be included in the storage case according to the present disclosure.

At least some of the elements of the XR device may operate in cooperation with each other to implement an operation, control, or control method according to various embodiments as described below. Further, the operation, control, or control method of the XR device may be implemented on the XR device via execution of at least one application program stored in the memory 2460.

The present disclosure may provide various services for user convenience by using only the storage case or the XR device or by associating the storage case and XR device with each other. When providing various services for user convenience, at least one of the above-described 5G communication technology, robot technology, autonomous driving technology, and AI technology may be applied.

As used herein, for convenience of explanation a combination of the storage case and the XR device may be referred to as the XR system.

As used herein, a service using at least one of a storage case and an XR device may be referred to as a mate service or an AR mate service. The mate service provided in accordance with the present disclosure is more useful when no camera is installed on the XR device due to privacy infringement.

Next, various embodiments of the mate service will be described. In one embodiment, in order to perform various mate services according to the present disclosure, the XR device and storage case may have been charged and the user may be wearing an XR device. Further, In an embodiment, the storage case and the XR device are paired with each other via their respective communication modules, and data and commands may be exchanged with each other.

FIG. 26 and FIG. 27 illustrate an embodiment of a cooking mate service in accordance with the present disclosure, in which a storage case and an XR device are used to check food material, recipes, and cooking processes and provides a voice guidance based on the checking result to the user when the user cooks food.

FIG. 26 shows a flowchart of an embodiment of a cooking guide process according to the present disclosure. FIG. 27 shows an example of an actual scene of the cooking guide process according to the present disclosure. FIG. 26 and FIG. 27 will be described together.

That is, the user prepares the cooking materials for the cooking and captures them using the camera unit 2340 of the storage case 2300 (S2610).

In this connection, the user may pick up the storage case 2300 and capture the cooking materials directly. Alternatively, the capturing may be performed by placing the storage case 2400 in a position where the cooking materials are visible to the storage case 2400.

The cooking materials captured by the camera unit 2340 of the storage case are transferred to the XR device 2500.

In one embodiment, the control unit 2410 of the XR device 2500 compares the captured image of the cooking materials sent from the storage case 2300 with the corresponding recipe and analyzes the comparison. Then, the control unit 2410 outputs the analysis result in a voice manner through the output unit 2485 (S2620). For example, when a captured image of cooking materials is sent to the control unit from the storage case 2300, the control unit 2410 may control the output unit 2485 to output a voice indicating "checking the material". Then, when, from checking result, a particular material, for example, onion is missing, the output unit 2485 may output a voice saying "onion is missing" under control of the control unit 2410. When the output unit 2485 tells the user that the material is missing, the user may replenish the missing material and then start cooking or may start cooking without the missing material. For example, the user may input a command to start cooking without the missing material through the input unit 2450.

Then, the recipe corresponding to the cooking materials may be a recipe that the user has previously entered into the storage case 2300 and/or XR device 2500. Alternatively, the recipe corresponding to the cooking materials may be a recipe that the user searches for the Internet through the communication modules of the storage case 2300 and/or the XR device 2500. Alternatively, when the XR device 2500 includes a learning processor 2490, the recipe may be a user-optimized recipe, for example, as obtained by analyzing, an learned user experience including a user's taste, a previous cooking history, a user search history, and the like. The learning processor may be included in the storage case 2300. In this case, the learning processor of the storage case 2300 analyzes the learned user experience including a user's taste, a previous cooking history, a user search history, and the like to determine the optimized recipe to the user. The determined recipe may be sent from the processor to the XR device 2500. As another example, the storage case 2300 may be used to compare the captured image of the cooking materials with the corresponding recipe and analyze the comparison.

In one embodiment, when the step S2620 is performed and then the cooking material check process is finished and the user starts cooking, the user's cooking process is captured by the storage case 2300 and then transmitted to the XR device 2500 (S2612). In this connection, the display unit 2330 of the storage case 2300 may display the cooking recipe for the user to reference the recipe while cooking. The recipe may include guidance including at least one of a character, a still image, a moving image, or a combination of two or more thereof. Alternatively, the recipe of the cooking may be displayed on the display unit 2430 of the XR device 2500 or may be output in an audio manner via the output unit 2485.

Further, the storage case 2300 and XR device 2500 are associated with each other. Thus, in one embodiment, the cooking recipe provided through the storage case 2300 or XR device 2500 may be synchronized with the cooking speed of the user. For example, when the actual cooking speed of the user is slower than the cooking speed of the recipe being displayed, the control unit may slow down the cooking speed of the displayed recipe.

The control unit 2410 of the XR device 2500 compares and analyzes the cooking process of the user and the recipe content of the cooking. Whenever it is determined that the user needs the cooking guide, the control unit may control the output unit 2485 to output the contents of the guide to the user in step S2622.

For example, when a user is cutting paprika, and the user is cutting in a thicker manner than a cutting thickness of the paprika in the recipe, the output unit 2485 may guide the user by outputting a video saying "Cut the paprika in a thinner manner than the current thickness". When the material cutting has been completed, the output unit 2485 may guide the user by outputting a video saying "vegetable cutting being completed! Next, fry the cut vegetable on oil".

When the user completes the cooking (S2614), the storage case 2300 stores the information related to the cooking in the memory 2360 in order to record the history of the cooking, or transmits the information to the XR device 2500 to store the information in the memory 2460 of the XR device 2500 (S2616). The information related to the cooking may include a completed cooking picture, cooking date, cooking time, actual cooking materials, cooking process, recipe of the cooking. These records may be learned from the user's experience by the learning processor so that they may be referenced later when the user does the same or similar cooking to determine a corresponding recipe. Addition and deletion of the information related to the cooking may be easily performed by those skilled in the art. Thus, the present disclosure will not be limited to the described embodiment.

In the described-above example, the storage case 2300 transfers the captured image to the XR device 2500, and the XR device 2500 compares and analyzes the captured image and the output unit outputs the content according to the result of analysis. In another embodiment of present disclosure, the storage case 2300 may perform the capturing, comparison and analysis. Then, the analysis results may be transmitted therefrom to the XR device 2500 so that the analysis results may be output in voice from the XR device 2500.

FIG. 28 shows an embodiment of a sports mate service according to the present disclosure. In particular, FIG. 28 shows an example of analyzing a user's golf swing and performing personal golf coaching using a storage case and an XR device.

In other words, the user performs a golf swing and captures the swing using the camera unit 2340 of the storage case 2400. In this case, it is assumed that the storage case 2300 is disposed at a position where the camera unit may capture the golf swing of the user.

In this connection, the user may swing using an actual golf club or perform only a swing motion without the golf club. Alternatively, the swing may be performed using a virtual golf club provided on the display 2430 of the XR device 2500. In this connection, the XR device 2500 may provide a virtual golf ball on the display unit 2430.

The swing motion image captured by the storage case 2300 may be stored in a memory 2360 of the storage case 2300 and then transferred to the XR device 2500. Alternatively, the swing motion image may be transferred to the XR device 2500 without being stored in the storage case 2300.

In one embodiment, the swing motion image captured by the storage case 2300 is transmitted to the XR device 2500 whenever one swing is completed. In this connection, the captured image may be continuous images captured at predetermined time intervals, or may be a moving image.

In accordance with the present disclosure, the type of swing is not limited to a specific swing type. Various types of swings form strong drive shots to putting may be performed by the user and may be captured.

When the swing motion image captured by the storage case 2300 is transmitted to the XR device 2500, the device 2500 may automatically store the image into the memory 2460 or may ask the user about whether to save the image via the output unit 2485. For example, the output unit 2485 may output a voice saying "I performed continuous capturing of the swing. Do you want to save it". In this connection, when the user answers "yes" through the input unit 2450 or enters a command corresponding to "yes", the swing motion image is stored in the memory 2460.

Then, according to an embodiment, the control unit 2410 compares the swing motion image as captured and transmitted from the storage case 2300 thereto with a reference swing motion image and analyzes the comparison. Then, the swing analysis result is output in a voice manner through the output unit 2485. For example, the output unit 2485 may output a voice saying "the right upper arm portion is separated from a main body".

In this connection, the swing analysis may be performed upon request from the user. Alternatively, whenever a set of swings is completed, the swing analysis may be performed automatically and the analysis results may be spoken back to the user. The reference swing motion image may be a swing motion image of a specific golf player or a teaching swing motion image. The reference swing motion image may be pre-stored in at least one memory of the storage case 2300 and the XR device 2500 or may be provided in real time via a communication module.

In addition, the storage case 2300 and the XR device 2500 may use the swing analysis results to perform personal coaching to the user. The personal coaching may be done automatically when the user's swing analysis is completed. Alternatively, the personal coaching may be performed when the user has selected the personal coaching.

In accordance with the present disclosure, one embodiment in which the control unit asks the user whether to receive the personal coaching and the personal coaching is performed when the user selects the personal coaching through the input unit 2450 will be set forth.

For the personal coaching, the display unit 2330 of the storage case 2300 may display a golf teacher, a golf teacher's swing motion image, and so on. As another example, the golf teacher, the swing motion image of the golf teacher, etc. may be displayed in an AR form on the display unit 2430 of the XR device 2500.

The golf teacher and/or the golf teacher swing motion image displayed on the display unit 2330 of the storage case 2300 or the display unit 2430 of XR device 2500 for the personal coaching may be a previously stored image, or may be provided in real time through the corresponding communication module 2370 or 2470.

In this connection, according to an embodiment, the communication module may exchange data with the golf teacher in real time using short-range wireless communication such as Wi-Fi, Bluetooth, or long-range wireless communication such as 5G. For example, the swing motion image of the user is transmitted to the golf teacher at a remote location over the 5G network via the communication module. The golf teacher's swing motion at a remote location is provided to the user over the 5G network via the communication module.

Then, the swing motion image of the user captured by the camera unit 2340 of the storage case 2300 may be transmitted to a remote golf teacher via the communication module 2370 of the storage case 2300. Alternatively, the swing motion image captured by the camera unit 2340 of the storage case 2300 may be transmitted to the XR device 2500 which then transmits the image to a remote golf teacher via the communication module 2470 of the XR device 2500. The swing motion image provided by the golf teacher may be transmitted to the user in a similar manner.

Further, the display unit 2330 of the storage case 2300 splits a screen a screen thereof into upper and lower or left and right sub-screens. One of the split sub screens displays a swing teacher's swing motion and the other sub screen displays a swing motion of the user captured by the camera unit 2340 so that the user may directly grasp a difference between the two swing motions. As another example, one of the display unit 2330 of the storage case 2300 and the display unit 2430 of the XR device 2500 may display the swing movement of the golf teacher, while the other thereof displays the swing movement of the user. In addition, through the output unit 2485 of the XR device 2500, the swing motion of the user may be corrected in an audio manner. For example, the output unit may output a voice saying "turn your head slowly".

As such, the control unit 2310 of the storage case 2300 or the control unit 2410 of the XR device 2500 may analyze the swing motion of the user and coach the user. In this connection, in one embodiment, the coaching is performed by comparing and analyzing the swing motion of the user captured by the storage case 2300, the previous swing motion image of the user, and the reference swing motion image.

During the personal coaching or when the personal coaching ends, the control unit 2410 of the XR device 2500 may control the output unit 2485 to output the user's current swing state in an audio manner. For example, the output unit 2485 may output a voice saying "your ball flying distance increases by 10 yards".

When the user's personal coaching ends, the control unit 2310 of the storage case 2300 and/or control unit 2410 of the XR device 2500 records the user's experience, for example, the user's exercise amount, exercise time, swing analysis results, and coaching details in the memory. These records may be learned as the user experience by the learning processor 2490 and later used for swing analysis or personal coaching of the user.

In the above embodiments, the golf swing analysis and personal coaching have been described. However, the present disclosure is applicable to other sports where the device may analyze and coach a user's pose. For example, the present disclosure may be applied to table tennis, squash, tennis, etc.

FIG. 29 and FIG. 30 show embodiments of a secretary mate service in accordance with the present disclosure. FIG. 29 and FIG. 30 show examples that various information about the user may be collected and the user's life style may be analyzed, using at least one of the storage case and XR device and the AI function to provide user-customized services, thereby to allow user's daily life to be more convenient and abundant. FIG. 29 shows an example of providing a secretary mate service when a user walks. FIG. 30 shows an example of providing a secretary mate service when a user drives a car. Especially when using the autonomous vehicle, the user does not have to involve driving. Thus, the example of FIG. 30 is more effective when applied to the autonomous driving vehicle. Detailed descriptions of the autonomous driving vehicles in accordance with the present disclosure are shown in FIG. 20 and FIG. 21, and are omitted below. In this connection, an autonomous driving vehicle may be considered as a robot with the autonomous driving capability.

In an embodiment of the present disclosure, a learning processor 2490 in the XR device 2500 may learn the user's habits, lifestyle patterns, dispositions and the like. Further, the XR device 2500 in accordance with the present disclosure incorporates a navigation unit 2495 to provide the user with directions to a destination.

That is, the XR device 2500 according to the present disclosure provides neighborhood information that matches the user's life pattern based on the user's current location and the user's expected movement route. In particular, when the user moves by walking, the user's walking speed and the distance to the user's destination may be analyzed to provide a desired walking speed of the user to the user.

In FIG. 29, in one embodiment, following user life patterns may be assumed: the user's favorite coffee is Americano, and the favorite coffee shop brand is Starbucks, and the user drinks coffee around 2 o'clock. Further, the user experience including the user life patterns may be learned by the learning processor 2490. Further, it may be assumed that a meeting of the user is scheduled at LG Electronics building near Magognaru Station at 3 pm. The schedule information of the user is pre-stored.

For example, when the user wears an XR device 2500 and is walking to the destination LG electronics building, it may be assumed that the current time is 1:45 P.M. and there is a Starbucks coffee shop nearby the user. The control unit 2410 of the XR device 2500 controls the output unit 2485 to inform the user that there is a Starbucks coffee shop nearby the user. Further, the control unit may ask the user when the user wants to have coffee. For example, the output unit 2485 will output a voice saying "your favorite coffee shop is nearby" and "do you want to order coffee". In this connection, the criteria for the XR device 2500 to notify the user that the user preferred coffee shop is nearby the user may be determined in consideration of the time when the user used to drink coffee, the distance between the user and the coffee shop, and the moving time. For example, when a user preferring coffee shop is present at a distance corresponding to the user walking for about 10 minutes and a current time is between 1:30 and 2:30 P.M., the output unit 2485 will output a voice saying "your favorite coffee shop is nearby" and "do you want to order coffee". In this connection, the user preferred coffee learned by the learning processor 2490 is American, but the user may order a different type of coffee. Thus, the XR device 2500 may ask the user when the user would like to order Americano.

When a user enters a user command to order the coffee via the input unit 2450, the XR device 2500 orders American coffee to a nearby Starbucks coffee shop via the communication module 2470. As another example, a user may order another kind coffee, for example, Latte instead of Americano. The user command input to the input unit 2450 may be a user voice saying "yes" or "no", or a key input such as a touch key or a button key.

When a user card or payment means is pre-registered on the XR device 2500, the XR device 2500 may proceed with payment together with the coffee order. The communication module 2470 may use the 5G network to communicate with a server at a nearby Starbucks coffee shop, i.e., an external server, to order the coffee and pay for the coffee. When the user payment means is not pre-registered or the user wants to pay in cash, the user may order coffee only and then pay for the coffee when the user receives the coffee at a Starbucks coffee shop.

Then, when the coffee order is completed, the navigation unit 2495 on the XR device 2500 may output via the output unit 2485 a voice indicating a distance between a current location and the Starbucks coffee shop where the coffee was ordered. For example, the voice may say "it might take 10 minutes to reach the coffee shop".

Subsequently, in one embodiment, the navigation unit 2495 of the XR device 2500 proceeds to guide the user to the coffee shop where the coffee was ordered. For example, the navigation unit 2495 may control the output unit 2485 to output a voice saying "turn left" and "go straight by 100 meters and then turn right at a crossroad".

In this connection, the XR device 2500 may indicate the user to walk slowly or fast, with taking into account the user's walking speed and the time it takes for the coffee as ordered to be ready in the coffee shop. In accordance with the present disclosure, the control unit may obtain the walking speed of the user using the sensing unit 2480. Then, the XR device 2500 may use the communication module 2470 to communicate with Starbucks where the coffee was ordered to obtain a time consumed for the coffee preparation to be completed in Starbucks. To this end, in one embodiment, the Starbucks informs the XR device 2500 of the time it takes for the coffee preparation to be completed when the user's coffee order is completed using the XR device 2500. The time consumed for the coffee preparation to be completed may vary depending on the type of coffee as ordered by the user and the order status of others prior to the user order.

For example, when the XR device 2500 receives information through the communication module 2470 that the time consumed for the coffee preparation to be completed is 8 minutes after the order of the coffee, the output unit 2485 may be used to guide the user to walk more quickly in an audio manner.

In another example, when the number of the coffee orders is larger prior to the user order, and thus, the time consumed for the coffee preparation to be completed is 15 minutes after the order of the coffee, the output unit 2485 may be used to guide the user to walk more slowly in an audio manner. Further, when the XR device 2500 may guide the user to walk more slowly or quickly in an audio manner, the device 2500 may inform the user of a time when the coffee is up.

As another example, the server in the coffee shop may search for the location of the user who ordered the coffee at the coffee shop and adjust the time when the coffee is up in consideration of the time the user may arrive at the coffee shop and may inform the adjusted time to the XR device 2500. Conversely, the XR device 2500 may inform the coffee shop of the user's current location and/or estimated time of arrival via the communication module 2470 so that the coffee may be up at the user's estimated time of arrival.

In this way, the user may receive the ordered coffee immediately at the coffee shop without waiting.

In one example, the user has to arrive at the LG Electronics building near Magognaru Station before 3:00 P.M., as illustrated above. Therefore, it may be assumed that after receiving the coffee at the coffee shop, the user walks to the nearest subway station to take the subway to Magognaru Station.

In this connection, in an example, the XR device 2500 informs the user of the way to the nearest subway station via the navigation unit 2495 and output unit 2485. In this connection, when the nearest subway station is a station the user uses frequently, this station has already been learned by the learning processor 2490. Thus, even when the user does not input the subway station into the XR device 2500, the XR device 2500 can automatically guide the user along the way to the subway station. When the station you want to go to is not the subway station the user uses frequently, the user may input the target subway station via the input unit 2450 in advance or after receiving the coffee. Alternatively, the navigation unit 2495 of the XR device 2500 may search for the nearest station and guide the user automatically to the nearest station.

In this connection, the XR device 2500 may guide the user to walk more slowly or quickly in consideration of the subway station the user wishes to go to, the time of the train arriving at the subway station, and the time taken for the train at the subway station to reach the Magognaru Station.

Therefore, the user may take the train immediately without waiting at the subway station. In this connection, the XR device 2500 may output, via the output unit 2485, the time required for the train at the subway station on which the user boards to reach the Magognaru station. For example, the XR device 2500 may output, via the output unit 2485, a voice saying "it may take 30 minutes to get to Magognaru station".

When the user arrives at LG Electronics building near the Magognaru Station and the above service is terminated, the XR device 2500 records, in the corresponding memory 2460, the history of a user's specific actions or events while the user gets to the Magognaru station. For example, the location of the coffee shop where the coffee was ordered, the type of coffee, and the subway station where the train was taken to go to Magognaru station may be recorded. Those records may be learned as the user experience by the learning processor 2490 and may be used to determine the user's lifestyle.

FIG. 30 shows that when a user uses a car to go to work, as mentioned above, the XR device 2500 provides information about the nearby location that matches the user's life pattern based on the user's current location, and informs how long it takes to get to the company and how to get there. In accordance with the present disclosure, the storage case 2300 may be disposed at a position of the vehicle where the surrounding scene outside the car may be visible to the storage case 230. For example, the storage case 2300 may be mounted on a dashboard and may be used as a black box. In other words, the storage case 2300 installed at the location where the surrounding scene outside the car may be visible to the storage case 230 may capture the front or the rear scene while the user is driving a car and store the captured scene in the memory 2360 or transmit the captured scene to the XR device 2500 to store the memory 2460 in the XR device 2500. Thus, the storage case 230 may be used as a black box.

In FIG. 30, in one embodiment, following user life patterns may be assumed: the user's favorite coffee is Americano, and the favorite coffee shop brand is Starbucks, and the user drinks coffee in the morning. Further, the user experience including the user life patterns may be learned by the learning processor 2490.

In one embodiment of the present disclosure, when a user wears an XR device 2500 and sits on the driver's seat or starts driving, the navigation unit 2495 and the output unit 2485 of the XR device 2500 start to guide the user to the company with consideration of the real-time traffic situation or construction section under the control of the control unit 2410. For example, the navigation unit 2495 and the output unit 2485 of the XR device 2500 start to guide the user to the company by outputting a voice saying "the best route to the company is A through B", "I will guide you along the route", and "the time as required to reach the company is 40 minutes".

In this connection, in one embodiment, the company's location may be input directly by the user. However, in another embodiment when the user uses his car to the work at an uniform time zone, the time zone information is learned by the learning processor 2490. Thus, the XR device 2500 automatically guides the user to the company via the navigation unit 2495 and output unit 2485 without the user entering the company location.

Then, when the day's schedule is registered in the memory 2460, the registered schedule may be output in an audio manner via the output unit 2485. For example, the output unit may output a voice saying "there are three events today. A first event is a meeting with a customer at 10 o'clock . . . ".

Alternatively, the XR device 2500 may search a newspaper or a portal that the user likes using the communication module 2470, and may output the news of the newspaper or the portal, for example, the news of the day in an audio manner.

Further, when there is a radio channel program that the user normally listens to and the radio channel is learned by the learning processor 2490, related content of the program is output in a voice form using the output unit 2485, and the corresponding radio channel is turned on so that the user may listen to it. For example, the output unit may output a voice that says "I'll play a MBC radio program that you normally listens to". Alternatively, the user may connect directly the cellular phone to the car and may listen to the music from the cellular phone without the need for synchronization.

When a call comes in, the XR device 2500 may automatically receive the call via the communication module 2470. The XR device 2500 may connect to or disconnect to the phone according to the user's command. For example, when a user inputs a voice command "connect to the phone", or performs a predetermined gesture, for example, when the user nods up and down, the XR device may be connected to the phone. In another example, when the user inputs a voice command "do not connect to the phone" or performs a predetermined gesture, for example, when the user shakes his/her head in a left-right direction, the XR device may terminate the call without connecting to the phone. When the call is made, the call may terminate in a similar manner.

Then, when the Starbucks coffee shop that the user frequently uses on the way to the company is learned by the learning processor 2490, the control unit 2410 of the XR device 2500 may control the output unit 2485 to ask the user whether to drink coffee. For example, the output unit 2485 may output a voice saying "do you like coffee" or "do you drink Americano". In this connection, in one embodiment, the time criterion when the XR device 2500 asks the user whether to drink coffee is determined in consideration of an expected travel time of the user to the coffee shop. For example, when an expected travel time of the user to the coffee shop is about 10 minutes, the XR device 2500 may ask the user whether to drink coffee. In this connection, the temporal criteria may be determined by the XR device 2500 or may be input by the user.

When the user is driving along a way not frequently used or when a current time is not a normal drinking coffee timing, there may be a Starbucks coffee shop nearby the user. In this case, the XR device 2500 may notify the user using the output unit 2485 that there is a Starbucks coffee shop nearby the user and may ask the user when the user wants to drink coffee.

In this connection, when the user enters a user command to order the coffee using the input unit 2450, the XR device 2500 orders American coffee to a nearby Starbucks coffee shop via the communication module 2470. The user may select another type of coffee via the input unit 2450. The user command input using the input unit 2450 may be a user voice such as "yes" or "no", or may be a key input such as a touch key or a button key.

When a user card or payment means is pre-registered on the XR device 2500, the XR device 2500 may proceed with payment together with the coffee order. The communication module 2470 may use the 5G network to communicate with a server at a nearby Starbucks coffee shop, i.e., an external server, to order the coffee and pay for the coffee. When the user payment means is not pre-registered or the user wants to pay in cash, the user may order coffee only and then pay for the coffee when the user receives the coffee at a Starbucks coffee shop.

Then, when the coffee order is completed, the navigation unit 2495 on the XR device 2500 may output via the output unit 2485 a voice indicating a distance between a current location and the Starbucks coffee shop where the coffee was ordered or an expected travel time duration corresponding to the distance. For example, the voice may say "it might take 10 minutes to reach the coffee shop".

Subsequently, in one embodiment, the navigation unit 2495 of the XR device 2500 proceeds to guide the user to the coffee shop where the coffee was ordered. For example, the navigation unit 2495 may control the output unit 2485 to output a voice saying "turn left" and "go straight by 100 meters and then turn right at a crossroad". Further, directions may be provided on a map via the display unit 2430 of the XR device 2500. As another example, directions may be provided on the map via the display unit 2330 of the storage case 2300.

Then, the XR device 2500 may use the communication module 2470 to communicate with Starbucks where the coffee was ordered to obtain a time consumed for the coffee preparation to be completed in Starbucks. To this end, in one embodiment, the Starbucks informs the XR device 2500 of the time it takes for the coffee preparation to be completed when the user's coffee order is completed using the XR device 2500. The time consumed for the coffee preparation to be completed may vary depending on the type of coffee as ordered by the user and the order status of others prior to the user order.

In this way, the user may immediately receive the ordered coffee without waiting. For example, a coffee shop where a user ordered the coffee has a drive-through system. In this case, when a user's car enters the drive-through system of the coffee shop, the coffee shop may automatically identify the user using user information provided from the user while the user ordered the coffee and may provide the coffee immediately to the user.

When the user arrives at the company and the above service is terminated, the XR device 2500 records, in the memory 2460, historical data including user's specific actions or events that occurred while the user has reached the company. For example, the location of the coffee shop where the user ordered the coffee, the type of coffee as ordered, and the like may be recorded. Those records may be learned as the user experience by the learning processor 2490 and then may be used to determine the user's lifestyle. When the car in FIG. 30 is an autonomous driving vehicle, the user does not have to involve the driving. Thus, the storage case 2300 and XR device 2500 may provide more secretary mate services.

As shown in FIG. 29 and FIG. 30, the user's lifestyle and life patterns are learned in advance by the learning processor 2490. Then, the learning processor 2490 may provide the user with a mate service that provides surrounding information and guides the user's behavior based on the learned lifestyle or lifestyle pattern. Thus, the user may feel as when there is a secretary next to him. Therefore, user's daily life becomes more convenient and user's life becomes more profitable.

FIG. 31 shows embodiments of a fashion mate service. FIG. 31 shows an example of providing a customized coordination service to the user by collecting user's fashion related information and analyzing user's fashion related information, daily schedule, weather information, etc. using at least one of the storage case and XR device and the AI function. In one embodiment of the present disclosure, the learning processor 2490 is further included in the XR device 2500 to collect and learn information related to the fashion of the user. The learning processor may be included in the storage case 2300. In order to provide the fashion mate service shown in FIG. 31, the storage case 2300 is disposed at a location where the user's whole body can be captured by the storage case 2300.

(a) in FIG. 31 shows an example of suggesting a user's style. That is, in consideration of the fashion pattern of the user learned by the learning processor 2490, the weather of the day, the schedule, clothes for the user to wear that day may be suggested to the user. For example, when it is assumed that a user is a business person and a toddy is Friday when the user has no special schedule and the season is summer and the weather is sunny, the user may input a user command such as "Suggest today clothes?". The XR device 2500 may recommend wearing a white short-sleeved shirt as the top and jean pants as the bottom. Further, the XR device 2500 may recommend shoes or accessories. In addition, the display unit 2330 of the storage case 2300 or the display unit 2430 of the XR device 2500 may display the user wearing the white short-sleeved shirt and jean pants thereon. In this connection, the image as displayed may have the user wearing the recommended clothing as captured through the camera unit 2340 of the storage case 2300. Alternatively, the image as displayed may have the recommended clothing worn on the user avatar created based on the captured user.

The XR device 2500 may suggest a new combination of styling to the user automatically via the learning processor 2490 or upon the user's request.

Then, it is assumed that the fashion-related information such as clothes, footwear, and accessories that the user has may be pre-captured and stored in the memory 2360 of the storage case 2300 and/or the memory 2460 of the XR device 2500 for the styling proposal. Further, when the user coordination recommendation has been completed, the user wearing the styling recommended by the XR device 2500, or selected by the user may be captured using the camera unit 2340 of the storage case 2300. The captured image may be stored in the memory 2360 of the storage case 2300 or the memory 2460 of the XR device 2500 and may be learned by the learning processor 2490.

The learning processor 2490 adds user information for the day, including the coordination image of the user as captured, to the user fashion history.

In (b) of FIG. 31, after capturing the user's whole body using the camera unit 2340 of the storage case 2300 for analysis of the user body shape, the captured whole body of the user may be stored in the memory 2360 of the storage case 2300 and/or the memory 2460 of the XR device 2500 and may be learned by the learning processor 2490.

In one embodiment, when the user commands the XR device 2500 saying "suggest today clothes", the XR device 2500 may suggest a styling suitable for the user based on the user experience learned by the learning processor 2490, for example, based on the user fashion information such as the user's fashion inclination, taste, and user's body shape, etc.

Further, in one embodiment, the XR device 2500 may suggest a styling suitable for the user based on the user experience learned by the learning processor 2490, for example, based on the user fashion information such as the user's fashion inclination, taste, and user's body shape, etc. and further may help shopping of the suggested clothes.

(c) in FIG. 31 shows an example where the XR device 2500 may inform the user whether the user's clothing and accessories selected by the user have been previously selected based on the user fashion history learned by the XR device 2500's learning processor 2490 and stored therein.

For example, it may be assumed that a user coordination with a white shirt, a black tie, and a black suit is captured using the camera unit 2340 of the storage case 2300 and the captured user coordination is sent to the XR device 2500. Then, the XR device 2500 may check whether the current user coordination has been previously worn by the user based on the user fashion history learned by the learning processor 2490. The XR device may report the checking result to the user via the output unit 2485 of the XR device 2500 in an audio manner. Alternatively, the checking result may be displayed on the display unit 2430 on the XR device 2500 or on the display unit 2330 of the storage case 2300. In this connection, in one embodiment, when the user previously wore clothes and/or accessory of similar concept but not the same clothes or accessory, this information may be notified to the user.

The information that may be notified to the user may only include the date that the clothing and accessories were worn by the user or may include schedule information about the date the user wore the clothing. This information is informed to the user using a voice or screen. For example, when today is Jul. 18, 2019 and the date the user wore those clothes and accessories was 4 Jul. 2019, the XR device may inform the user that On Jul. 4, 2019, he wore these clothes and accessories, and on that day, the user visited the company A. Then the user may wear the clothes and accessories or may change at least one of the clothes and accessories in accordance with the today's schedule. For example, when today's schedule includes a visit to the A company, the user may coordinate different clothes and/or accessories. When only a visit to the B company is included in the today's schedule, the user may wear the clothes and accessories without changing clothes and accessories. In another example, the user is going to visit the user child's school today and the today's outfit is one the user had on the previous school visit. In this case, the user may choose different kinds of clothes or accessory.

In general, it is not easy for people to remember all of the clothes or accessories worn at previous events or gatherings. Further, people do not want to wear the same clothes or accessories at the same event or meeting. Therefore, in accordance with the present disclosure, the user fashion history may be managed by the learning processor 2490 which in turn may allow the user to know what clothes or accessories were worn at previous events or gatherings. Thus, it may be possible to meet user needs which do not require the user to wear the same clothing or accessories repeatedly at the same events or gatherings.

In accordance with the present disclosure, the user fashion history and the user fashion coordination recommendation using the history may be applied not only to events and gatherings, but also to everyday life such as commute.

(d) in FIG. 31 shows an example of recommending a desired fashion coordination that is appropriate for the user's meeting or event.

For example, in one embodiment, when a user enters a recommendation command for a customer look for the user to attend a wedding event via the input unit 2450 of the XR device 2500, the XR device 2500 displays one or more customer looks of the latest trends on the display unit 2430. In this connection, one embodiment, when the user's body type is learned by the learning processor 2490, the XR device may recommend a customer look suitable for the latest trend and the user body type. Then, in one embodiment, the customer look recommendation may involve consideration the season, weather information, and user's fashion taste.

In this connection, when the user wants to buy the displayed customer look, the XR device 2500 connects to a related web site via the communication module 2470, allowing the user to purchase the customer look.

FIG. 32 shows embodiments of a self-development mate service. FIG. 32 shows an example of helping the user self-development using at least one of the storage case and XR device and the AI function. In an embodiment of the present disclosure, the learning processor 2490 is further included in the XR device to collect and learn user self-development information.

(a) in FIG. 32 indicates an example that when the user is moving or alone and the user commands the XR device to read or display English words through the input unit 2450 of the XR device 2500, the XR device 2500 may output the English words in an audio manner via the output unit 2485 or may use the display unit 2430 to display English words on the screen or may output the English words on the screen and in an voice manner at the same time. For example, a virtual object may be displayed on the display unit 2430 and the virtual object may read English words to the user. While (a) in FIG. 32 reads English words by way of example, the present disclosure may be applied to English books, English newspapers, magazines, and stories.

(b) in FIG. 32 shows an example of using the storage case 2300 to provide the user with an English environment. For example, the user commands the XR device to convert non-English words t to English words via the input unit 2350 of the storage case 2300. Then, the user may use the camera unit 2340 of the storage case 2300 to capture a sign that has non-English "crosswalk" written thereon. Thus, the display unit 2330 of the storage case 2300 may display an English "crosswalk" instead of the non-English "crosswalk". The traffic sign in (b) in FIG. 32 is an example of the present disclosure. The present disclosure also applies to non-English words or sentences that may be recognized by capturing via the camera unit 2340. In other words, street signs written in non-English and book titles written in non-English may be applied to the present disclosure.

(c) in FIG. 32 shows an example of the user communicating with the XR device 2500 in English and the XR device 2500 acting as a tutor adapted to the user level. That is, the XR device 2500 may execute an English conversation program or the like according to a user's command and communicate with the user in English. The user's English conversation level may be set by the user or may be configured automatically via the learning from the learning processor 2490. To this end, when the English conversation with the user is terminated, the contents of the English conversation are provided to the learning processor 2490, and are learned by the learning processor 2490.

(d) in FIG. 32 shows an example of using the storage case 2300 to automatically check and manage a user's ability to help the user self-development. In this connection, the storage case 2300 may include the learning processor to check and manage the user's skills. As another example, the learning processor 2490 of the XR device 2500 may be used to check and manage a user's skills and thus to help with the user self-development.

FIG. 33 shows an embodiment of a meeting mate service according to the present disclosure. This figure shows an example of helping and managing a user's conference using at least one of the storage case and the XR device and the AI function.

According to one embodiment of the present disclosure, the storage case 2300 may be used to capture the people attending the meeting, and to record each statement of the people, and arrange the contents of the meeting for each person who attended the meeting based on the voice recording, and then email the contents to the people who attended the meeting to share the meeting discussions.

For example, a user may input a voice saying "I have an important meeting with a foreign buyer today and help me in meeting" through the input unit 2350 of the storage case 2300. In this case, the storage case 2300 may respond to this command and thus say a voice "OK. Wear an AR set" to the user. To this end, the storage case 2300 may include audio output means such as speakers. Alternatively, when the user requests the storage case 2300 to help the user with the meeting, the storage case 2300 sends this request to the XR device 2500. Then, the XR device 2500 may request the user to wear the AR set via the output unit 2485 of the XR device 2500. Further, in an embodiment, the storage case 2300 further includes a recording unit equipped with a recording function in order to record the speeches of the participants in the conference. As another example, the storage case 2300 may be capable of capturing a conference process and content to create a moving image.

Then, in one embodiment, the user may install the storage case 2300 in a location where the storage case 2300 may capture the people attending the meeting and record the comments of the meeting participants. In one embodiment of the present disclosure, the storage case 2300 is installed in the center of the meeting room. Then, in one embodiment, the storage case 2300 is rotatably installed to enable the capturing of the speaker. For example, in one embodiment, the storage case 2300 rotates toward the direction of the voice whenever the direction of the voice changes, images the speaker of the voice, and records the voice.

In an embodiment, when the user asks for an interpreter, the XR device 2500 performs simultaneous interpretation. For example, some meeting attendees speak a different language than the language of the user and then the user inputs the command "Act as an interpreter" through the input unit 2450 of the XR device 2500. In this case, when a person speaks a language other than the user language, the XR device 2500 may change the person's language to the language the user is using and may display the changed language on the display unit 2430 of the XR device 2500, or output it in an audio manner via the output unit 2485. Further, the interpreted content is stored in the memory 2360 for later meeting discussion arrangement.

When the meeting ends, the storage case 2300 organizes the meeting contents based on the voice recording and makes a meeting record. In this connection, the meeting log creation may be done automatically after the meeting, or the device may create the meeting record at the user's request. Then, in one embodiment, in order to organize the meeting contents for each person who attends the meeting when creating the meeting record, the personal information of the people who attended the meeting may be stored in the memory 2360 of the storage case 2300 or the memory 2460 of the XR device 2500. In an embodiment, the personal information includes photos, names, and e-mail addresses of people attending the meeting. The storage of the personal information may be done before the meeting or may be done after the meeting and before the meeting discussion contents is organized.

According to one embodiment, the storage case 2300 compares the photos of the stored personal information with the images captured during the meeting to distinguish the people who attended the meeting. The recorded contents may be classified based on each person who attends the meeting and each classified contents may be stored in a file format. In this connection, according to one embodiment, the captured image and the recorded voice are synchronous with each other, making it possible to distinguish the recordings based on each person. Further, according to one embodiment of the present disclosure, the device summarizes the contents of each person's speech using the learning processor and includes the summary in the meeting records. In one embodiment, the meeting record shown in FIG. 33 includes the participants' photos and names and the contents of the speech as summarized based on each participant, and the recording file of each participant. This is merely an embodiment. The present disclosure is not limited to the embodiment as the contents included in the meeting record may be added or deleted by those skilled in the art.

Then, in one embodiment, when the meeting record is completed, the storage case 2300 sends the meeting record and the recording file classified based on the attendee to an e-mail of each of the persons who attend the meeting through the communication module 2370. Alternatively, in another embodiment, the casing 2300 may transfer the meeting records and the recording file to the XR device 2500, and then the XR device 2500 may send the meeting records and the recording file to an email of each participant via the communication module 2470. In one embodiment of the present disclosure, the storage case 2300 sends the entire meeting contents in addition to the meeting record and the recording file classified based on the attendee to an e-mail of each of the persons who attend the meeting through the communication module 2370. In addition, the storage case 2300 sends the interpretations during the meeting to an e-mail of each of the persons who attend the meeting through the communication module 2370.

In this way, the user does not have to organize the meeting contents after the meeting is finished, thereby reducing the amount of work of the user.

FIG. 34 shows an embodiment of a class mate service according to the present disclosure. This figure shows an example of helping the user to take lectures and managing class contents using at least one of the storage case and XR device and the AI function.

In one embodiment of the present disclosure, the storage case 2300 is used to capture and record lecturers 'lectures, and then organize the lecturers' lectures based on the captured and recorded contents. The organized contents may be sent to the user's email or may be output in a voice form and/or may be displayed according to user's request. The above procedure may be performed by the XR device 2500 instead of the storage case 2300.

In one embodiment, when the user uses the storage case 2300 to capture and record the class content, the storage case 2300 is installed at a location where the lecturer's lecture can be captured and recorded by the storage case 2300.

For example, when the user enters the command "record today's lecture" via the input unit 2350 of the storage case 2300, the storage case 2300 may request the user to wear an AR set. To this end, the storage case 2300 may include audio output means such as speakers. Alternatively, when the user request the storage case 2300 to help the user with the lecture, the storage case 2300 sends this request to the XR device 2500, and the XR device 2500 may request the user to wear the AR set via the output unit 2485 of the XR device 2500. Further, in order to record the lectures of the lecturer, the storage case 2300 further includes a recording unit equipped with a recording function. As another example, the storage case 2300 may be capable of capturing the lecture content to create a moving image. As another example, capturing and recording of the lecture content from the teacher may be performed by the XR device 2500.

Further, when the user comes up with an unknown term while listening to the lecture, the user may ask for the meaning of the term through the input unit 2350 of the storage case 2300 or the input unit 2450 of the XR device 2500. For example, in one embodiment, when the user may ask for the meaning of the machine learning by saying a voice "what is machine learning?", the storage case 2300 or XR device 2500 answers the user's question. In this connection, the answer to the user's question may be the result of searching the Internet for the "machine learning" through the communication module 2370 of the storage case 2300 or the communication module 2470 of the XR device 2500. When there is a web site associated with the teacher, such as the teacher's homepage or blog, the storage case 2300 or XR device 2500 may answer the question by searching the web site for the answer.

Then, in an embodiment, the storage case 2300 or XR device 2500 may separately highlight the important portion which the teacher emphasizes in the lecture and stores the highlighted portion during capturing or recording.

In an embodiment, after the lecture, the storage case 2300 or XR device 2500 organizes the class contents based on the capturing and recorded contents. In this connection, the organization of the class content can be done automatically after the lecture, or may be executed at the request of a user.

Once the storage case 2300 or XR device 2500 has finished organizing the contents of the class, the storage case 2300 or XR device 2500 may save the class contents in the memory or sent the class contents to the user's e-mail. For example, the user inputs a command "Organize class contents and e-mail me the class contents today". The storage case 2300 or XR device 2500 organizes the class contents and sends them to the user's email. In one embodiment, the content highlighted during the lecture may be marked separately so that the user may identify the highlighted content. In this connection, the separate markings may be embodied using a different color, or using the bold font or a different size. In one embodiment, any marking scheme may be used as long as that the user can identify the marking.

In this way, even when the user does not concentrate properly on the class or does not take the lecture, the user may receive the organized class contents, thus making the user's daily life more convenient.

FIG. 35 shows an embodiment of a seminar mate service according to the present disclosure. FIG. 35 shows one example in which at least one of the storage case and XR device and the AI function may be used to capture and record the presenters' presentation during the seminar and to capture the presenter's appearance and to organize the presentation contents from the presenter. In one embodiment of the present disclosure, the storage case 2300 may be used to capture and record the presenter's presentation and further capture the presenter's appearance. To this end, in one embodiment of the present disclosure, the storage case 2300 is installed in a location where the casing 2300 can capture and record the presenter's presentation and may capture the presenter. Then, in one embodiment of the present disclosure, the storage case 2300 has both capturing and recording functions, and, in order to summarize the presentation based on each presenter, the storage case 2300 includes a learning processor.

In one embodiment of the present disclosure, at the end of the seminar, the learning processor of the storage case 2300 analyzes the presentation based on the captured and recorded contents and organizes the seminar contents based on each speaker. In this connection, organizing the seminar content may be done automatically after the seminar, or may be executed at the request of a user.

In one embodiment of the present disclosure, there are multiple presenters at the seminar, and the presentation order is fixed therebetween. In one embodiment, the storage case 2300 summarizes the presentations in the order of presentations and stores the summarized presentations and the appearance of the presenter together into the memory 2360. In this connection, the presenter appearance may be an image of the presenter that was captured during the presentation or may be a picture from the personal information stored in advance. In one embodiment of the present disclosure, when the presenter's appearance is an image of the presenter as captured during the presentation, the presenter's appearance is stored in a snapshot image form. In another embodiment of the present disclosure, the presenter's personal information may be stored in the memory 2360 in advance.

In one embodiment, the seminar data having the presentations contents as arranged is stored in the memory 2360. Then, the seminar materials containing the presentations contents as arranged may be sent to the e-mail address as requested by the user through the communication module 2370. The email address requested by the user could be those of people associated with the user, for example, the presenters, or may be those of a boss or team members of the user.

In this way, not only the user but also the people associated with the user may know who presented what contents event in hours after the end of the seminar. In addition, since the user does not have to organize the contents of the seminar after the seminar, the user's workload is reduced.

FIG. 36 shows an embodiment of the presentation practice mate service according to the present disclosure. FIG. 36 shows an example of assisting and managing the presentation of the presenter preparing the presentation using at least one of the storage case and the XR device and the AI function.

In one embodiment of the present disclosure, the storage case 2300 may be used to capture and record the presenter's presentation preparation and the presentation contents, and to advise the presenter on posture, attitude, intonation, and tone based on the captured and recorded contents. To this end, in one embodiment of the present disclosure, the storage case 2300 is installed in a location where the user's pose may be captured and the user's voice can be recorded by the casing 2300. In one embodiment of the present disclosure, in order to analyze the user's presentation exercise and advise the user about the posture, attitude, intonation, and tone, the storage case 2300 further includes a learning processor. The learning processor may be included in the XR device 2500. Further, in one embodiment of the present disclosure, to advise the user about the posture, attitude, intonation, and tone using a voice, the storage case 2300 may include an additional output unit capable of outputting voices. Alternatively, the XR device 2500 may output voices via the output unit 2485 of the XR device 2500. In addition, the presentation exercises image of the user and the presentation contents may be stored in the memory 2360 of the storage case 2300 and then may be transmitted to the XR device 2500 using the communication module 2370 and then may be stored in the memory 2460 of the XR device 2500.

After the appearance of the user practicing the presentation and the presentation contents are imager and recorded using the storage case 2300, the user may request the advice on the presentation through the input unit 2350 of the storage case or the input unit 2450 of the XR device 2500. When the user's advice request is made, the learning processor of the storage case 2300 or the XR device 2500 analyzes the user's presentation pose and the user voice tone. Then, the analysis result is outputted in a voice manner through the output unit 2485 of the storage case 2300 or the output unit 2485 of the XR device 2500.

For example, when the user may ask a question "Am I good at presentation?", the output unit of the storage case or the output unit 2485 of the XR device 2500 may be used to say "Make your voice calmer and correct your facing direction" to the user.

Further, in one embodiment, when the user asks for the advice about the PT, the storage case 2300 or XR device 2500 may only advise on the current state. Further, in one embodiment, when the storage case or device may have saved a previous exercise or analysis results from the previous exercise, the current state is compared with the previous content to provide the comparison to the user.

For example, when the user may ask a question "Am I good at presentation?", the output unit of the storage case or the output unit 2485 of the XR device 2500 may say "Your facing direction has been corrected !!, Make your voice calmer" to the user.

Then, the image of the user practicing presentation was captured using the storage case 2300. Thus, when outputting the analysis results to the voice, the captured image may be displayed via the display unit 2330 of the storage case 2300 or display unit 2430 of the XR device 2500. In this case, the user will be able to know more clearly what he needs to correct.

Thus, when the user exercises the presentation before the actual presentation, the storage case 2300 and XR device 2500 may capture and record the user's presentation exercise and analyze the captured and recorded content. This will help the user to make a better presentation FIG. 37 shows an embodiment of an eye-contact mate service according to the present disclosure. FIG. 37 shows an example of a chatting in which the storage case, the XR device and the AI function are used to talk to the user and listen to the user's concerns.

In one embodiment of the present disclosure, when the infrared rays emitted from the storage case 2300 and the infrared rays emitted from the XR device 2500 are matched with each other, this is recognized as an eye-contact and thus an eye-contact mode is triggered.

Thus, in one embodiment, when the user wears the XR device 2500, the storage case 2300 is placed facing the XR device 2500 so that the eye-contact mode is triggered.

When the storage case 2300 and XR device 2500 operate in the eye-contact mode, the user wearing the XR device 2500 may talk to the storage case 2300. For example, when a user says "I have a problem these days", the storage case 2300 may say "Tell me your problem, I will listen to that".

Then, when the user says something to worry about, the storage case 2300 may say a comfort to a user or say a device's concern to the user. For this purpose, the learning processor 2490 may analyze the user's conversation. The learning processor 2490 may pre-learn scenarios and possible answers based on the analysis such that processor can communicate with the user.

For example, when the user says "Company has many problems and I fail to promote", the storage case 2300 may say to the user "I don't know how many years has lapsed since I abandon my upgrade!! I feel comfortable upon giving up that".

In this way, in the eye-contact mode, the user may talk to the storage case 2300 and XR device 2500 like a real friend and may receive counseling or comforting that actual friends may not give.

FIG. 38 shows another embodiment of the eye-contact mate service according to the present disclosure. FIG. 38 shows one example in which the AI function, and the storage case 2300 and XR device are used to allow several people to talk to the storage case 2300 in the eye-contact mode. In this example, the storage case 2300 acts as a member of a multiplayer game. For example, when three people are in a conversation, joining the storage case 2300 as a member of the conversation such that the four people talk to each other. When three people are playing a game, the storage case 2300 may act as a member such that the four people play the game. To this end, the storage case 2300 further includes a learning processor having a learning function so that the storage case 2300 can talk to a user or play a game, and an output unit having a voice output function.

FIG. 39 shows an embodiment of a hand-signal mate service according to the present disclosure. FIG. 39 shows an example of using the storage case and XR device and the AI to allow the user to talk to the storage case 2300 using the hand-signal or gesture rather than the voice.

To this end, it is assumed that the storage case 2300 has the ability to sense a user's hand-signal or gesture and interpret what the sensed hand-signal or gesture means.

In particular, the present disclosure has the effect that the user and the storage case 2300 communicate with each other using the hand-signal or gesture, not using the voice, so as not to harm others in a public place requiring quietness like a library.

As mentioned above, in accordance with the present disclosure, the XR device and the storage case to store the XR device may be used to allow the user daily life to be more convenient.

Although the present disclosure has been described with reference to the drawings illustrating the present disclosure, the present disclosure is not limited to the embodiments and drawings disclosed in the present specification. It will be apparent that various modifications may be made by those skilled in the art within the scope of the present disclosure. In addition, it should be appreciated that effects to be achieved from configurations of the present disclosure as not expressly mentioned may be acknowledged.

What is claimed is:

1. An extended reality (XR) system comprising:
   an XR device; and
   a storage case for storing the XR device therein,
   wherein the storage case includes:
      a first power supply having a battery to supply power;
      a camera for capturing at least one image;
      a first display for displaying;
      a first communication device for communicating with at least the XR device or an external server; and
      a first controller for controlling components of the storage case,
   wherein the XR device includes:
      a second power supply chargeable with the power provided from the first power supply of the storage case;
      a second display for displaying;
      a second communication device for communicating with at least the storage case or an external server;
      a learning processor for recording and learning user experiences; and
      a second controller for controlling components of the XR device, and
   wherein at least one of the first controller or the second controller controls corresponding components to provide a service to a user based on the at least one image captured by the camera of the storage case and user information including the learned user experiences.

2. The XR system of claim 1, wherein when the user cooks, cooking materials prepared by the user and a cooking process of the user are captured by the camera of the storage case,
   wherein at least one of the first controller or the second controller controls corresponding components to compare and analyze the captured cooking material and process images, a cooking recipe, and learned user experiences to provide a service to guide the cooking process to the user, and
   wherein when the user's cooking is completed, the captured cooking materials, the captured cooking process, and guide contents are recorded and are learned as the user experiences by the learning processor.

3. The XR system of claim 1, wherein when the user plays sports, a user pose for the sports is captured by the camera of the storage case,
   wherein at least one of the first controller or the second controller controls corresponding components to compare and analyze the captured pose image, a reference pose for the sports, and learned user experiences to provide a service to coach the user's pose, and
   wherein the captured user pose and coaching contents are recorded and are learned as the user experiences by the learning processor.

4. The XR system of claim 1, wherein when the user is moving, at least one of the first controller or the second controller controls corresponding components to provide a service in which information about surrounding locations around the user along with moving directions and a user product order guidance are provided to the user based on learned user experiences and user schedule information, and a product selected by the user is ordered via communication with an external server, and wherein when the user order is completed and the user receives the ordered product and then arrives at a final destination, the user schedule information, the surrounding locations information, the order information and the moving directions information are recorded and learned as the user experiences by the learning processor.

5. The XR system of claim 1, wherein at least one of the first controller or the second controller controls corresponding components to provide a service for guiding the user's fashion based on a user image captured by the camera of the storage case, user schedule information, and the learned user experiences, and wherein the captured user image, the user schedule information, and, the fashion information selected by the user are recorded and learned as the user experiences by the learning processor.

6. The XR system of claim 1, wherein at least one of the first controller or the second controller controls corresponding components to provide a service in which characters of a first language captured by the camera of the storage case are converted to characters of a second language different from the first language and selected by the user and then the converted characters are displayed on the first display of the storage case.

7. The XR system of claim 1, wherein the storage case further includes a recording device having a recording function, wherein when multiple people attend a meeting, the camera and the recording device of the storage case captures the meeting participants and records meeting contents, respectively, and wherein when the meeting ends, at least one of the first controller or the second controller controls corresponding components to provide a service in which the recorded contents are classified and the meeting contents are organized for each of attendees based on the captured image and the recorded contents to create an attendee-specific meeting record.

8. The XR system of claim 1, wherein the storage case further includes a recording device having a recording function, wherein when a plurality of people attend a seminar and present presentations, the camera and the recording device of the storage case captures and records presenters and presentation contents, respectively, and wherein when the presentation ends, at least one of the first controller or the second controller controls corresponding components to provide a service in which the presentation contents are organized for each of the presenters based on the captured image and the recorded contents to create a presenter-specific presentation record.

9. The XR system of claim 1, wherein the storage case further includes a recording device having a recording function, wherein when the user is practicing presentation, appearance and contents about the user's presentation practice are captured and recorded by the camera and the recording of the storage case, respectively, wherein at least one of the first controller or the second controller controls corresponding components to compare and analyze the captured image and recorded contents, reference presentation information, and learned user experiences and to provide a service to guide the user's presentation preparation based on the comparing and analyzing results, and wherein the captured user image and presentation preparation guide contents are recorded and learned as the user experiences by the learning processor.

10. The XR system of claim 1, wherein the storage case further includes a recording device having a recording function, wherein when the user is listening to a lecture, a lecturing appearance of a teacher and lecture contents are captured and recorded by the camera and the recording device of the storage case, respectively, and wherein at an end of the lecture, at least one of the first controller or the second controller controls corresponding components to provide a service in which the lecture contents of the teacher are organized based on the captured image and recorded contents to create a teacher-specific lecture record.

\* \* \* \* \*